US008666196B2

(12) United States Patent
Young

(10) Patent No.: US 8,666,196 B2
(45) Date of Patent: *Mar. 4, 2014

(54) SYSTEM AND METHOD FOR SUPER-RESOLUTION IMAGING FROM A SEQUENCE OF COLOR FILTER ARRAY (CFA) LOW-RESOLUTION IMAGES

(75) Inventor: Shiqiong Susan Young, Bethesda, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 583 days.

This patent is subject to a terminal disclaimer.

(21) Appl. No.: 12/973,667

(22) Filed: Dec. 20, 2010

(65) Prior Publication Data

US 2011/0150331 A1 Jun. 23, 2011

Related U.S. Application Data

(63) Continuation-in-part of application No. 12/576,132, filed on Oct. 8, 2009, now Pat. No. 7,856,154, which is a continuation-in-part of application No. 11/038,401, filed on Jan. 19, 2005, now Pat. No. 7,602,997.

(51) Int. Cl.
*G06K 9/32* (2006.01)
(52) U.S. Cl.
USPC .......................................... 382/299; 382/280
(58) Field of Classification Search
USPC ........................................ 382/280, 299, 321
See application file for complete search history.

(56) References Cited

U.S. PATENT DOCUMENTS 3,971,065 A 7/1976 Bayer
5,696,848 A * 12/1997 Patti et al. .................... 382/254

(Continued)

OTHER PUBLICATIONS

Tom, B.C., et al. "Resolution Enhancement of Monochrome and Color Video Using Motion Compensation," IEEE Transactions on Image Processing, vol. 10, No. 2, Feb. 2001, pp. 278-287.

(Continued)

*Primary Examiner* — Aaron W Carter
(74) *Attorney, Agent, or Firm* — Lawrence E. Anderson

(57) ABSTRACT

A method and system for improving picture quality of color images by combing the content of a plurality of frames of the same subject; comprising: at least one processor; the at least one processor comprising a memory for storing a plurality of frames of a subject; the at least one processor operating to combine the content of plurality of frames of the subject into a combined color image by performing: a process in which at least two multicolored frames are converted to monochromatic predetermined color frames; a gross shift process in which the gross shift translation of one monochromatic predetermined color frame is determined relative to a reference monochromatic predetermined color frame; a subpixel shift process utilizing a correlation method to determine the translational and/or rotational differences of one monochromatic predetermined color frame to the reference monochromatic predetermined color frame to estimate sub-pixel shifts and/or rotations between the frames; and an error reduction process to determine whether the resolution of the resulting combined color image is of sufficient resolution; the error reduction process comprising applying at least one spatial frequency domain constraint and at least one spatial domain constraint to the combined color image to produce at least one high-resolution full color image.

22 Claims, 40 Drawing Sheets

(56) References Cited

U.S. PATENT DOCUMENTS

| | | | |
|---|---|---|---|
| 5,767,987 | A | 6/1998 | Wolff et al. |
| 5,952,957 | A * | 9/1999 | Szu ................................. 342/53 |
| 6,023,535 | A | 2/2000 | Aoki |
| 6,157,732 | A | 12/2000 | Drisko et al. |
| 6,208,765 | B1 | 3/2001 | Bergen |
| 6,285,804 | B1 | 9/2001 | Crinon et al. |
| 6,344,893 | B1 | 2/2002 | Mendlovic et al. |
| 6,349,154 | B1 | 2/2002 | Kleihorst |
| 6,424,749 | B1 | 7/2002 | Zhu et al. |
| 6,483,952 | B2 | 11/2002 | Gregory et al. |
| 6,628,845 | B1 | 9/2003 | Stone et al. |
| 6,642,497 | B1 | 11/2003 | Apostolopoulos et al. |
| 6,650,704 | B1 | 11/2003 | Carlson et al. |
| 7,106,914 | B2 | 9/2006 | Tipping et al. |
| 7,218,751 | B2 | 5/2007 | Reed et al. |
| 7,260,277 | B2 | 8/2007 | Messina et al. |
| 7,323,681 | B1 | 1/2008 | Oldham |
| 7,379,612 | B2 | 5/2008 | Milanfar |
| 7,515,747 | B2 | 4/2009 | Okutomi |
| 2004/0239885 | A1 | 12/2004 | Jaynes et al. |
| 2004/0263169 | A1* | 12/2004 | Mitchell et al. ................ 324/309 |
| 2005/0019000 | A1* | 1/2005 | Lim et al. ......................... 386/46 |
| 2005/0057687 | A1* | 3/2005 | Irani et al. ....................... 348/443 |
| 2006/0038891 | A1* | 2/2006 | Okutomi et al. ........... 348/222.1 |
| 2006/0053455 | A1 | 3/2006 | Mani et al. |
| 2006/0159369 | A1* | 7/2006 | Young ............................ 382/299 |
| 2006/0279585 | A1 | 12/2006 | Milanfar |
| 2007/0130095 | A1 | 6/2007 | Peot et al. |
| 2007/0196009 | A1 | 8/2007 | Deinzer |
| 2007/0206678 | A1 | 9/2007 | Kondo |
| 2007/0217713 | A1* | 9/2007 | Milanfar et al. .............. 382/299 |

OTHER PUBLICATIONS

Alleysson, D., et al. "Frequency Selection Demosaicking: A Review and a Look Ahead," (Proceedings Paper) Visual Communications and Image Processing 2008, SPIE-IS& T vol. 6822, p. 68221M-1 to 68221M-13. (Jan. 28, 2008).

Irani, M., et al. "Super Resolution From Image Sequences," Proceedings of the 10th International Conference on Pattern Recognition, vol. 2, pp. 115-120, 1990.

Li, Xin, et al. "Image Demosaicing: A Systematic Survey," Visual Communications and Image Processing 2008, SPIE-IS& T vol. 6822, pp. 68221j-1 to 68221j-15 (2008).

Prabhu, K.A., et al., "Motion Compensated Component Color Coding," IEEE Transactions on Communications, vol. COM-30, No. 12, Dec. 1982, pp. 2519-2527.

M. Soumekh, Fourier Array Imaging, Prentice Hall, 1994, pp. 167-177.

J. R. Casas and L. Torres, "Morphological filter for lossless image subsampling," Proc. Int. Conf. Image Process. ICIP-94 2, 903-907 (1994).

A. S. Fruchter, et al., "Drizzle: a Method for the Linear Reconstruction of Undersampled Images," Publications of the Astronomical Society of the Pacific, vol. 114, pp. 144-152, Feb. 2002 [arXiv:astro-ph/9808087v2 Oct. 19, 2001].

J. O. Kim, B. T. Choi, A. Morales, and S. J. Ko, "Neural concurrent subsampling and interpolation for images," Proc. IEEE 2, 1327-1330 (1999).

L. G. Brown, "A survey of image registration techniques," ACM Computing Survey, vol. 24, No. 4, Dec. 1992, pp. 325-376.

S. S. Young, "Alias-free image subsampling using Fourier-based windowing methods," Optical Engineering, vol. 43, No. 4, Apr. 2004, pp. 843-855.

R.Y. Tsai and T.S. Huang, "Mulitple Frame Image Restoration and Registration," Advances in Computer Vision and Image Processing, Greenwich CT: JAI Press, Inc. 1984, pp. 317-339.

B.C. Tom and A.K. Katsaggelos, "Reconstruction of a High-resolution Image by Simultaneous Registration, Restoration, and Interpolation of Low-resolution Images," Proceedings of 1995 IEEE Int. Conf. Image Processing, Col. 2, Washington, DC, Oct. 1995, pp. 539-542.

R.R. Schulz and R. L. Stevenson, "Extraction of high-resolution frames from video sequences," IEEE Trans. Image Processing, vol. 5, pp. 996-1011, Jun. 1996.

A. M. Guarnieri, C. Prati, and F. Rocca, "SAR interferometric quicklook," Proc. Geosci. Remote Sens. Symp. IGARSS '93 3, 988-990 (1993).

Gerchberg, "Super Resolution Through Error Energy Reduction," Optica Acts, vol. 21, No. 9, pp. 709-720 (1974).

Rosenfeld, et al., "Digital Picture Processing," Second Edition, vol. 2, pp. 36-39 (1982).

M. Irani and S. Peleg, "Improving Resolution by Image Registration," CVGIP: Graphical Models and Image Processing, vol. 53, pp. 231-239, May 1991.

R. C. Hardie, K.J. Barnard, and E. E. Armstrong, "Joint MAP registration and high-resolution image estimation using a sequence of undersampled images," IEEE Trans. Image Processing, vol. 6, pp. 1621-1633, Dec. 1997.

A. Papoulis, Chapter 14, Probability Random Variables, and Stochastic Processes, McGraw-Hill Book Company Inc., New York, 1984, pp. 480-499.

H. Stark and P. Oskoui, "High-resolution image recovery from image-plane arrays, using convex projections," J. Opt. Soc. Am. A, vol. 6, No. 11, pp. 1715-1726, Nov. 1989.

S. Foucher, G. B. Benie, and J. M. Boucher, "Multiscale MAP filtering of SAR images," IEEE Trans. Image Process. 10(1), 49-60 (Jan. 2001).

B. J. Geiman, L. N. Bohs, M. E. Anderson, S. M. Breit, and G. E. Trahey, "A novel interpolation startegy for estimating subsample speckle motion," Phys. Med. Biol. 45(6), 1541-1552 (Jun. 2000).

R. Leptoukh, S. Ahmad, P. Eaton, M. Hegde, S. Kempler, J. Koziana, D. Ostrenga, D. Ouzounov, A. Savtchenko, G. Serafina, A. K. Sharma, and B. Zhou, "GES DAAC tools for accessing and visualizing MODIS data," Proc. Geosci. Remote Sens. Symp. IGARSS '02 6, 3202-3204 (2002).

B. E. Schmitz and R. L. Stevenson, "The enhancement of images containing subsampled chrominance information," IEEE Trans. Image Process. 6(7), 1052-1056 (1997).

A. Dumitras and F. Kossentini, "High-order image subsampling using feedforward artificial neural networks," IEEE Trans. Image Process. 10(3), 427-435 (2001).

A. Landmark, N. Wadstromer, and H. Li, "Hierarchical subsampling giving fractal regions," IEEE Trans. Image Process. 10(1), 167-173 (2001).

R. A. F. Belfor, M. P. A. Hesp, R. L. Lagendijk, and J. Biemond, "Spatially adaptive subsampling of image sequences," IEEE Trans. Image Process. 3(5), 492-500 (1994).

* cited by examiner

| R | G | R | G |
|---|---|---|---|
| G | B | G | B |
| R | G | R | G |
| G | B | G | B |

FIG. 1

FIG. 13 Reconstruction of green values for each pixel location

SYSTEM AND METHOD FOR SUPER-RESOLUTION IMAGING FROM A SEQUENCE OF COLOR FILTER ARRAY (CFA) LOW-RESOLUTION IMAGES

CROSS REFERENCE TO RELATED APPLICATIONS

This application is a Continuation-In-Part of U.S. patent application Ser. No. 12/576,132, filed Oct. 8, 2009, entitled System and Method of Super-Resolution Imaging from a Sequence of Translated and Rotated Low-Resolution Images, and which in turn is a Continuation-In-Part of application Ser. No. 11/038,401, filed on Jan. 19, 2005, now U.S. Pat. No. 7,602,997, entitled "Method of Super-Resolving Images." Priority is being claimed under 35 U.S.C. §120 to both application Ser. Nos. 12/576,132 and 11/038,401, and both are hereby incorporated by reference. This application is related to U.S. application Ser. No. 12/968,881, filed Dec. 15, 2010, hereby incorporated by reference.

GOVERNMENT INTEREST

The invention described herein may be manufactured, used, and/or licensed by or for the United States Government.

FIELD OF THE INVENTION

This invention relates in general to a method of digital image processing, and more specifically relates to super-resolution image reconstruction.

BACKGROUND OF THE INVENTION

The terminology "subpixel" or "subpixels" as used herein refers to one or more components of a single pixel. In a color subpixelated image, the components of a single pixel comprise several primary color primaries, which may be three ordered color elements such as blue, green, and red (BGR), or red, green, and blue (RGB), or green, blue, red. Some image displays have more than three primaries, further including yellow (RGBY), or white (RGBW), or yellow and cyan (RGBYC). Sub-pixels may appear as a single color when viewed directly by the human eye due to spatial integration by the eye. However, the components may be visible under a magnification. Upon achieving a predetermined resolution, the colors in the sub-pixels are not visible, but the relative intensity of the components may cause a shift in the apparent position or orientation of a line. The resolution at which sub-pixels go unnoticed may depend upon the viewer or the application as the visual processes of humans vary; whereby the colored "fringes" resulting from sub-pixel rendering may cause distraction in some individuals or applications but not others. Methods that account for sub-pixel rendering are generally called subpixel rendering algorithms.

Image resolution relates to the detail that an image possesses. For satellite images, the resolution generally correlates to the area represented by each pixel. Generally speaking, an image is considered to be more accurate and detailed as the area represented by each pixel is decreased. As used herein, the term images include digital images, film images, and/or other types of images.

As used herein, the terminology "sampling" refers to the practice of collecting a subset of individual observations intended to yield some knowledge about a subject. "Sampling" includes the act, process, or technique of selecting a representative part of a population or sequence of moving images for the purpose of determining parameters or characteristics of the whole population or moving image sequence. For example, according to the 1949 sampling theorem by C E Shannon, in order to recover a signal function $f(t)$ precisely, the sampling rate must be done at a rate greater than twice the signal's highest frequency component.

Many low-cost sensors (or cameras) may spatially or electronically undersample an image. Similarly, cameras taking pictures from great distances, such as aerial photos, may not obtain detailed information about the subject matter. This may result in aliased images in which the high frequency components are folded into the low frequency components in the image. Consequently, subtle or detail information (high frequency components) are not present in the images.

Many digital cameras acquire images using a single image sensor overlaid with a color filter array (CFA), and demosaicing is required to render these images into a viewable format. "Demosaicing process" is a digital image process of reconstructing a full color image from incomplete color samples output from an image sensor or camera overlaid with a color filter array (CFA).

When an image is captured by a monochrome camera, a single charge-coupled device (CCD) or complementary metal-oxide semiconductor (CMOS) sensor is used to sample the light intensity projected onto the sensor. Color images are captured in much the same way, except that the light intensity is measured in separate color channels, usually red, green, and blue. In order to do this, three separate sensors could be used in conjunction with a beam splitter to accurately measure each of the three primary colors at each pixel. However, this approach is expensive and mechanically difficult to implement, making its use in commercial imaging systems infeasible. To overcome this obstacle, the color filter array (CFA) was introduced to capture a color image using only one sensor.

A CFA is an array that is used in front of the image sensors to alternate color filters that samples only one color channel at each pixel location. The most popular and common CFA is arranged in mosaic pattern, called the Bayer pattern, as described in U.S. Pat. No. 3,971,065, "Color image array," July 1976, B. E. Bayer, which is illustrated in FIG. 1. For each 2×2 set of pixels, two diagonally opposed pixels have green filters, and the other two pixels have red and blue filters, which is called quincunx sampling pattern. A Bayer image can be also seen as a grayscale image as shown in FIG. 28B.

This pattern results in half of the image resolution being dedicated to accurate measurement of the green color channel and quarter of the image resolution of the red or blue color channel. The peak sensitivity of the human visual system lies in the medium wavelengths, justifying the extra green sampling as described in X. Li, B. Gunturk, and L. Zhang, "Image demosaicing: a systematic survey," Proc. SPIE, Vol. 6822, 68221J, 2008. Because each pixel now has only one color sampled, in order to produce a three-channel full color image, that is, each pixel contains three color channel values, missing information needs to be estimated from surrounding pixels of CFA pattern raw data. This is called demosaicing algorithm or process. The simplest demosaicing algorithm is linear interpolation applied to every color channel. More advanced demosaicing methods are summarized in X. Li, B. Gunturk, and L. Zhang, "Image demosaicing: a systematic survey," Proc. SPIE, Vol. 6822, 68221J, 2008; D. Alleysson and B. C. de Lavarene, "Frequency selection demosaicking: a review and a look ahead," Proc. SPIE-IS&T Electonic Imaging, Vol. 6822, 68221M, 2008.

Sampling by color filter array (CFA) causes severe aliasing in addition to the aliasing caused by undersampling of many low-cost sensors, e.g., the CCD aperture.

The resolution of a color image reconstructed from the demosaicing method is equal to the physical resolution of a CCD. However, the resolution of an image sensor can be improved by a digital image processing algorithm: super-resolution image reconstruction.

Super-resolution image reconstruction generally increases image resolution without necessitating a change in the design of the optics and/or detectors by using a sequence (or a few snapshots) of low-resolution images. Super-resolution image reconstruction algorithms effectively de-alias undersampled images to obtain a substantially alias-free or, as identified in the literature, a super-resolved image.

When undersampled images have sub-pixel shifts between successive frames, they contain different information regarding the same scene. Super-resolution image reconstruction involves, inter alfa, combining information contained in undersampled images to obtain an alias-free (high-resolution) image. Super-resolution image reconstruction from multiple snapshots, taken by a detector which has shifted in position, provides far more detail information than any interpolated image from a single snapshot.

Methods for super-resolving images that are acquired from CFA sensors are in the following references.

One of these methods is to capture multiple appropriately positioned CFA images that are used to fill in the "holes" in a Bayer pattern, as for example in U.S. Pat. No. 7,218,751, "Generating super resolution digital images," May 15, 2007, A. M. Reed and B. T. Hannigan. Values of the pixels in multiple images which are appropriately aligned to each pixel position are averaged to generate a better value for each pixel position. In this method, in order to produce a useful result, information carried by a digital watermark is used to determine the alignment of the images.

Another type of these methods is called separate approach or two-pass algorithm. The CFA images are first demosaicked and then followed by the application of super-resolution, as for example in U.S. Pat. No. 7,260,277, "Method for obtaining a high-resolution digital image," Aug. 21, 2007, G. Messina, S. Battiato, and M. Mancuso. Each CFA input image is subjected to an interpolation phase to generate a complete low-resolution with three color channels containing three primary colors in RGB format and is thus linearly transformed into a complete low-resolution image in the YCrCb format, where Y represents the luminance component, Cr and Cb represent two chrominance components. After this, a modified back projection super-resolution approach, based in M. Irani and S. Peleg, "Super resolution from image sequence," Proceedings of the 10th International Conference on Pattern Recognition, Vol. 2, pages 115-120, is applied only to the luminance component Y of the multiple images.

The third type of these methods is called joint or one-pass method in which demosaicing and super-resolution algorithms are simultaneously carried for a CFA image sequence, as for example in U.S. Pat. No. 7,515,747, "Method for creating high resolution color image, system for creating high resolution color image and program creating high resolution color image," Apr. 7, 2009, M. Okutomi and T. Goto; U.S. Pat. No. 7,379,612, "Dynamic reconstruction of high-resolution video from color-filtered low-resolution video-to-video super-resolution," May 27, 2008, P. Milanfar, S. Farsiu, and M. Elad. In this method, an observation model is formulated to relate the original high-resolution image to the observed low-resolution images to incorporate color measurements encountered in video sequences. Then, the high-resolution full color image is obtained by solving an inverse problem by minimizing a cost function which is the function of the difference between the estimated low-resolution input images and the measured input images by imposing penalty terms, such as smoothness of chrominance and inter-color dependencies.

There is a need to produce high-resolution three channel full color images from a sequence of low-resolution images captured by a low-cost CFA imaging device that has experienced translations and/or rotations. The amount of sub-pixel translation and/or rotation may be unknown and it creates a need to estimate sub-pixel translation and rotation. In order to produce high-resolution images from a sequence of CFA undersampled (low-resolution) images, there exists a need to eliminate aliasing, while taking into account natural jitter.

SUMMARY OF THE INVENTION

The present invention provides a method and system for the super-resolving images reconstructed from sequences of CFA lower resolution imagery affected by undersampled color filter array sensor.

An embodiment of the present invention utilizes a sequence of undersampled CFA low-resolution images from the same scene with sub-pixel translations and/or rotations among the images to reconstruct an alias-free high-resolution three-channel full color image, or to produce a sequence of such alias-free high-resolution full color frames as in a video sequence. The undersampled CFA low resolution images may be captured in the presence of natural jitter or some kind of controlled motion of the camera. For example, the natural jitter may be the result of a vehicle traveling down a bumpy road or an aircraft experiencing turbulence. The present invention is adaptable to situations where prior knowledge about the high-resolution full color image is unknown, as well when unknown, irregular or uncontrolled sub-pixel translations and/or rotations have occurred among the low-resolution CFA images.

As depicted in FIG. 7, a sequence of original input CFA low resolution images is passed into a transformation parameter estimation algorithm (Box 200). The transformation parameters include translation and rotation values. The Box 210 includes three steps obtaining gross and sub-pixel transformation parameter estimation for the green channel, from which the reconstrcuted green channel sequence is obtained (Box 212), an estimate of the overall shift of each frame with respect to a reference frame in the green channel sequence is obtained (Box 214), and a sub-pixel translation and/or rotation estimation is obtained (Box 216). Since the luminance component in a full color image contains most information and a Bayer color filter array is used in this embodiment, the green channel is chosen as the luminance component for transformation parameter estimation. Because it is important to keep the mosaicing order of the input CFA images, the input images are not aligned with respect to the gross-shift estimates. Rather, both estimated gross and sub-pixel transformation parameters are assigned to the red and blue channel sequences (Box 240 and 250). An error reduction algorithm is applied (Box 260) to the input CFA low resolution images with the estimated gross translations and sub-pixel shifts and/or rotations among images to obtain the high-resolution (alias-free) full color output.

According to a preferred embodiment of the present invention, there is provided a system for improving picture quality of color images by combing the content of a plurality of frames of the same subject; comprising:

at least one processor; the at least one processor comprising a memory for storing a plurality of frames of a subject; the at least one processor operating to combine the content of plurality of frames of the subject into a combined color image by performing:

a process in which at least two multicolored frames are converted to monochromatic predetermined color frames;

a gross shift process in which the gross shift translation of one monochromatic predetermined color frame is determined relative to a reference monochromatic predetermined color frame;

a subpixel shift process utilizing a correlation method to determine the translational and/or rotational differences of one monochromatic predetermined color frame to the reference monochromatic predetermined color frame to estimate sub-pixel shifts and/or rotations between the frames; and an error reduction process to determine whether the resolution of the resulting combined color image is of sufficient resolution; the error reduction process comprising applying at least one spatial frequency domain constraint and at least one spatial domain constraint to the combined color image to produce at least one high-resolution full color image.

FIG. 8 shows an alternative embodiment of this invention. Since all luminance and chrominance channel images contain information from the scene, the transformation parameter estimation is obtained from all three reconstructed color channels. The input CFA images and the estimated gross shifts and sub-pixel shifts and/or rotations of green (Box 310 and 320), red (Box 330 and 340), and blue (Box 350 and 360) channels are input to the error-energy reduction algorithm (Box 370) to generate the high-resolution full color output image.

BRIEF DESCRIPTION OF THE DRAWINGS

The present invention can best be understood when reading the following specification with reference to the accompanying drawings, which are incorporated in and form a part of the specification, illustrate alternate embodiments of the present invention, and together with the description, serve to explain the principles of the invention. In the drawings:

FIG. 1 is an illustration of the Bayer pattern in which for each 2×2 set of pixels, two diagonally opposed pixels have green filters, and the other two pixels have red and blue filters, which is called quincunx sampling pattern.

DETAILED DESCRIPTION OF THE PREFERRED EMBODIMENTS

Figure 2:
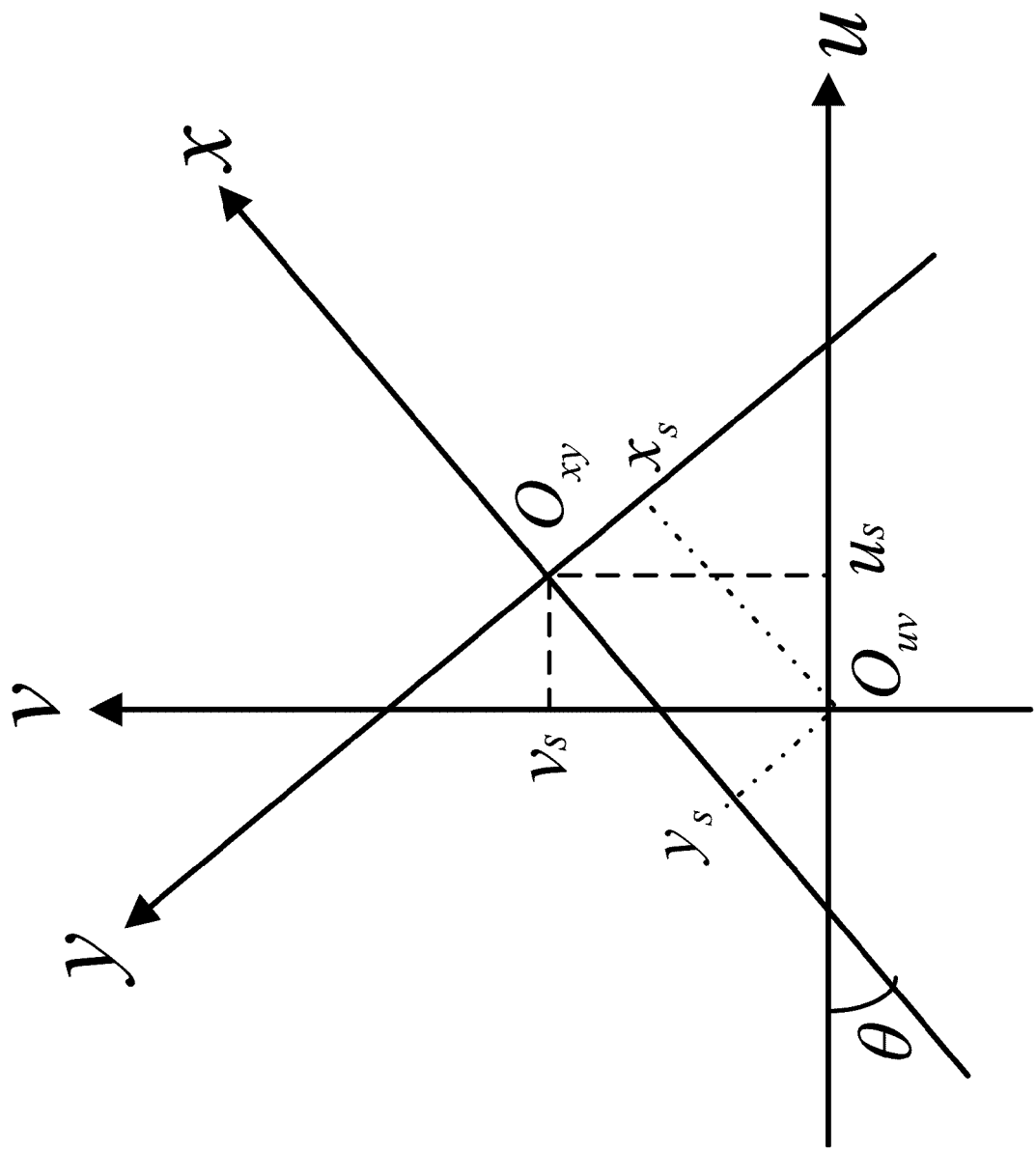
FIG. 2 illustrates a graphic view showing the relationship between two coordinate planes, (u,v) with the origin at $o_{uv}$ and (x,y) with the origin at $o_{xy}$; $\theta$ is the rotation angle, $(x_s, y_s)$ the relative shifts in (x,y) coordinates when u=0 and v=0, $(u_s, v_s)$ the relative shifts in (u,v) coordinates when x=0 and y=0.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 7:
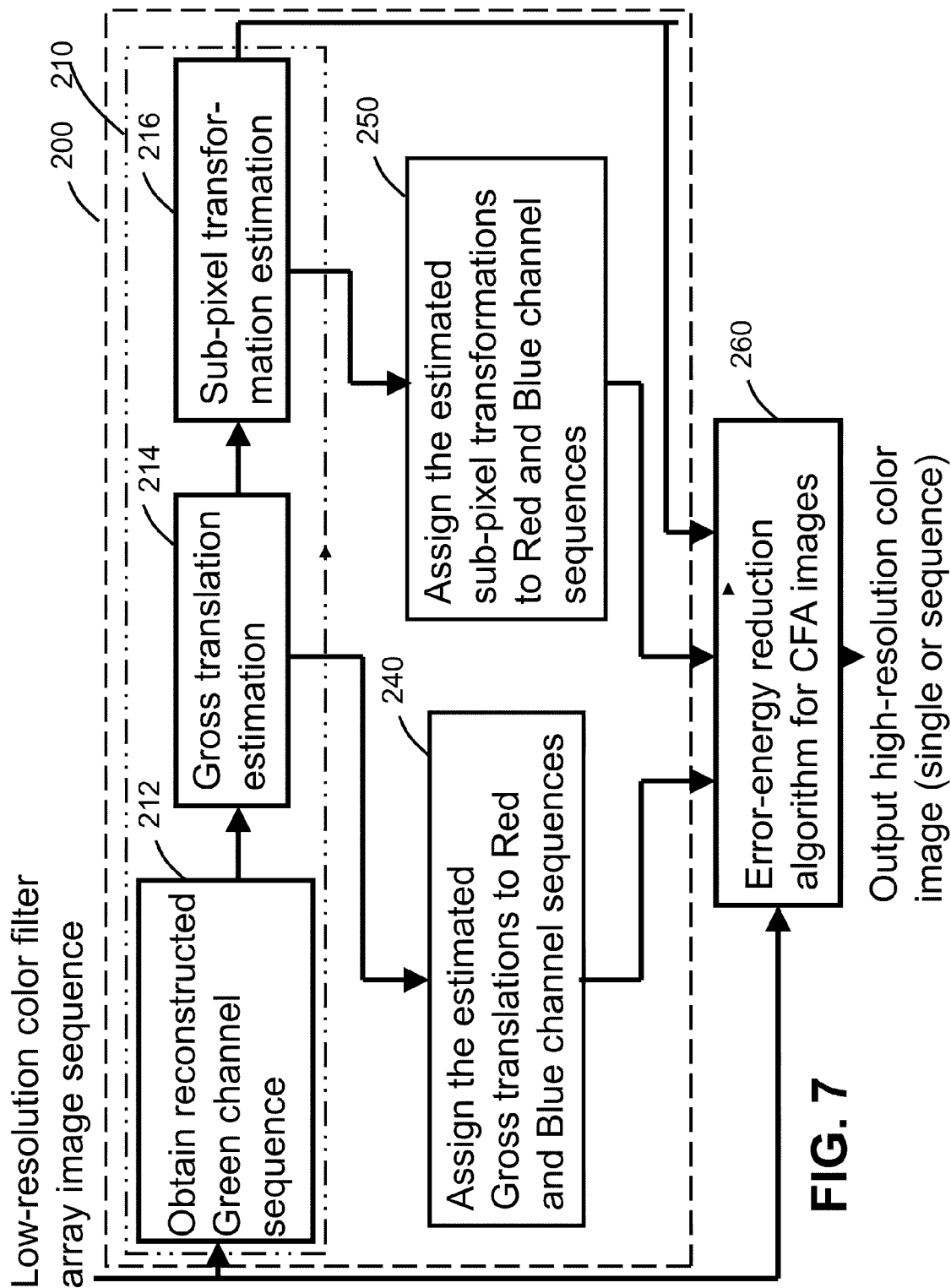
FIG. 7 is an overall schematic representation of an embodiment of the present invention for reconstructing super-resolved full color images from CFA low-resolution sequences whose green channel images are used to estimate gross translations and sub-pixel translations and rotations among frames.

With reference to FIG. 7, components of a preferred embodiment of the present invention include gross translation estimation (Box 214) and sub-pixel transformation estimation (Box 216). Gross translation (or shift) estimates are intended to obtain the overall shift of each image with respect to a reference image.

Sub-pixel transformation, also known as fraction pixel displacement, subpixel shift, or subpixel displacement, is estimated by a variety of methods in both patents and literature. Frame-to-frame motion detection based on gradient decent methods are most commonly used (see: (1) U.S. Pat. No. 5,767,987, "Method and apparatus for combining multiple image scans for enhanced resolution," Jun. 16, 1998, G. J. Wolff and R. J. Van Steenkiste; (2) U.S. Pat. No. 6,650,704, "Method of producing a high quality, high resolution image from a sequence of low quality, low resolution images that are undersampled and subject to jitter," Nov. 18, 2003, R. S. Carlson, J. L. Arnold, and V. G. Feldmus; (3) U.S. Pat. No. 6,285,804, "Resolution improvement from multiple images of a scene containing motion at fractional pixel values," Sep. 4, 2001, R. J. Crinon and M. I. Sezan; (4) U.S. Pat. No. 6,349,154, "Method and arrangement for creating a high-resolution still picture," Feb. 19, 2002, R. P. Kleihorst). One of the variations of these methods is to estimate the velocity vector field measurement based on spatio-temporal image derivative (see U.S. Pat. No. 6,023,535, "Methods and systems for reproducing a high resolution image from sample data," Feb. 8, 2000, S. Aoki). Most of these methods need to calculate matrix inversion or use iterative methods to calculate the motion vectors. Bergen (see U.S. Pat. No. 6,208,765, "method and apparatus for improving image resolution," Mar. 27, 2001, J. R. Bergen) teaches a method to use warp information to obtain sub-pixel displacement. Stone et al (see U.S. Pat. No. 6,628,845, "Method for subpixel registration of images," Sep. 30, 2003, H. S. Stone, M. T. Orchard, E-C Chang, and S. Martucci) teaches another method that is to estimate the phase difference between two images to obtain sub-pixel shifts. In this method, the minimum least square solution has to be obtained to find the linear Fourier phase relationship between two images. U.S. Pat. No. 7,602,997, invented by the inventor herein, utilizes a correlation method without solving the minimum least square problem to explore the translational differences (shifts in x and y domains) of Fourier transforms of two images to estimate sub-pixel shifts between two low resolution aliased images.

Translation and Rotation Estimation

Two image frames of a low-resolution image sequence may be designated $f_1(x,y)$ and $f_2(u,v)$. Because of the conditions under which the frames are acquired, the second image is a shifted and/or rotated version of the first image, that is, $$f_2(u, v) = f_1(x, y) \quad \text{Equation (1A)}$$

$$\begin{bmatrix} u \\ v \end{bmatrix} = \begin{bmatrix} \cos\theta & \sin\theta \\ -\sin\theta & \cos\theta \end{bmatrix} \begin{bmatrix} x - x_s \\ y - y_s \end{bmatrix} \quad \text{Equation (2A)}$$

or $$\begin{bmatrix} u \\ v \end{bmatrix} = \begin{bmatrix} \cos\theta & \sin\theta \\ -\sin\theta & \cos\theta \end{bmatrix} \begin{bmatrix} x \\ y \end{bmatrix} + \begin{bmatrix} u_s \\ v_s \end{bmatrix} \quad \text{Equation (3A)}$$

where (x,y) represent the coordinate plane in the first image, and (u,v) represent the coordinate plane in the shifted and rotated second image, as shown in FIG. 2; $\theta$ is the rotation angle and $(x_s, y_s)$ the relative shifts between $f_1(x,y)$ and $f_2(u,v)$ in (x,y) plane (where u=0 and v=0) and $(u_s, v_s)$ the relative shifts in (u,v) plane (Where x=0 and y=0) (as shown in FIG. 2). The relation between $(x_s, y_s)$ and $(u_s, v_s)$ can be written as:

$$\begin{bmatrix} u_s \\ v_s \end{bmatrix} = \begin{bmatrix} \cos\theta & \sin\theta \\ -\sin\theta & \cos\theta \end{bmatrix} \begin{bmatrix} -x_s \\ -y_s \end{bmatrix} \quad \text{Equation (4A)}$$

If the relative shifts $(u_s, v_s)$ are obtained, the shifts $(x_s, y_s)$ can be obtained. Hereinafter, both $(x_s, y_s)$ and $(u_s, v_s)$ may be used for the relative shifts. The transformation parameters between images including translation (shift) $(x_s, y_s)$ and rotation $\theta$ are estimated using a signal registration method and properties of Fourier transform.

Signal Registration—

The signal registration method is described in the following. Almost all of the transformation parameter estimation methods are based on the signal registration method. It is assumed that the signals to be matched differ only by an unknown translation. In practice, beside translation, there may be rotation, noise, and geometrical distortions. Nevertheless, the signal registration description offers a fundamental solution to the problem. The procedure for pixel-level registration is to first calculate the correlation between two images $f_1(x,y)$ and $f_2(x,y)$ as:

$$r(k, l) = \sum_{n=1}^{N} \sum_{m=1}^{M} R[f_1(n+k-1, m+l-1), f_2(n, m)] \quad \text{Equation (5A)}$$

where $1 \le k \le N$, $1 \le l \le M$ and R is a similarity measure, such as a normalized cross-correlation or an absolute difference function. For the (N−1, M−1) samples of r(k, l), there is a maximum value of $r(x_s, y_s)$, where $(x_s, y_s)$ is the displacement in sampling intervals of $f_2(x,y)$ with respect to $f_1(x,y)$. Many transformation parameter estimation methods are based on the variations of the signal registration.

A signal registration based correlation method is used for translation parameter estimation between two images based on 1) the correlation theorem; and 2) the shift property of Fourier transform. This method begins with the cross-correlation between two images. The terminology "cross-correlation" or "cross correlation" as used herein is a measure of similarity of two frames in terms of a function of one of them. The two-dimensional normalized cross-correlation function measures the similarity for each translation:

$$C(k, l) = \frac{\sum_{n=1}^{N}\sum_{m=1}^{M} f_1(n,m) f_2(n+k-1, m+l-1)}{\sqrt{\sum_{n=1}^{N}\sum_{m=1}^{M} f_2^2(n+k-1, m+l-1)}}$$  Equation (6A)

where $1 \le k \le N$, $1 \le l \le M$ and (N, M) is the dimension of the image. If $f_1(x,y)$ matches $f_2(x,y)$ exactly, except for an intensity scale factor, at a translation of $(x_s, y_s)$, the cross-correlation has its peak at $C(x_s, y_s)$. Various implementations and discussions can be found for example in A. Rosenfeld and A. C. Kak, *Digital Picture Processing*, Vol. II pp. 36-39, Orlando, Fla.: Academic Press, 1982; L. G. Brown, "A survey of image registration techniques," ACM Computing Survey, Vol. 24, No. 4, December 1992, pp. 325-376, both of which are hereby incorporated by reference.

Correlation Theorem—

More efficient signal registration method for translation estimation is using the correlation method in the spatial frequency domain via the Correlation Theorem. The Correlation Theorem states that the Fourier transform of the cross-correlation of two images is the product of the Fourier transform of one image and the complex conjugate of the Fourier transform of the other, that is, $$Q_{12}(K_x, k_y) = \Im[C(x,y)] = F_2(k_x, k_y) \cdot F_1^*(k_x, k_y)$$  Equation (7A)

where $F_1(k_x, k_y)$ and $F_2(k_x, k_y)$ are Fourier transforms of two images, $f_1(x,y)$ and $f_2(x,y)$, respectively, $F_1^*(k_x, k_y)$ is the conjugate of $F_1(k_x, k_y)$.

Fourier Transform Properties—

The properties of Fourier transform are described in the following that include shift property of Fourier transform, polar transformation and polar function mapping, and rotation property of Fourier transform. A Fourier transform is an operation that transforms one complex-valued function of a real variable into a new function. In such applications as image processing, the domain of the original function is typically space and is accordingly called the spatial domain. The domain of the new function is spatial frequency, and so the Fourier transform is often called the spatial frequency domain (or Fourier domain) representation of the original function as it describes which frequencies are present in the original function. As used herein the terminology "Fourier transform" refers both to the frequency domain representation of a function and to the process or formula that "transforms" one function into the other.

Shift Property of Fourier Transform—

Two members of the image sequence are denoted by $f_1(x, y)$ and $f_2(x,y)$. The second image is a shifted version of the first image, such as, $$f_2(x,y) = f_1(x - x_s, y - y_s)$$  Equation (8A)

where $(x_s, y_s)$ are the relative shifts (translational differences) between $f_1(x,y)$ and $f_2(x,y)$. Then, $$F_2(k_x, k_y) = F_1(k_x, k_y) \exp[-j(k_x x_s + k_y y_s)]$$  Equation (9A)

where $F_1(k_x, k_y)$ and $F_2(k_x, k_y)$ are Fourier transforms of two images. Thus, a shift in one domain results in the addition of a linear phase function in the Fourier domain.

Polar Transform and Polar Function Mapping—

The polar transformation of the domain (x,y) for a 2-D signal $f(x,y)$ may be represented by $$f_p(\theta, r) = f(x,y)$$  Equation (10A)

where $$\theta \equiv \arctan\left(\frac{y}{x}\right)$$  Equation (11AA)

and $$r \equiv \sqrt{x^2 + y^2}$$  Equation (11AB)

Note that $f(x,y) \ne f_p(x,y)$. This equation is called the polar function mapping of $f(x,y)$. The polar function mapping of $F(k_x, k_y)$ in the spatial frequency domain may be defined via $$F_p(\phi, \rho) = F(k_x, k_y)$$  Equation (12A)

where $$\phi \equiv \arctan\left(\frac{k_y}{k_x}\right)$$  Equation (13AA)

and $$\rho \equiv \sqrt{k_x^2 + k_y^2}$$  Equations (13AB)

It is noted that $F_p(\cdot, \cdot)$ is not the Fourier transform of $f_p(\cdot, \cdot)$.

Rotation Property of Fourier Transform—

Two members of the image sequence are denoted $f_1(x,y)$ and $f_2(u,v)$, the second image being a rotated version of the first image, $$f_2(u,v) = f_1(x, y)$$  Equation (1A)

$$\begin{bmatrix} u \\ v \end{bmatrix} = \begin{bmatrix} \cos\theta & \sin\theta \\ -\sin\theta & \cos\theta \end{bmatrix} \begin{bmatrix} x \\ y \end{bmatrix}$$  Equation (3A)

where $\theta$ is the relative rotation (rotational differences) between $f_1(x,y)$ and $f_2(u,v)$. Then, $$F_2(k_u, k_v) = F_1(k_x, k_y)$$  Equation (14A)

where $[k_u, k_v]$ and $[k_x, k_y]$ have the following relation, $$\begin{bmatrix} k_u \\ k_v \end{bmatrix} = \begin{bmatrix} \cos\theta & \sin\theta \\ -\sin\theta & \cos\theta \end{bmatrix} \begin{bmatrix} k_x \\ k_y \end{bmatrix}$$  Equation (15A)

Using the polar function mappings of $F_1(k_y, k_y)$ and $F_2(k_u, k_v)$, then $$F_{p2}(\phi, \rho) = F_{p1}(\phi - \theta, \rho)$$  (Equation 16A)

That is, if one image is a rotated version of another image, then the polar function mapping of one is the shifted version of the polar function mapping of the other one in the spatial frequency domain.

Gross Translation Estimation Theory

The gross translation estimation (Box 214, and, alternatively, Boxes 320, 340, 360) is described in the following. The second image can be expressed as a shifted version of the first image, such as, $f_2(u,v)=f_1(x,y)$ Equation (1A)

$$\begin{bmatrix} u \\ v \end{bmatrix} = \begin{bmatrix} x - x_s \\ y - y_s \end{bmatrix} \qquad \text{Equation (17A)}$$

where $(x_s, y_s)$ are the relative shifts (translational differences) between $f_1(x,y)$ and $f_2(u,v)$. The shifts $(x_s, y_s)$ are found according to the Correlation Theorem based on the signal registration method by exploring the translational differences (shifts in x and y domains) of Fourier transforms of two images.

According to the Correlation Theorem, the Fourier transform of the cross-correlation of the two images, $f_1(x,y)$ and $f_2(x,y)$ can be found as follows:

$$Q_{12}(k_x,k_y)=\Im[C(x,y)]=F_2(k_x,k_y)\cdot F_1^*(k_x,k_y) \qquad \text{Equation (7A)}$$

where $F_1(k_x, k_y)$ and $F_2(k_x,k_y)$ are Fourier transforms of two images, $f_1(x,y)$ and $f_2(x,y)$, respectively, $F_1^*(k_x,k_y)$ is the conjugate of $F_1(k_y,k_y)$.

Using the shift property of Fourier transform, the Fourier transform, $F_2(k_x, k_y)$, can be substituted via $$F_2(k_x,k_y)=F_1(k_x,k_y)\exp[-j(k_x x_s+k_y y_s)] \qquad \text{Equation (9A)}$$

Then, the Fourier transform of the cross-correlation of the two images, $f_1(x,y)$ and $f_2(x,y)$, that is, the product of the Fourier transform of one image and the complex conjugate of the Fourier transform of the other, can then be expressed as $$Q_{12}(k_x, k_y) = F_1(k_x, k_y) F_1^*(k_x, k_y) \exp[-j(k_x x_s + k_y y_s)] \qquad \text{Equation (18A)}$$
$$= |F_1(k_x, k_y)| \exp[-j(k_x x_s + k_y y_s)]$$

Then, the shifts $(x_s, y_s)$ are found as the peak of inverse Fourier transform of the cross-correlation, $Q_{12}(k_x,k_y)$.

Translation Estimation with Aliasing Consideration—

Figure 3:
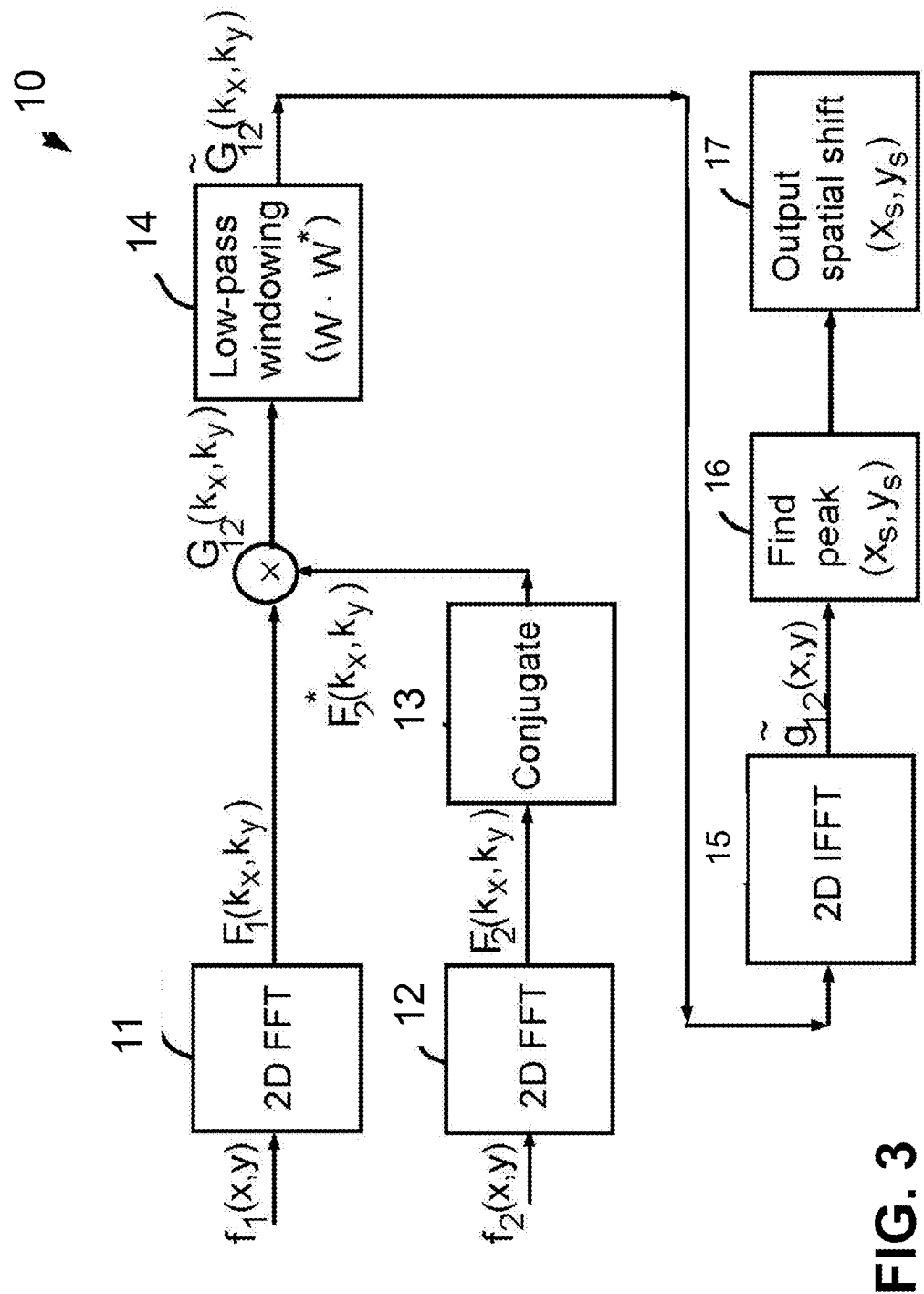
FIG. 3 is a schematic representation of a generalized sequence of computations and/or stages of the computational efficient translation estimation algorithm for two-dimensional images.

Since both images $f_1(x,y)$ and $f_2(u,v)$ are aliased, i.e., the high frequency components are folded into a portion of low frequency components. In general, for an aliased image, the image energy at lower frequency components is stronger than the folded high frequency components. Thus, the signal to aliasing power ratio is relatively high around $(k_x,k_y)\approx(0,0)$. Therefore, a low-pass filtering, W, is applied to the Fourier transforms $F_1(k_x,k_y)$ and $F_2(k_x, k_y)$. A schematic diagram of the computational efficient translation estimation method as described in U.S. Pat. No. 7,602,997, "Method of Super-Resolving Images," filed Jan. 19, 2005, S. S. Young, hereby incorporated by reference, is shown in FIG. 3.

Since the Fourier transform can be computed efficiently with existing, well-tested programs of FFT (fast Fourier transform) (and occasionally in hardware using specialized optics), the use of the FFT becomes most beneficial for cases where the images to be tested are large as described in L. G. Brown, "A survey of image registration techniques," ACM Computing Survey, Vol. 24, No. 4, December 1992, pp. 325-376.

Sub-Pixel Translation Estimation

Translation Estimation with Sub-pixel Accuracy and Aliasing Consideration—

In super-resolution image reconstruction of a preferred embodiment, sub-pixel shifts (or fractional pixel displacements) among the input images are estimated using a method to estimate or calculate frame-to-frame motion within sub-pixel accuracy. In general, the smallest motion that can be obtained from conventional motion estimation is one pixel. Obtaining sub-pixel motion accurately is not straightforward. A method to achieve the sub-pixel accuracy solution has been described in the aforementioned U.S. Pat. No. 7,602,997. This method is based on resampling via frequency domain interpolation by using a Fourier windowing method as described in S. S. Young, "Alias-free image subsampling using Fourier-based windowing methods," Optical Engineering, Vol. 43, No. 4, April 2004, pp. 843-855 (hereby incorporated by reference), called power window.

Figure 4:
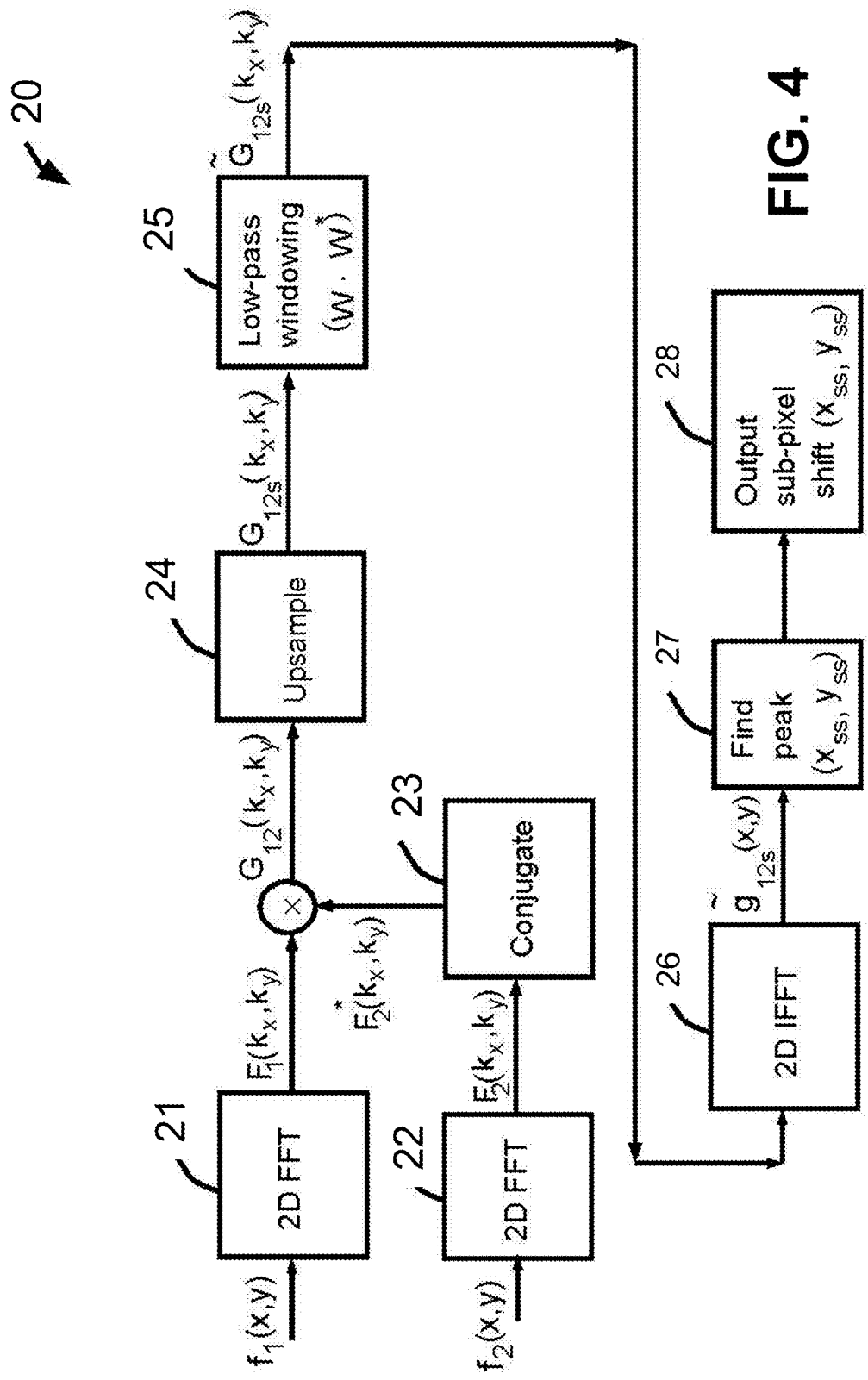
FIG. 4 is a schematic representation of a generalized sequence of computations and/or stages of the computational efficient sub-pixel translation estimation algorithm for two-dimensional images.

Because the low-resolution input images contain aliasing, a low-pass filter is applied to the input images first. A schematic diagram of the computational efficient sub-pixel translation estimation method as described in U.S. Pat. No. 7,602,997 is shown in FIG. 4.

Theory of Translation and Rotation Estimation

The sub-pixel translation and rotational estimation is described in the following. Assuming the second image is a shifted and rotated version of the first image, i.e., $$f_2(u, v) = f_1(x, y) \qquad \text{Equation (1A)}$$

$$\begin{bmatrix} u \\ v \end{bmatrix} = \begin{bmatrix} \cos\theta & \sin\theta \\ -\sin\theta & \cos\theta \end{bmatrix} \begin{bmatrix} x \\ y \end{bmatrix} + \begin{bmatrix} u_s \\ v_s \end{bmatrix} \qquad \text{Equation (3A)}$$

where $\theta$ is the relative rotation and $(u_s, v_s)$ the relative shifts between $f_1(x,y)$ and $f_2(u,v)$.

From the shift property of Fourier transform of these images, the following relation is derived:

$$F_2(k_u,k_v)=F_1(k_x,k_y)\cdot\exp[-j(k_u u_s+k_v v_s)] \qquad \text{Equation (9A)}$$

where $F_2(k_u,k_v)$ and $F_1(k_x,k_y)$ are the Fourier transforms of the two images, and the $(k_u,k_v)$ domain is the rotated version of the $(k_x,k_y)$ domain; that is, $$\begin{bmatrix} k_u \\ k_v \end{bmatrix} = \begin{bmatrix} \cos\theta & \sin\theta \\ -\sin\theta & \cos\theta \end{bmatrix} \begin{bmatrix} k_x \\ k_y \end{bmatrix} \qquad \text{Equation (15A)}$$

Figure 5:
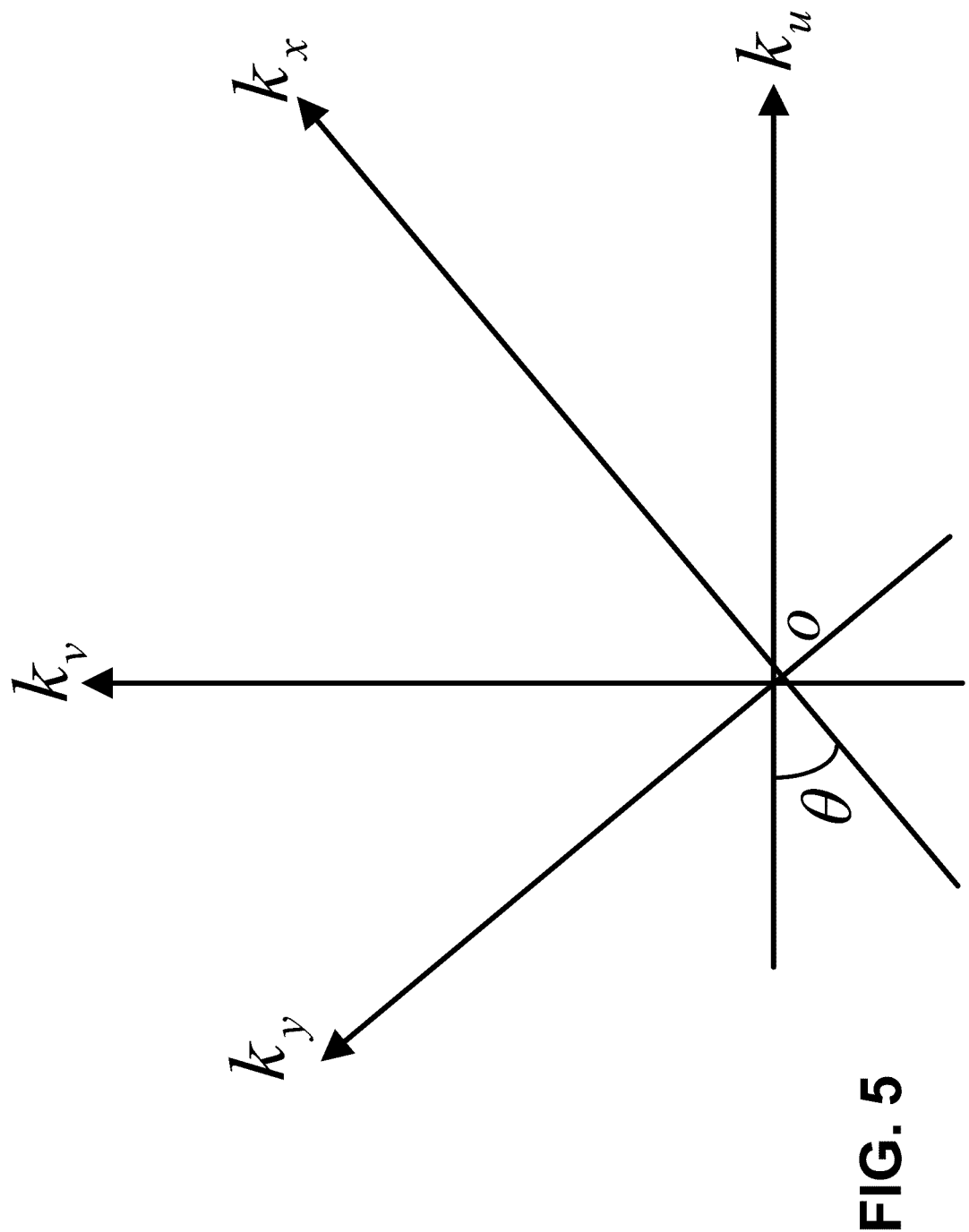
FIG. 5 illustrates a graphic view showing the relationship between two coordinate planes, $(k_u, k_v)$ and $(k_x, k_y)$ in the spatial frequency domain in which the corresponding two origins coincide at o.

FIG. 5 shows the transformation of the two coordinates, $(k_u, k_v)$ and $(k_x,k_y)$, in the spatial frequency domain in which the corresponding two origins coincide.

Then from the polar transformation, the rotation and shift properties of Fourier transform as described previously, the polar function mappings (see operation in Equation 12A) of the 2-D Fourier transforms of the two images are related by $$F_{p2}(\phi,\rho)=F_{p1}(\phi-\theta,\rho)\cdot\exp[-j(k_u u_s+k_v v_s)] \qquad \text{Equation (19A)}$$

Thus, for their magnitudes we have, $$|F_{p2}(\phi,\rho)|=|F_{p1}(\phi-\theta,\rho)| \qquad \text{Equation (20A)}$$

That is, if one image is a rotated and shifted version of the other image, then the magnitude of polar function mapping of one is the shifted version of the magnitude of polar function mapping of the other one in the spatial frequency domain.

Note the difference between Equation (20A) and Equation (16A). One image is represented as a rotated version of the other image in Equation (16A), while one image is represented as a rotated and shifted version of the other image in Equation (20A).

Therefore, the rotation angle difference $\theta$ is represented as a translational difference using the polar transformation and polar function mapping of Fourier transform. Using the correlation method, the rotation angle between the two images is estimated in a manner similar to the translation estimation.

The rotation estimation is described in the following in detail. Because the rotation difference is only represented in the first domain of the Fourier transform, the rotation angle θ is found as the peak of inverse of the marginal 1-D Fourier transform of the cross-correlation with respect to φ. The marginal 1-D Fourier transform is an operation of performing the one-dimensional Fourier transform of a 2-D function f(x,y) with respect to one of the variables, x or y.

The marginal 1-D Fourier transform of the cross-correlation with respect to φ between the two images is defined as:

$$Q_{p12}(k_\phi,\rho)=\Im_{p2}(k_\phi,\rho)\cdot\Im_{p1}^*(k_\phi,\rho)$$  Equation (21A)

where $\Im_{p1}(k_\phi, \rho)$ and $\Im_{p2}(k_\phi, \rho)$ are the marginal 1-D Fourier transforms with respect to φ for the two images $|F_{p1}(\phi, \rho)|$ and $|F_{p2}(\phi, \rho)|$ (as defined in Equation 12A), respectively, and $\Im_{p1}^*(k_\phi, \rho)$ is the complex conjugate of $\Im_{p1}(k_\phi, \rho)$ After the rotation angle is estimated, the second image is rotated back by the angle −θ to form the backward rotated image $f_{2\theta}(x,y)$. Then the shifts $(x_s, y_s)$ between the two images are estimated between $f_{2\theta}(x,y)$ and $f_1(x,y)$ according to the correlation method based on the Correlation Theorem and the shift property of Fourier transform as discussed previously.

Sub-Pixel Rotation and Translation Estimation

Rotation and Translation Estimation with Sub-pixel Accuracy—

Similar as in the translation estimation with sub-pixel accuracy, the rotation estimation with sub-pixel accuracy is achieved by resampling via frequency domain interpolation. However, the resampling operation is only performed in the φ domain (as defined in Equation 13A) since the rotation angle is the only parameter to be estimated. The subsequent sub-pixel translation estimation, $(x_s, y_s)$ between the backward rotated image $f_{2\theta}(x,y)$ and the first image $f_1(x,y)$, is achieved by resampling for both $k_x$ and $k_y$ domains via frequency domain interpolation (see FIG. 5).

Rotation with Aliasing Consideration

The common center area of the two images $f_1(x,y)$ and $f_2(u,v)$ contributes most to the rotation angle estimation. A radially symmetrical window is applied to both images to emphasize the center common region between the two images. This radially symmetrical window is also designed as a low-pass filter to achieve accurate rotation estimation by filtering out the aliased high frequency components in the input images. As mentioned previously, the terminology aliased refers to the high frequency components folded into a portion of low frequency components. In general, for an aliased image, the image energy at lower frequency components is stronger than the folded high frequency components. Thus, the signal to aliasing power ratio is relatively high around $(k_x,k_y)\approx(0,0)$.

The radially symmetrical and low-pass window, W, is applied to the Fourier transforms $F_1(k_x,k_y)$ and $F_2(k_u,k_v)$ in the first step of the rotation estimation procedure, that is, $$\tilde{F}_1(k_x,k_y)=F_1(k_x,k_y)\cdot W(k_x,k_y)$$  Equation (22AA)

$$\tilde{F}_2(k_u,k_v)=F_2(k_u,k_v)\cdot W(k_u,k_v)$$  Equation (22AB)

Sub-Pixel Rotation and Translation Estimation Procedure

A procedure to estimate translation and rotation parameters with sub-pixel accuracy between two images, $f_1(x,y)$ and $f_2(u,v)$, is summarized in the following.

Figure 6:
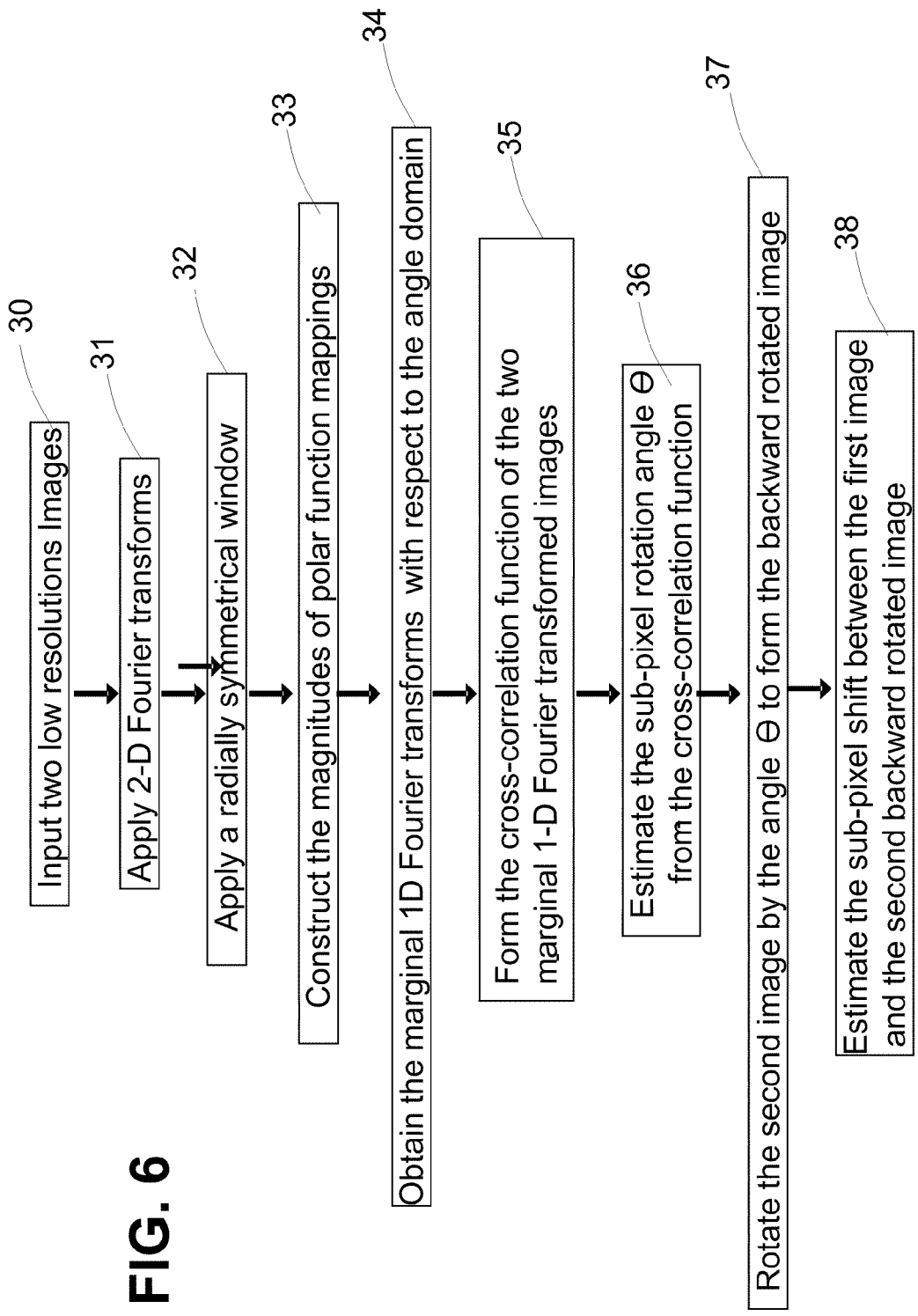
FIG. 6 is a schematic diagram of a generalized sequence of steps representing an algorithm for estimating translation and rotation transformation parameters.

FIG. 6 shows a schematic representation of this estimating algorithm, which may comprise:

1) Input two low-resolution images $f_1(x,y)$ and $f_2(u,v)$ (Box 30).
2) Obtain the 2-D Fourier transforms of the two images, $F_1(k_x,k_y)$ and $F_2(k_u,k_v)$ (Box 31).
3) Apply a radially symmetrical window W to the Fourier transforms of the two images to obtain $\tilde{F}_1(k_x,k_y)$ and $\tilde{F}_2(k_u, k_v)$ (Box 32), see Equation (22AA)-(22AB).
4) Construct the magnitudes of the polar function mappings of the two windowed images, $|F_{P1}(\phi,\rho)|$ and $|F_{P2}(\phi,\rho)|$ (Box 33), as defined in Equation (12A).
5) Obtain the marginal 1-D Fourier transforms with respect to φ for the magnitude of the two polar function mappings, $\Im_{P1}(k_\phi, \rho)$ and $\Im_{P2}(k_\phi, \rho)$ (Box 34).
6) Form the cross-correlation function of the two images, $\Im_{P1}(k_\phi,\rho)$ and $\Im_{P2}(k_\phi,\rho)$, to obtain $Q_{P12}(k_\phi, \rho)$ (Box 35), see Equation (21A).
7) Estimate the rotation angle θ between two images $f_1(x,y)$ and $f_2(u,v)$ with sub-pixel accuracy from the cross-correlation function $Q_{P12}(k_\phi, \rho)$ (Box 36).
8) Rotate the second image by the angle −θ to form the backward rotated image $f_{2\theta}(x,y)$ (Box 37).
9) Estimate the relative shift between $f_{2\theta}(x,y)$ and $f_1(x,y)$ with sub-pixel accuracy to obtain the relative shifts $(x_s, y_s)$ (Box 38).

Example of Sub-Pixel Rotation and Translation

An illustration of translation and rotation estimation with sub-pixel accuracy is shown in FIGS. 7a, 7b, 8, and 9 of application Ser. No. 12/576,132. In the featured example, a high-resolution forward looking infrared (FLIR) image was used to simulate a sequence of low-resolution undersampled images with translations and rotations.

Figure 8:
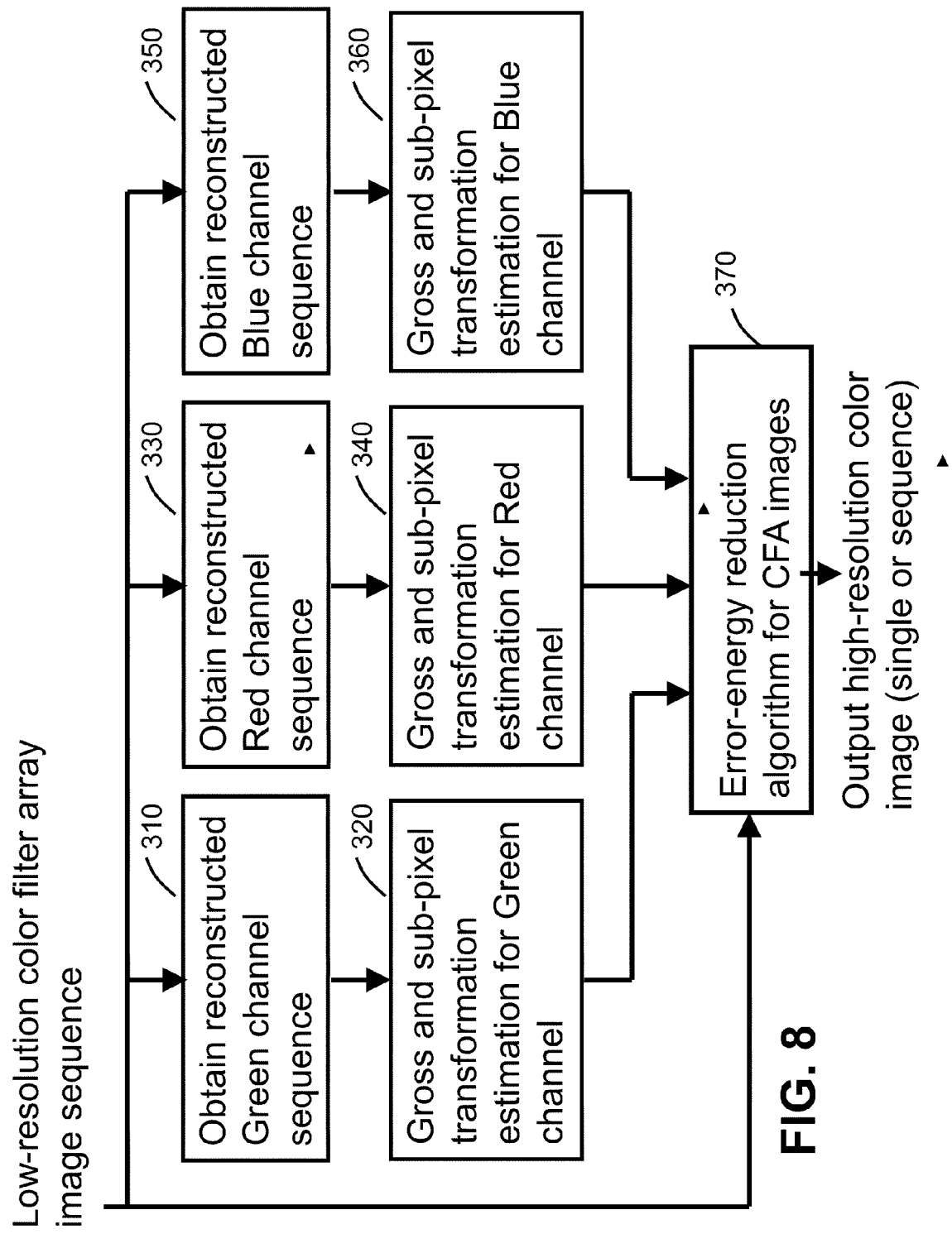
FIG. 8 is an overall schematic representation of alternative embodiment of the present invention for reconstructing super-resolved full color images from CFA low-resolution sequences whose green, red, and blue channel images are used to estimate gross translations and sub-pixel translations and rotations among frames.

An original FLIR tank image is shown in FIG. 7a of application Ser. No. 12/576,132. The size of this image is 40×76. First, we up-sample this image using the Fourier windowing method by a factor of 30 to obtain a simulated high-resolution image with a size of 1200×2280 as shown in FIG. 7b of application Ser. No. 12/576,132. Then the low-resolution images are generated from this simulated high-resolution image by sub-sampling and rotating. The randomly selected translation and rotation parameters for six of each low-resolution image are listed as follows:

$x_s$=[0 3.1 7.7 12.3 14.1 17.3];
$y_s$=[0 2.3 8.5 11.2 15.2 16.8];
θ=[0 14.4 15.6 17.8 19.1 22.7];

The units of $x_s$ and $y_s$ are pixels and the unit of θ is degrees. FIG. 8 of application Ser. No. 12/576,132 shows six simulated low-resolution images with shifts and rotates among them.

Figure 9:
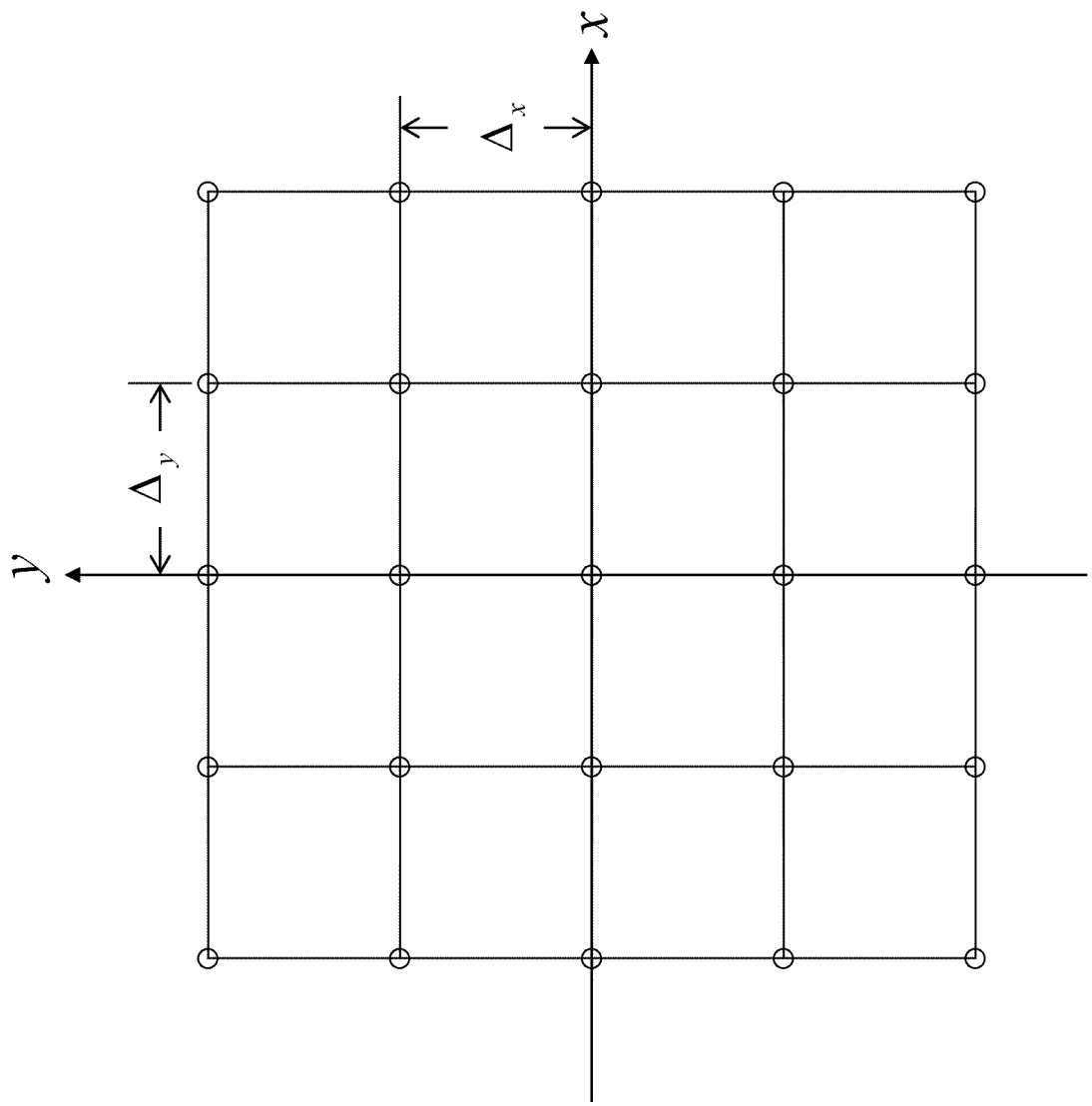
FIG. 9 illustrates a graphic view showing the rectangular sampling grid.

After applying the correlation method for sub-pixel shift and rotation estimation to these 6 simulated low-resolution images, the sub-pixel shift and rotation values are obtained. The estimated sub-pixel shift and rotation values are all correct according to the actual values. FIG. 9 of application Ser. No. 12/576,132 shows the transformation of the plane of one image (image 6) into the target domain of the reference image (image 1).

FIG. 7 is an overall schematic representation of a preferred embodiment of the present invention. A sequence of original input CFA low resolution images is passed into a transformation (including translation and rotation) parameter estimation algorithm (Box 200) that includes obtaining gross and sub-pixel transformation parameter estimation algorithm (Box 210) for the green channel, from which the reconstructed green channel sequence is obtained (Box 212), an estimate of the overall shift of each frame with respect to a reference frame in the green channel sequence is obtained (Box 214), and a sub-pixel translation and rotation estimation algorithm (Box 216). Since the luminance component in a full color image contains most information and a Bayer color filter array is used in this embodiment, the green channel is chosen as the luminance component for transformation parameter estimation. Because it is important to keep the mosaicing order of the input CFA images, the input images are not aligned with respect to the gross-shift estimates. Rather, both estimated gross and sub-pixel transformation parameters are assigned to the red and blue channel sequences (Box 240 and 250).

The method of acquiring a sequence of images in super-resolution image reconstruction in this embodiment may involve non-controlled sub-pixel translations and rotations; e.g. natural jitter. This can be more cost effective and more practical than the controlled sub-pixel translation and rotation image acquisition. In many applications, the imager may be carried by a moving platform or the object itself may be moving. In military reconnaissance situations, the moving platform may be a person, an unmanned ground vehicle (UGV), or an unmanned aerial vehicle (UAV) flying in a circular motion or a forward motion. As a result, acquired images may contain sub-pixel translations and/or rotations. During the process of super-resolution image reconstruction, after multiple sub-pixel translated and/or rotated CFA images are obtained, they are then combined to reconstruct the high-resolution full color image by projecting low-resolution CFA images onto three high-resolution grids representing red, green, and blue channels, respectively. Each grid is of a finer sampled grid than the CFA lower resolution grid. The sub-pixel translations and rotations found in images resulting from natural jitter pose a need for accurate estimation.

In Box 200 of FIG. 7, the gross translations and the sub-pixel translations and rotations are obtained for each color channel sequence. In Box 260 of FIG. 7, an error reduction algorithm is applied to the input CFA low resolution images with the estimated gross shifts and sub-pixel shifts and/or rotations among images to obtain the high-resolution (alias-free) full color output. The output may be either a single high-resolution full color image that is generated from a sequence of CFA low-resolution images or a sequence of high-resolution full color images that are generated from multiple sequences of CFA low-resolution images.

The procedure of obtaining the reconstructed green channel image (Box 212) is first described in the following.

Fourier Domain Reconstructing from Incomplete Sampled Data Based on Spectral Propertiess of Rectangular and Hexagonal Sampling Green Channel Candidate—

One important step in super-resolution is to accurately estimate sub-pixel shifts and rotations among low-resolution images. Since the undersampled CFA images are captured either by natural jitter or some kind of controlled motion of the camera, the images of successive frames contain not only the sub-pixel shifts but also the integer pixel shifts.

Because CFA images contain severe aliasing, using the direct raw input images does not give accurate shift estimation. Using low-pass filtered version of the input images is a better choice because the low-frequency spectrum is less corrupted by aliasing.

In general, it was found in K. A. Prabhu and A. N. Netravali, "Motion compensated component color coding," IEEE Trans. Communications, Vol. COM-30, pp. 2519-2527, December 1982; R. C. Tom and A. K. Katsaggelos, "Resolution enhancement of monochrome and color video using motion compensation," IEEE Trans. Image Processing, Vol. 10, No. 2, February 2001; U.S. Pat. No. 7,515,747, "Method for creating high resolution color image, system for creating high resolution color image and program creating high resolution color image," Apr. 7, 2009, M. Okutomi and T. Goto, that it was sufficient to estimate the motion field of a color sequence based on the luminance component only. Since a Bayer color filter array is used in this embodiment, the green channel is chosen as the luminance component for transformation parameter estimation. However, when the other CFAs are used, the luminance channel is chosen based on that CFA to be used.

The green channel in the Bayer pattern is sampled using a hexagonal sampling pattern. Obtaining the reconstructed green signal is equivalent to the process of reconstructing the original green signal at each pixel location from hexagonal sampled green signal in the Bayer pattern. Before describing the hexagonal sampling, we describe the properties of a more common sampling pattern, rectangular sampling.

Two-Dimensional Rectangular Sampling—

Let $f_\delta(x,y)$ be a two-dimensional delta-sampled signal of an arbitrary signal, $f(x,y)$:

$$f_\delta(x, y) = f(x, y) \sum_{m=-\infty}^{\infty} \sum_{n=-\infty}^{\infty} \delta(x - m\Delta_x, y - n\Delta_y)$$

$$= \sum_{m=-\infty}^{\infty} \sum_{n=-\infty}^{\infty} f(x_m, y_n)\delta(x - x_m, y - y_n)$$

where $x_m = m\Delta_x$ and $y_n = n\Delta_y$, $\Delta_x$ and $\Delta_y$ are the sample spacings in the spatial x and y domain respectively. Then, the Fourier transform of the delta-sampled signal, $F_\delta(k_x, k_y)$, is composed of repeated versions of the Fourier transform of the continuous signal $F(k_x, k_y)$, that is, $$F_\delta(k_x, k_y) = \frac{1}{\Delta_x \Delta_y} \sum_{m=-\infty}^{\infty} \sum_{n=-\infty}^{\infty} F\left(k_x - \frac{2\pi m}{\Delta_x}, k_y - \frac{2\pi n}{\Delta_y}\right)$$

Figure 10:
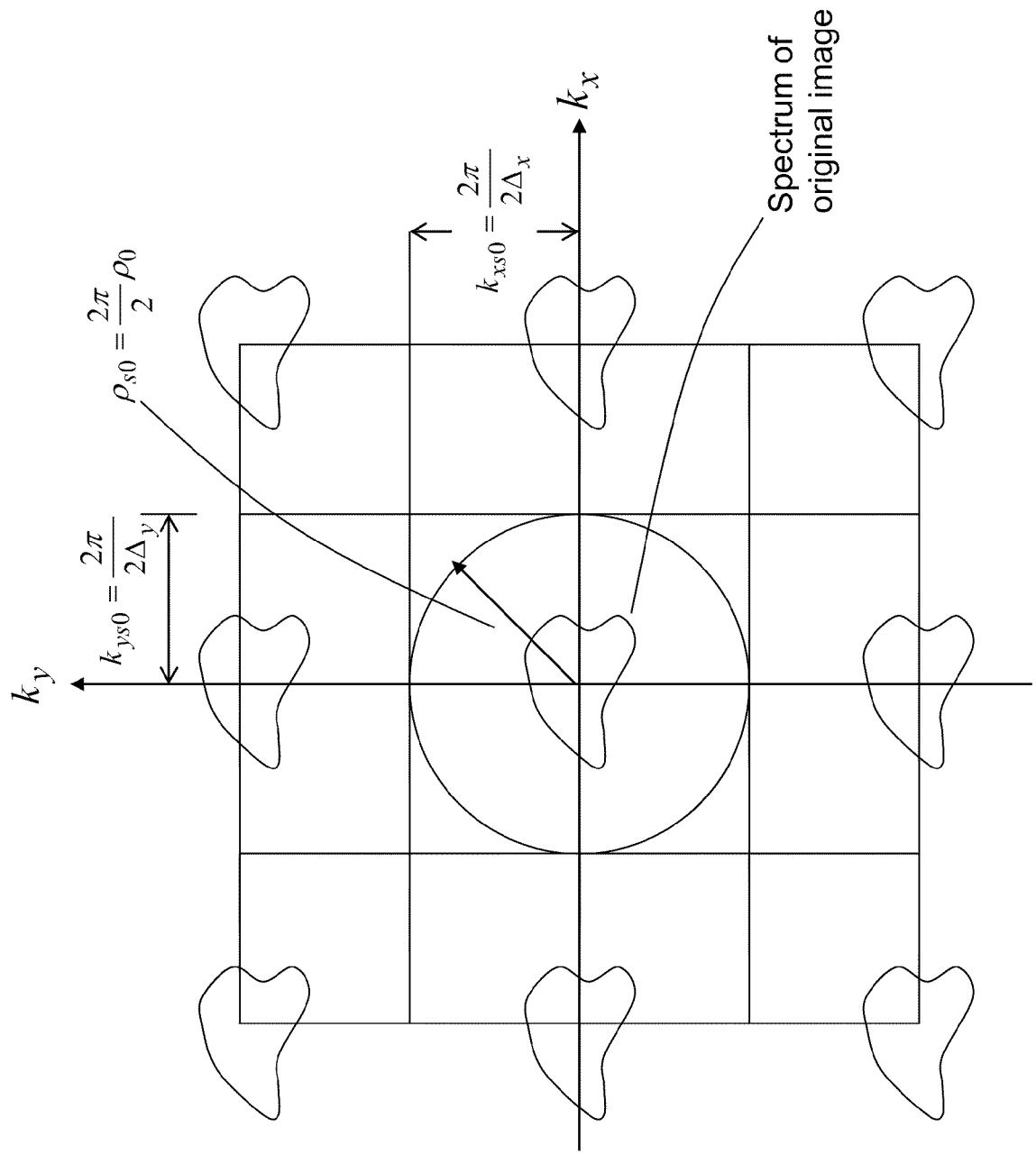
FIG. 10 illustrates a graphic view showing the rectangular sampled spectrum.

The repeated positions of this Fourier transform are at $$\left(\frac{2\pi m}{\Delta_x}, \frac{2\pi n}{\Delta_y}\right)$$

for $m=(-\infty, \infty)$ and $n=(-\infty, \infty)$. Thus, provided that $F(k_x, k_y)$ has a finite support in the spatial frequency domain, for example, $$F(k_x, k_y) = 0 \text{ for } |k_x| \geq \frac{k_{x0}}{2} \ \& \ |k_y| \geq \frac{k_{y0}}{2},$$

where $$k_{x0} = \frac{2\pi}{\Delta_x} \text{ and } k_{y0} = \frac{2\pi}{\Delta_y},$$

then $f(x,y)$ can be recovered from $f_\delta(x,y)$ via lowpass filter in the frequency domain. FIG. 9 illustrates a 2-D rectangular sampling grid. FIG. 10 illustrates the Fourier transform of $F_\delta(k_x, k_y)$, which is the repeated version of the continuous signal $F(k_x, k_y)$. The cutoff frequency in spatial frequency domain is $$k_{xs0} = \frac{2\pi}{2\Delta_x} \text{ and } k_{ys0} = \frac{2\pi}{2\Delta_y}$$

as shown in FIG. 10. The cutoff frequency in radial spatial frequency domain is $$\rho_{s0} = \frac{2\pi}{2}\rho_0$$

Where $\rho(k_x, k_y) = \sqrt{k_x^2 + k_y^2}$, $\rho_0 = \sqrt{(1/\Delta_x)^2 + (1/\Delta_y)^2}$.

Spectral Properties of CFA Blue and Red Channel with Two-Dimensional Rectangular Sampling—

For CFA blue or red channel, it is a two-dimensional rectangular sampling. However, if the sampling spaces of the CFA pattern in x and y domains are $\Delta_x$ and $\Delta_y$, respectively, the sampling spaces of blue or red channel are $\Delta_{x,C} = 2\Delta_x$ and $\Delta_{y,C} = 2\Delta_y$, where C is for red or blue. Therefore, the cutoff frequency for red or blue channel is $$k_{xs0,C} = \frac{2\pi}{4\Delta_x} \text{ and } k_{ys0,C} = \frac{2\pi}{4\Delta_y}$$

in spatial frequency domain, $$\rho_{s0,C} = \frac{2\pi}{4}\rho_0$$

in radial spatial frequency domain.

Two-Dimensional Hexagonal Sampling—

Figure 1:
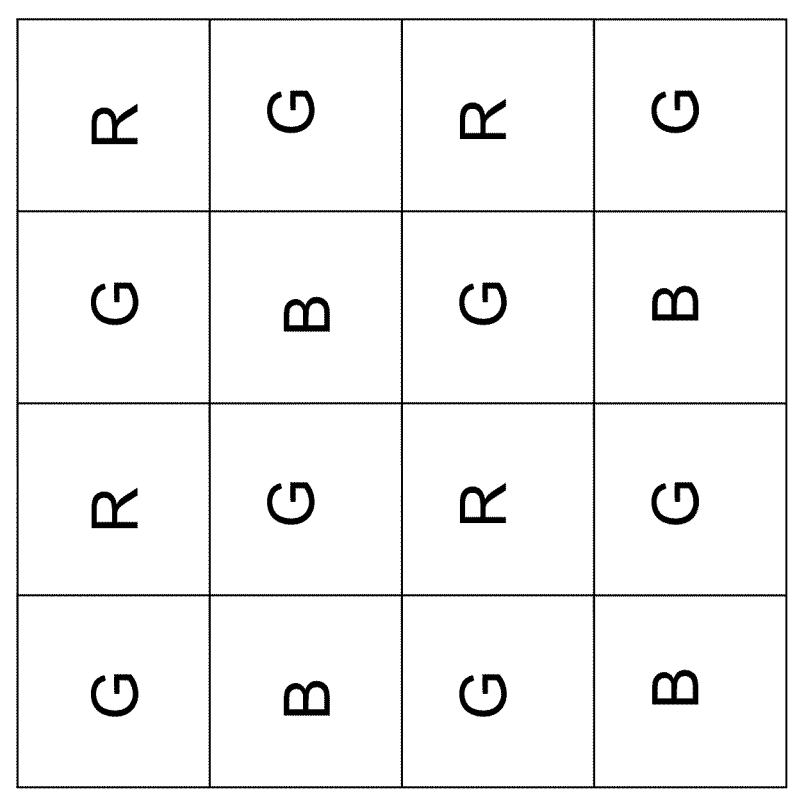
Figure 11:
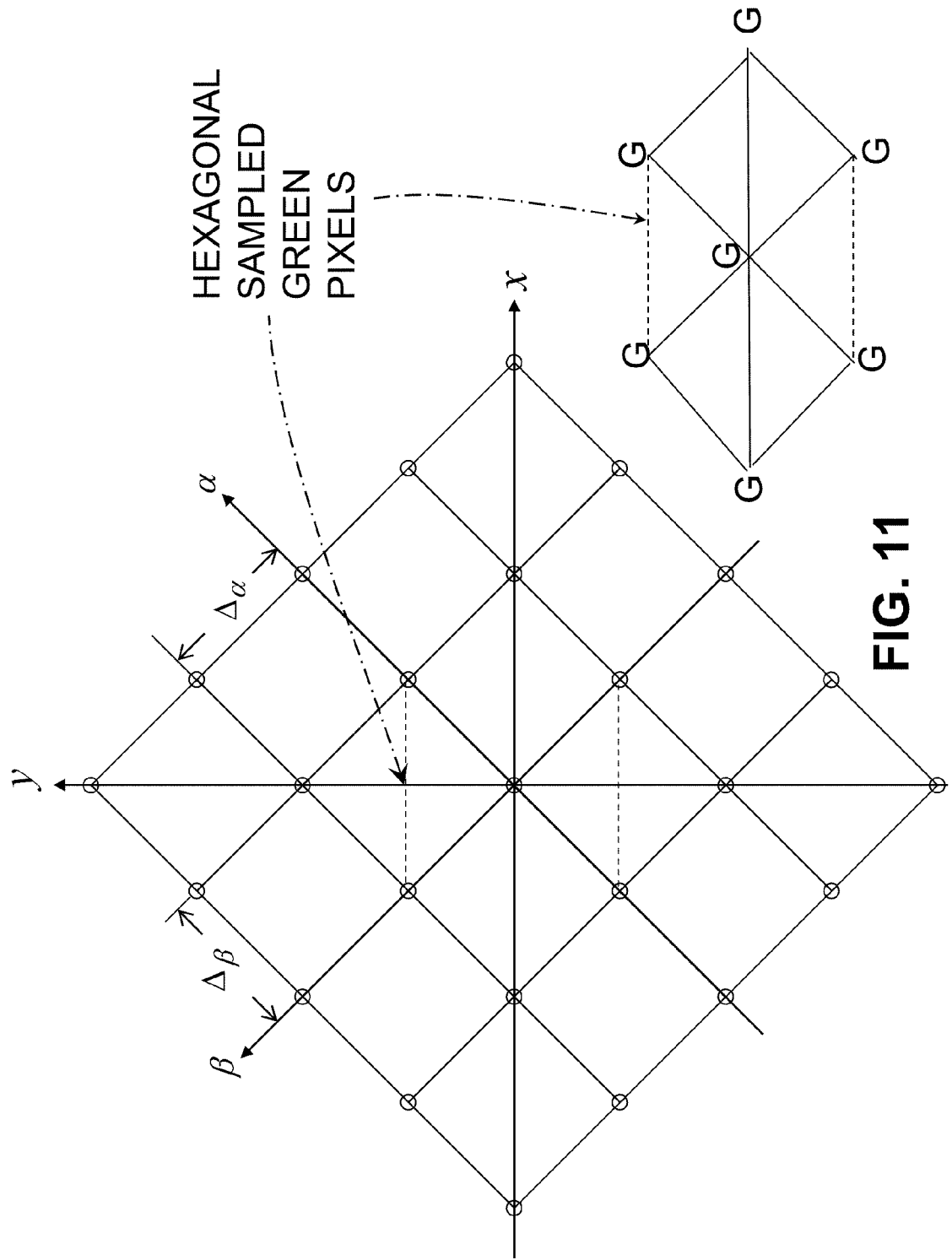
FIG. 11 illustrates a graphic view showing the hexagonal sampling grid.

As used herein the terminology "hexagonal sampling" is depicted in the insert in FIG. 11; and refers to the pattern formed by replacing the red and blue pixels (in the Bayer pattern shown in FIG. 1) with zero values.

As discussed in M. Soumekh, Fourier Array Imaging, Prentice Hall, 1994, pp. 167-177, the hexagonal sampling has the following linear transformation:

$$\begin{bmatrix} \alpha \\ \beta \end{bmatrix} = \begin{bmatrix} T_1(x, y) \\ T_2(x, y) \end{bmatrix} = \begin{bmatrix} ax + by \\ cx + dy \end{bmatrix}$$

Note that rectangular sampling corresponds to the case of b=c=0. The inverse of the hexagonal transformation is also linear, that is, $$\begin{bmatrix} x \\ y \end{bmatrix} = \begin{bmatrix} A\alpha + B\beta \\ C\alpha + D\beta \end{bmatrix}$$

The Jacobian of the hexagonal transformation is $$\left| \frac{\partial(\alpha, \beta)}{\partial(x, y)} \right| = |T'(x, y)| = |ad - bc|$$

Next, define $$g(\alpha, \beta) = f(x, y)$$

or, equivalently $$g[T_1(x,y), T_2(x,y)] = f(x,y)$$

It is assumed that the imaging system provides evenly spaced samples of $g(\alpha, \beta)$ in the $(\alpha, \beta)$ measurement domain, for example, $\alpha_m = m\Delta_\alpha$ and $\beta_n = n\Delta_\beta$. Our task is to reconstruct the function $f(x, y)$ from the available samples at $(x_{mn}, y_{mn})$, where $$\alpha_m = m\Delta_\alpha = T_1(x_{mn}, y_{mn})$$

$$\beta_n = n\Delta_\beta = T_2(x_{mn}, y_{mn})$$

It is shown following in M. Soumekh, Fourier Array Imaging, Prentice Hall, 1994, pp. 167-177, $$\delta(x - x_m, y - y_n) = |T'(x,y)|\delta(\alpha - \alpha_m, \beta - \beta_n).$$

The delta-sampled signal is defined via $$f_\delta(x, y) = f(x, y) \sum_{m=-\infty}^{\infty} \sum_{n=-\infty}^{\infty} \delta(x - m\Delta_x, y - n\Delta_y)$$

$$= \sum_{m=-\infty}^{\infty} \sum_{n=-\infty}^{\infty} f(x_m, y_n)\delta(x - x_m, y - y_n)$$

Using above equation, $f_\delta(x,y)$ is rewritten as follows:

$$f_\delta(x, y) = f(x, y)|T'(x, y)| \sum_{m=-\infty}^{\infty} \sum_{n=-\infty}^{\infty} \delta[T_1(x, y) - m\Delta_\alpha, T_2(x, y) - n\Delta_\beta]$$

Then, the Fourier transform of the delta-sampled signal, $F_\delta(k_x, k_y)$, is composed of repeated versions of the Fourier transform of the continuous signal $F(k_x, k_y)$, that is, $$F_\delta(k_x, k_y) = \frac{1}{\Delta_x \Delta_y} \sum_{m=-\infty}^{\infty} \sum_{n=-\infty}^{\infty} F\left[k_x - \frac{2\pi m}{\Delta_\alpha}T_1(x, y), k_y - \frac{2\pi n}{\Delta_\beta}T_2(x, y)\right]$$

Using $T_1(x,y) = ax + by$ and $T_2(x,y) = cx + dy$, the above equation can be rewritten as:

$$F_\delta(k_x, k_y) = \frac{1}{\Delta_x \Delta_y} \sum_{m=-\infty}^{\infty} \sum_{n=-\infty}^{\infty} F[k_x - k_{xmn}, k_y - k_{ymn}]$$

where $$k_{xmn} = \frac{2\pi ma}{\Delta_\alpha} + \frac{2\pi nc}{\Delta_\beta} \text{ and } k_{ymn} = \frac{2\pi mb}{\Delta_\alpha} + \frac{2\pi nd}{\Delta_\beta}.$$

The repeated positions of this Fourier transform are at $(k_{xmn}, k_{ymn})$ for $m = (-\infty, \infty)$ and $n = (-\infty, \infty)$.

Spectral Property of CFA Green Channel with Two-Dimensional Hexagonal Sampling—

In the case of CFA green channel, the hexagonal sampling has the following linear transformation:

$$\begin{bmatrix} \alpha \\ \beta \end{bmatrix} = \begin{bmatrix} T_1(x, y) \\ T_2(x, y) \end{bmatrix} = \begin{bmatrix} ax + by \\ cx + dy \end{bmatrix} = \begin{bmatrix} 1 & 1 \\ -1 & 1 \end{bmatrix} \begin{bmatrix} x \\ y \end{bmatrix}.$$

That is, a=1, b=1, c=−1, and d=1. FIG. 11 illustrates the relationship between two coordinate planes, $(\alpha, \beta)$ and $(x, y)$. Let the sampling spaces in $(x,y)$ plane be $\Delta_x = 1$ and $\Delta_y = 1$, then the sampling spaces in ($\alpha$, $\beta$) plane are $\Delta_\alpha=\sqrt{2}$ and $\Delta_\beta\sqrt{2}$. The repeated positions of the Fourier transform $F_\delta(k_x,k_y)$ are at $$(k_{xmn}, k_{ymn}) = \left(\frac{2\pi m}{\sqrt{2}} - \frac{2\pi n}{\sqrt{2}}, \frac{2\pi m}{\sqrt{2}} + \frac{2\pi n}{\sqrt{2}}\right)$$

for m=(−∞, ∞) and n=(−∞, ∞).

Figure 12:
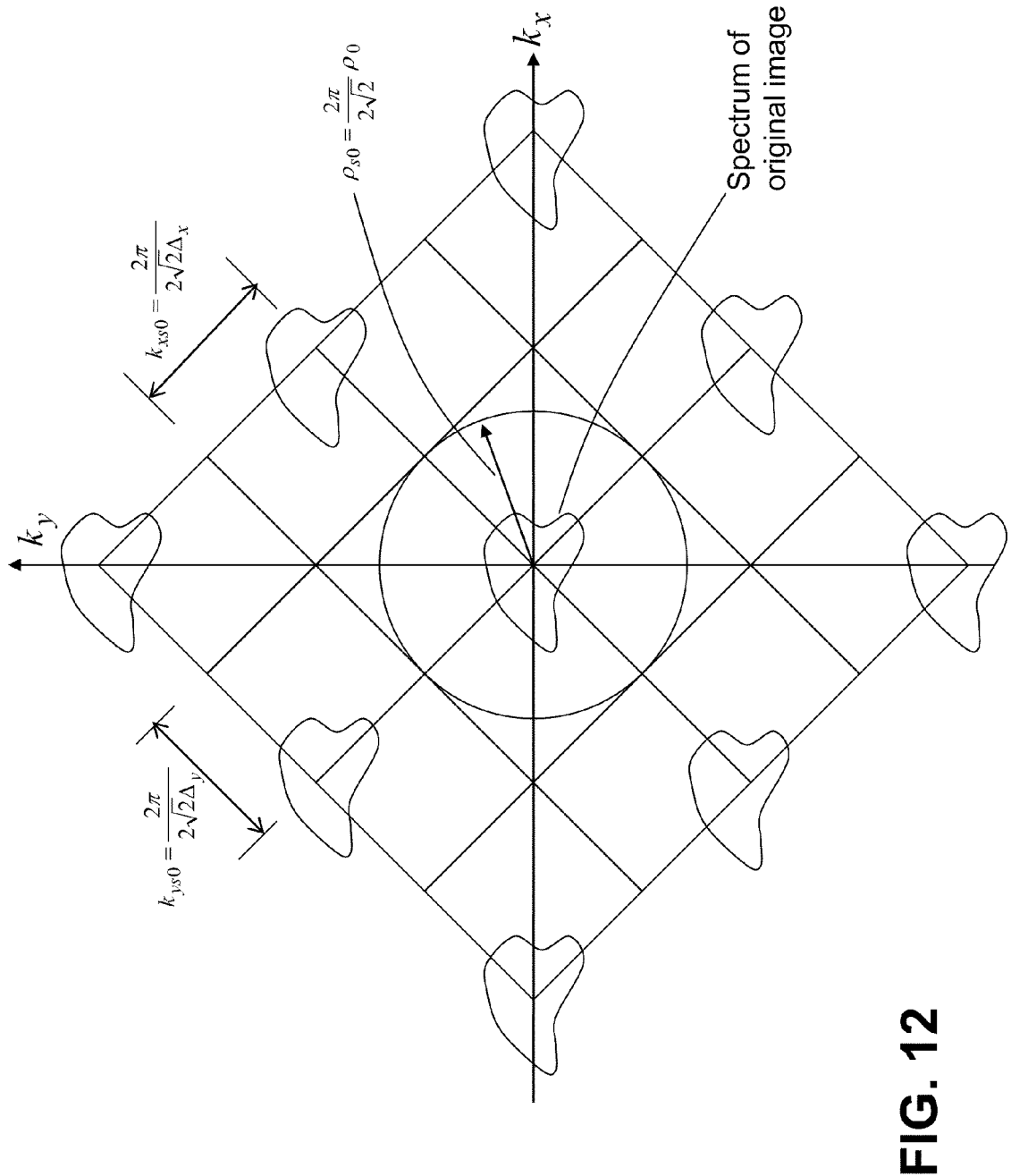
FIG. 12 illustrates a graphic view showing the hexagonal sampled spectrum.

FIG. 11 illustrates a 2-D hexagonal sampling grid. FIG. 12 illustrates the Fourier transform of $F_\delta(k_x,k_y)$, which is the repeated version of the continuous signal $F(k_x,k_y)$. The distances between adjacent two closest repeated spectra in both directions are $$k_{x0} = \frac{2\pi}{\Delta_x\sqrt{2}} \text{ and } k_{y0} = \frac{2\pi}{\Delta_y\sqrt{2}}.$$

The cutoff frequency is designed as $$k_{xs0} = \frac{2\pi}{2\sqrt{2}\,\Delta_x} \text{ and } k_{ys0} = \frac{2\pi}{2\sqrt{2}\,\Delta_y}$$

in spatial frequency domain, and $$\rho_{s0} = \frac{2\pi}{2\sqrt{2}}\rho_0$$

in the radial spatial frequency as shown in FIG. 12.

Reconstructing CFA Green Channel and Red/Blue Channel—

Figure 13:
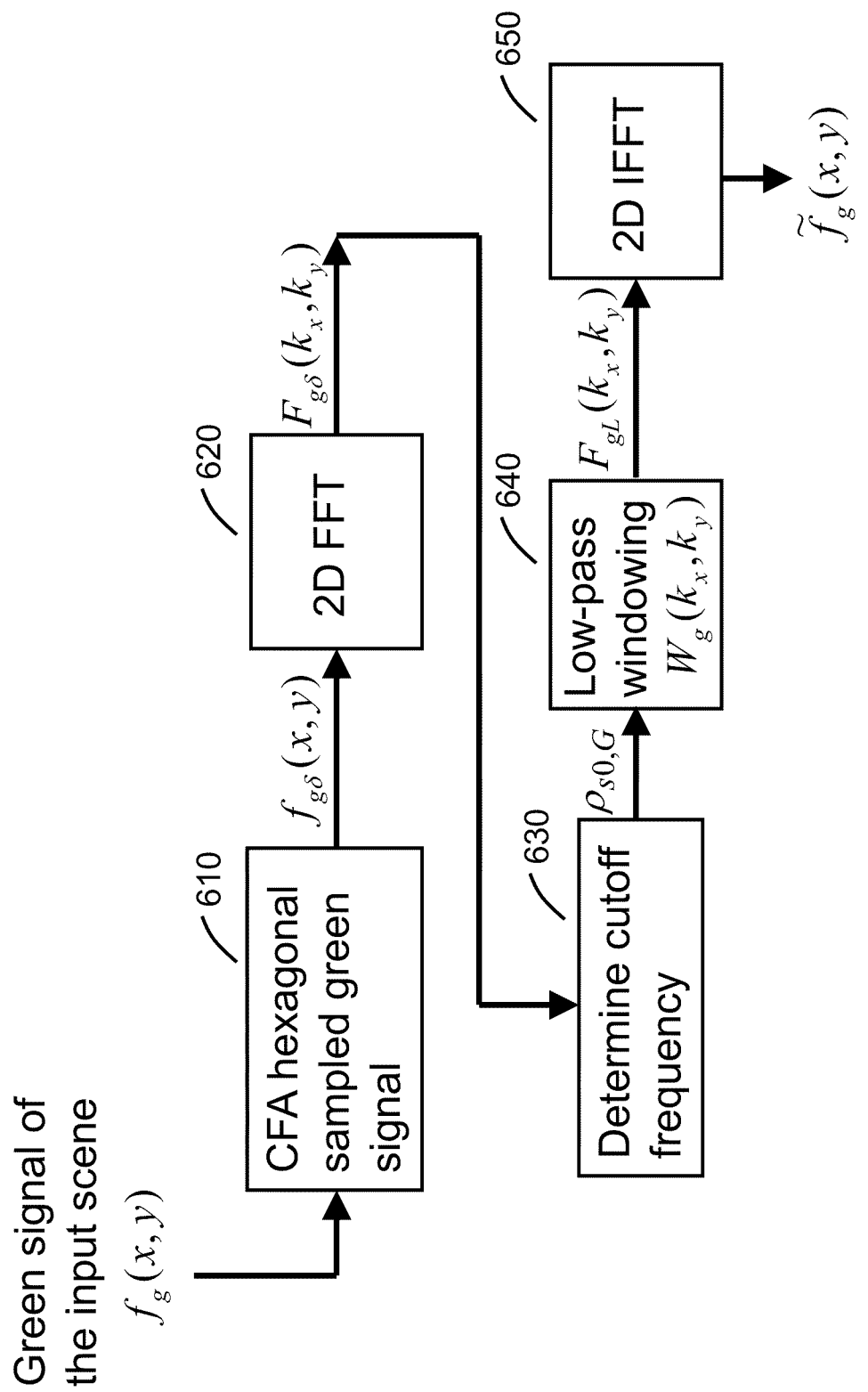
FIG. 13 is a schematic diagram of sequence of steps representing an algorithm for reconstructing CFA green channel.

The spectral property of the hexagonal sampled data provides the basis for reconstructing the original signal to avoid nonlinear aliasing. FIG. 13 is a schematic diagram of sequence of steps representing an algorithm for reconstructing CFA green channel. The original green signal $f_g(x,y)$ is passed through an imaging system with the CFA (Box 610) to become the hexagonal sampled signal $f_{g\delta}(x,y)$. The cutoff frequency for the green channel is designed as $$k_{xs0,G} = \frac{2\pi}{2\sqrt{2}\,\Delta_x} \text{ and } k_{ys0,G} = \frac{2\pi}{2\sqrt{2}\,\Delta_y}$$

in spatial frequency domain, and $$\rho_{s0,G} = \frac{2\pi}{2\sqrt{2}}\rho_0$$

in the radial spatial frequency (Box 630) based on the spectrum property of the CFA green signal. A low-pass filtering $W_g(k_x,k_y)$ with the cutoff frequency $\rho_{s0,G}$ (Box 640) is applied to the Fourier transform $F_{g\delta}(k_x,k_y)$ (Box 620) to generate $F_{gL}(k_x,k_y)$. That is, $$F_{gL}(k_x,k_y)=F_{g\delta}(k_x,k_y)W_g(k_x,k_y).$$

Then the inverse Fourier transform of the low-passed signal (Box 650), $F_{gL}(k_x,k_y)$, is denoted as $\tilde{f}_g(x,y)$, which is the reconstructed CFA green signal. The low-pass filter is obtained by a Fourier windowing method described in S. S. Young, "Alias-free image subsampling using Fourier-based windowing methods," Optical Engineering, Vol. 43, No. 4, pp. 843-855, April 2004, hereby incorporated by reference.

Reconstructing red or blue channel is similar to the procedure of reconstructing the green channel except the cutoff frequency for the low-pass filter is designed as $$k_{xs0,C} = \frac{2\pi}{4\Delta_x} \text{ and } k_{ys0,C} = \frac{2\pi}{4\Delta_y}$$

in spatial frequency domain, $$\rho_{s0,C} = \frac{2\pi}{4}\rho_0$$

in radial spatial frequency domain, where C for red or blue channel.

Example of Reconstructing Green and Red/Blue Channels

An illustration of reconstructing green and red/blue channels is shown in FIGS. 14-23. In this example, we use a gray scale image to simulate a hexagonal sampled green image and a rectangular subsampled red or blue image. The subsampled red or blue image is decimated/subsampled by 2 from the original image.

Figure 14:
FIG. 14 shows the original gray scale image of a nature scene.
Figure 15:
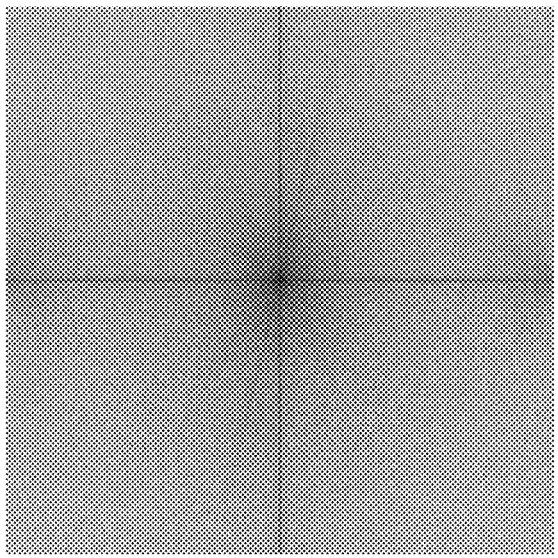
FIG. 15 shows the spectrum of the original image.
Figure 16:
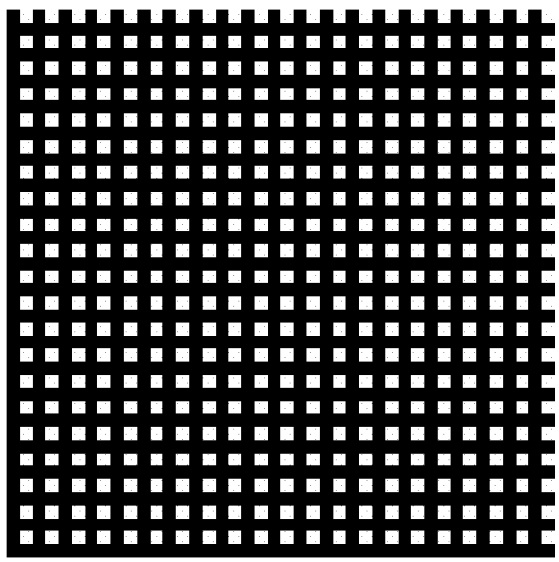
FIG. 16 shows the subsampled rectangular grid for red or blue image which is subsampled by 2 from the original image.
Figure 17:
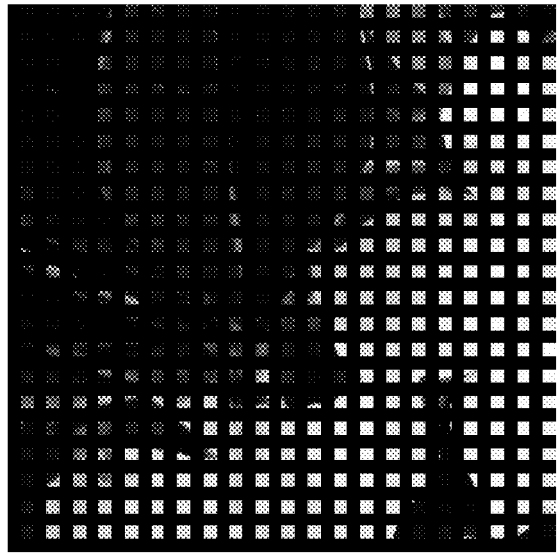
FIG. 17 shows the red or blue sampled image.
Figure 18:
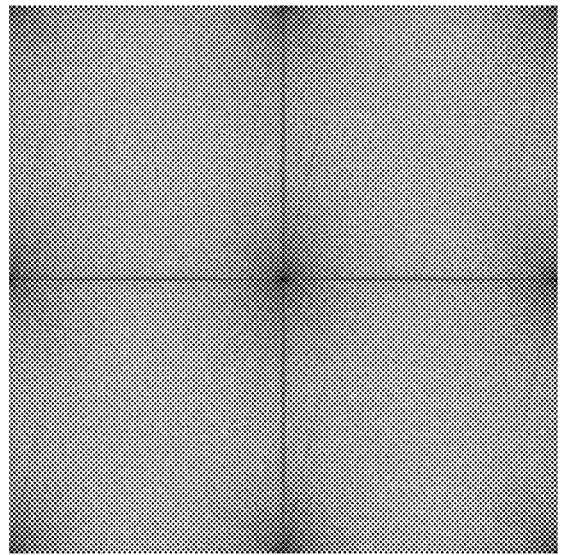
FIG. 18 shows the spectrum of the red or blue sampled image, in which the repeated versions of the spectrum of the original image are presented in the rectangular sampling fashion.
Figure 19:
FIG. 19 shows the reconstructed red or blue sampled image.

The original gray scale image of a nature scene is shown in FIG. 14. Its spectrum is shown in FIG. 15. Note that in FIG. 15 the spectrum is centered around the low frequencies. The subsampled rectangular grid for red or blue image which is subsampled by 2 (every other pixel is sampled) from the original image is illustrated in FIG. 16. FIG. 17 shows the red or blue sampled image. Its spectrum is shown in FIG. 18, in which the repeated versions of the spectrum of the original image are presented in the rectangular sampling fashion. FIG. 18 is the spectrum for the red and blue sampled image. Note that by comparing FIG. 18 with FIG. 10, one can see that in FIG. 18 the spectrum is repeated at nine locations around the perimeter correlating to the repeated versions of the original spectrum shown FIG. 10. The reconstructing red or blue sampled image is shown in FIG. 19.

Figure 20:
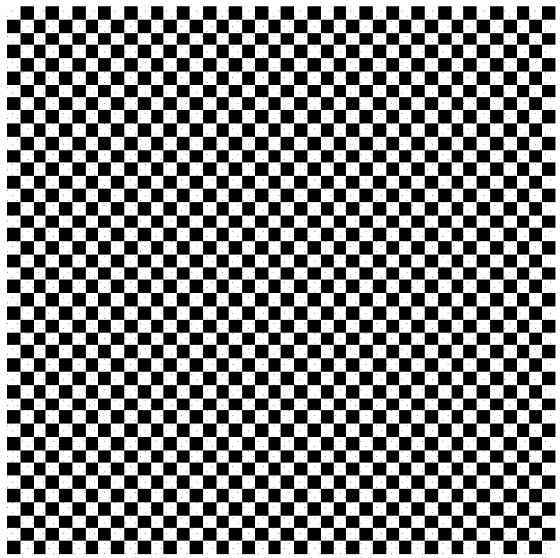
FIG. 20 shows the hexagonal sampling grid for green image.
Figure 21:
FIG. 21 shows the hexagonal sampled green image.
Figure 22:
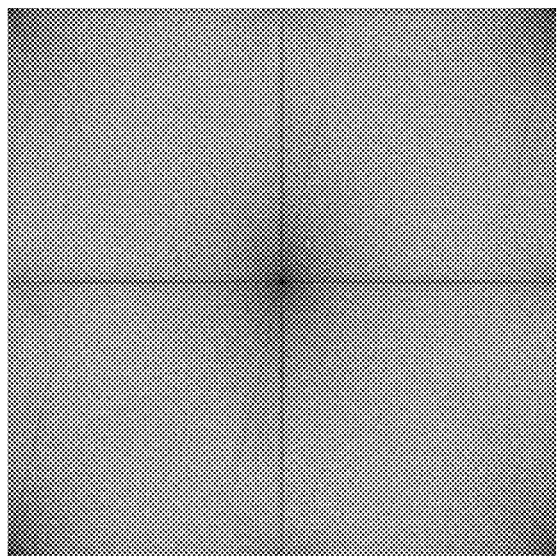
FIG. 22 shows the spectrum of the hexagonal sampled green image, in which the repeated versions of the spectrum of the original image are presented in the hexagonal sampling fashion.
Figure 23:
FIG. 23 shows the reconstructed green sampled image.

The hexagonal sampling grid for the green image is shown in FIG. 20. FIG. 21 shows the hexagonal sampled green image. Its spectrum is shown in FIG. 22, in which the repeated versions of the spectrum of the original image are presented in the hexagonal sampling fashion. Note that by comparing FIG. 22 to FIG. 12, one can see repeated versions in the hexagonal sampling pattern as shown in FIG. 12. The reconstructing green sampled image is shown in FIG. 23.

Gross Translation Estimation for Color Filter Array Image Sequences

The gross translation estimation (FIG. 7 Box 214) as described in the foregoing and in U.S. patent application Ser. No. 12/576,132, "System and Method of Super-Resolution Imaging from a Sequence of Translated and Rotated Low-Resolution Images," filed Oct. 8, 2009, S. S. Young is illustrated in FIG. 3. The gross translation estimation is applied to the reconstructed green channel images in the preferred embodiment. Then the estimated translations are assigned to the red and blue channels (Box 240). If other CFA pattern is used, the gross translation estimation is applied to the reconstructing luminance channel. Then the estimated translations are assigned to two other chrominance channels. In the alternative embodiment, depicted schematically in FIG. 8, the gross translation estimation is applied to three color channel images, respectively (Box 320, 340, 360). One may also use the estimated translations in other manners; e.g., the averages of the estimated translations for three color channels, respectively, are used for all three color channels.

SUB-PIXEL ROTATION AND TRANSLATION ESTIMATION FOR COLOR FILTER ARRAY IMAGE SEQUENCES The sub-pixel translation and rotation estimation (Box 216) as described in the foregoing and in U.S. patent application Ser. No. 12/576,132, "System and Method of Super-Resolution Imaging from a Sequence of Translated and Rotated Low-Resolution Images," filed Oct. 8, 2009, S. S. Young is illustrated in FIGS. 2, 4-6. The sub-pixel translation and rotation estimation is applied to the reconstructed green channel images in the preferred embodiment. Then the estimated sub-pixel translations and rotations are assigned to the red and blue channels (Box 260). If other CFA pattern is used, the sub-pixel translation and rotation estimation is applied to the reconstructing luminance channel. Then the estimated translations and rotations are assigned to two other chrominance channels. In the alternative embodiment, the sub-pixel translation and rotation estimation is applied to three color channel images, respectively. One may also use the averages of the estimated translations and rotations for three color channels, respectively, for all three color channels, as used by others.

Error-Energy Reduction Algorithm

Error-Energy Reduction Algorithm for CFA Input Images—

An error-energy reduction algorithm for CFA images is derived to reconstruct the high-resolution alias-free output image that is a three-channel full color image containing red, green and blue channels. A primary feature of this proposed error-energy reduction algorithm for CFA images is that, for each color channel, we treat the spatial samples from low-resolution images that possess unknown and irregular (uncontrolled) sub-pixel shifts and/or rotations as a set of constraints to populate an over-sampled (sampled above the desired output bandwidth) processing array. The estimated sub-pixel shifted and rotated locations of these samples and their values constitute a spatial domain constraint. Furthermore, the bandwidth of the alias-free image (or the sensor imposed bandwidth) is the criterion used as a spatial frequency domain constraint on the over-sampled processing array.

In an error-energy reduction algorithm, the high-resolution image is reconstructed by removing aliasing from low resolution images. The high-resolution image is reconstructed by applying non-uniform interpolation using the constraints both in the spatial and spatial frequency domains. The algorithm is based on the concept that the error-energy is reduced by imposing both spatial and spatial frequency domain constraints: the samples from the low-resolution images; and the bandwidth of the high-resolution, alias-free output image.

In accordance with the error-energy reduction algorithm of the present invention, spatial samples from low resolution images that possess unknown and irregular (uncontrolled) sub-pixel shifts and rotations are treated as a set of constraints to populate an over-sampled (sampled above the desired output bandwidth) processing array. The estimated sub-pixel locations of these samples and their values constitute a spatial domain constraint. Furthermore, the bandwidth of the alias-free image (or the sensor imposed bandwidth) is the criterion used as a spatial frequency domain constraint on the over-sampled processing array. One may also incorporate other spatial or spatial frequency domain constraints that have been used by others; e.g., positivity of the image in the spatial domain. Since each color channel presents a unique spatial and spatial frequency properties as described earlier, the spatial and spatial frequency domain constraints are designed accordingly.

Image Acquisition Model—

Figure 24:
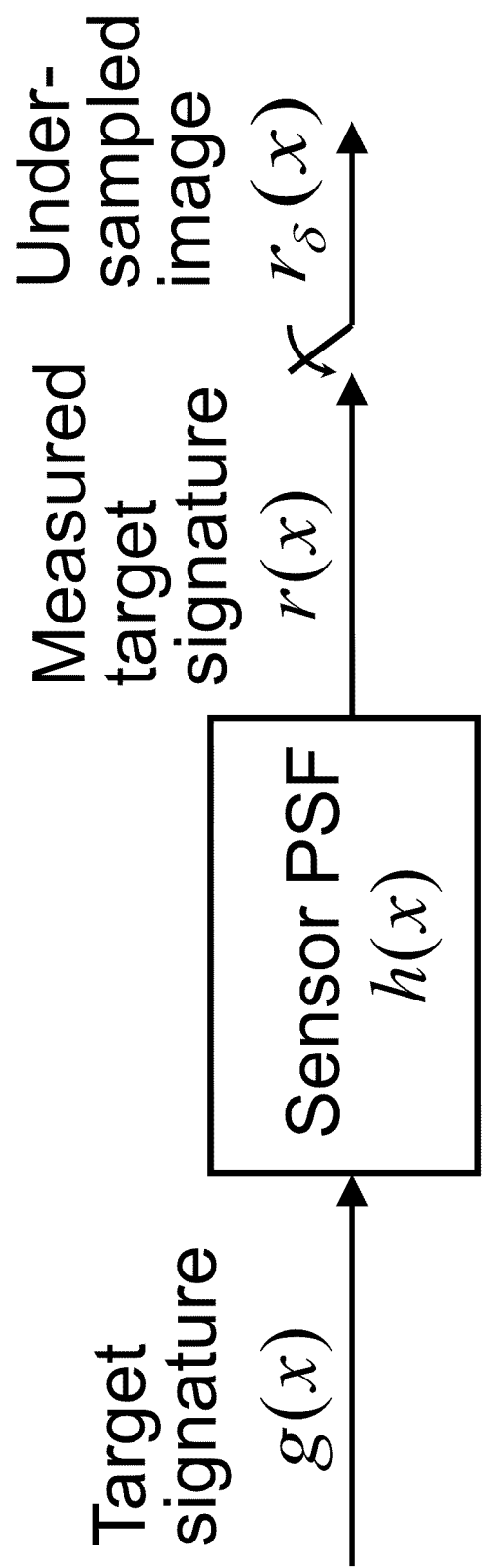
FIG. 24 is a graphic view showing an image acquisition model.

FIG. 24 shows the system model for acquiring an undersampled image in a one-dimensional case. Let $f(x)$ be the ideal target signature that is interrogated by the sensor. The measured target signature g(x) by the sensor is modeled as the output of a Linear Shift Invariant (LSI) system whose impulse response is the sensor's point spread function (PSF), h(x); this is also known as the sensor blurring function. The relationship between the measured target signature and the original target signature in the spatial frequency $k_x$ domain is:

$$G(k_x)=F(k_x)H(k_x)$$

where $G(k_x)$, $F(k_x)$, and $H(k_x)$ are the Fourier transforms of g(x), $f(x)$, and h(x), respectively.

Figure 25:
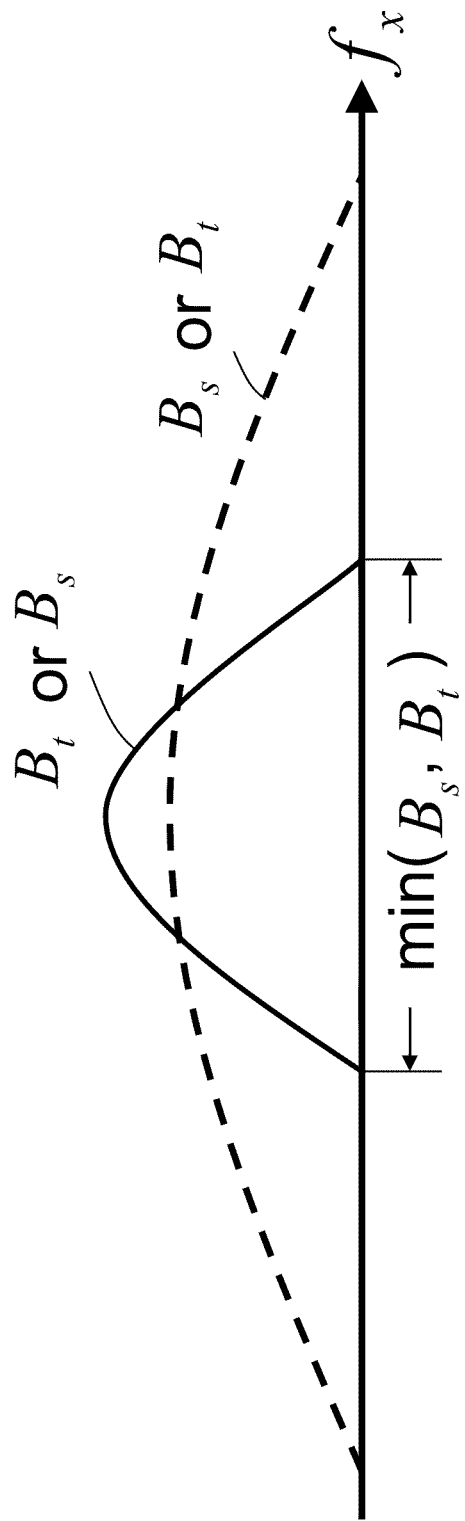
FIG. 25 is a graphic view showing factors that dictate the bandwidth of the measured target signature.

FIG. 25 shows the factors that dictate the bandwidth of the measured target signature. The bandwidth of the sensor's PSF (point spread function) is fixed and is determined by the support of the transfer function $H(k_x)$. The bandwidth of the ideal target signature depends on, e.g., the range of the target in FLIR (Forward-Looking Infrared), radar, sonar, visible light, etc. For a target at the short range, more details of the target are observable; in this case, the ideal target signature bandwidth is relatively large. For a target at the long range, the ideal target signature bandwidth is smaller. Two lines (one dotted and one solid) in FIG. 25 illustrate the bandwidths of the sensor and the ideal target signature. The wider (dotted) one could be the bandwidth of the target or the sensor, or visa-versa. The output bandwidth of the measured target signature is the minimum bandwidth of the ideal target signature and the sensor, that is, $$B_o=\min(B_t,B_s)$$

where $B_o$, $B_t$ and $B_s$ are the bandwidths of the output target signature, the ideal target signature and the sensor PSF, respectively. The proposed super-resolution image reconstruction algorithm cannot produce an image whose bandwidth exceeds $B_o$, because the de-aliasing approach cannot recover the bandwidth beyond the sensor's diffraction limit.

Assuming the measurement system stores the incoming images at the sample spacing of $\Delta_x$, the measured target signature, g(x), is then sampled at the integer multiples of $\Delta_x$, e.g., $x_n = n\Delta_x$, n=0, ±1, ±2, ..., ±N, to obtain the undersampled (aliased) image; the resultant can be modeled as the following delta-sampled signal in the spatial domain (see FIG. 24);

$$g_\delta(x) = \sum_{n=-N}^{N} g(x)\delta(x-x_n) = g(x)\sum_{n=-N}^{N}\delta(x-x_n).$$

The Fourier transform of the above delta-sampled signal is $$G_\delta(k_x) = \frac{1}{\Delta_x}\sum_{\ell=-N}^{N} G\left(k_x - \frac{2\pi\ell}{\Delta_x}\right).$$

An acquired image is aliased when $$\Delta_x > \frac{2\pi}{B_o} \text{(Nyquist sample spacing).}$$

As mentioned previously, many low resolution sensors possess a spatial sample spacing $\Delta_x$ that violates the Nyquist rate. The emphasis of the super-resolution image reconstruction algorithm in a preferred embodiment is to de-alias a sequence of undersampled aliased images to obtain the alias-free or a super-resolved image. Again it should be emphasized that the resolution of the output alias-free image is limited by the minimum bandwidth of the sensor and the ideal target signature.

One of the considerations in super-resolution image reconstruction is the number of the undersampled images that are required to recover the alias-free image. For monochrominance images, let the sampling space of the original undersampled images be $A_x$. From an information-theory point of view, the sampling space of the output high-resolution image that is reconstructed from k frames (with distinct sub-pixel shifts) is $$\frac{\Delta_x}{k}$$

in one-dimensional imaging systems, and $$\left(\frac{\Delta_x}{\sqrt{k}}, \frac{\Delta_y}{\sqrt{k}}\right)$$

in two-dimensional imaging systems.

A numerical example is given in the following. An image array of 100×100 is initially acquired to represent a scene. The total number of pixels is 10,000. If the resolution of the image is desired to be 4 times in each direction, the image array of 400×400 is required. The total number of pixels for the high-resolution image is 160,000. That means that it requires 16 low-resolution images to achieve the resolution improvement factor of 4. Therefore, the number of input low-resolution image frames is the square of the resolution improvement factor. In other words, the resolution improvement factor is the square root of the number of the input images.

Now consider a CFA image, an image array of $n_x * n_y$ is initially acquired to represent a scene. The total number of pixels is $N = n_x * n_y$. The total number pixels in the green channel is $N_G = N/2$, while the total number of pixels in the blue or red channel is $N_C = N/4$, where C represents for red or blue channel. When k frames of CFA images are acquired to reconstruct the high-resolution full color image, the total number of pixels of the green channel of the output high-high-resolution image is $$N_{G\_SR} = \frac{N}{2}k,$$

the one for the blue or red channel is $$N_{C\_SR} = \frac{N}{4}k,$$

where C represents for red or blue channel. Therefore, the resolution improvement factor in the green channel is $\sqrt{k/2}$ in both x and y directions, and the one in the red or blue channel $\sqrt{k/4}$. That is, for CFA images, let the sampling space of the original undersampled images be $\Delta_x$. From an information-theory point of view, the sampling space of the output high-resolution full color image that is reconstructed from k frames (with distinct sub-pixel shifts) is $$\left(\frac{\Delta_x}{\sqrt{\frac{k}{2}}}, \frac{\Delta_y}{\sqrt{\frac{k}{2}}}\right)$$

in the green channel, $$\left(\frac{\Delta_x}{\sqrt{\frac{k}{4}}}, \frac{\Delta_y}{\sqrt{\frac{k}{4}}}\right)$$

in the red or blue channel in two-dimensional imaging systems. In another words, the resolution improvement factor of the green channel is $\sqrt{k/2}$ and the one of the red or blue channel is $\sqrt{k/4}$.

Theoretically, more frames should provide more information and, thus, larger bandwidth and/or higher resolution. However, the super-resolution image quality does not improve when the number of processed undersampled images exceeds a certain value. This is due to the fact that the bandwidth recovery is limited by the minimum of the bandwidths of the sensor or ideal target signature.

Implementation of Error-Energy Reduction Algorithm for CFA Images—

Figure 26:
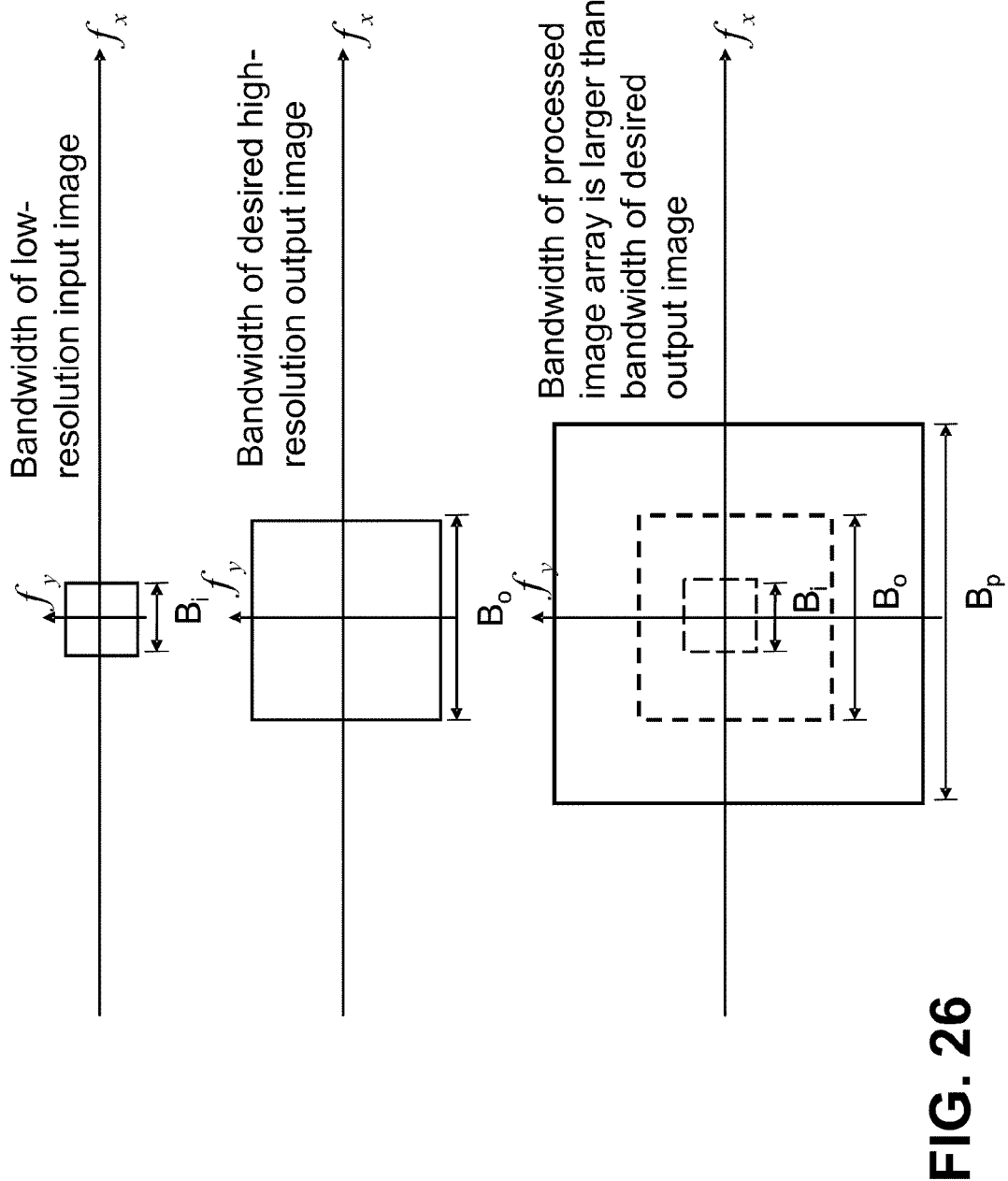
FIG. 26 is a graphic view depicting the bandwidth phenomenon in the super-resolution image reconstruction algorithm.

For each color channel, the bandwidth of the input undersampled (aliased) images is designated $B_i$. The bandwidth of the alias-free (high-resolution) output image for that channel is denoted as $B_o$. In order to recover the desired (alias-free) bandwidth, it is important to select a processing array with a sample spacing smaller than the sample spacing of the desired high-resolution image. In this case, the 2D FFT of the processing array yields a spectral coverage $B_p$ that is larger than the bandwidth of the output image. FIG. 26 illustrates this phenomenon in the 2D spatial frequency domain for one color channel.

The high-resolution alias-free image on the processing array (grid) is designated as $p_D(x,y)$ where $D \in \{G, C\}$, G for the green channel and $C \in \{R,B\}$ for the red or blue channel. The low-resolution (aliased) snap-shots only provide a subset of samples of this image. The location of each aliased image on the processing grid is dictated by its corresponding sub-pixel shifts and rotations in the (x,y) domain.

Figure 27:
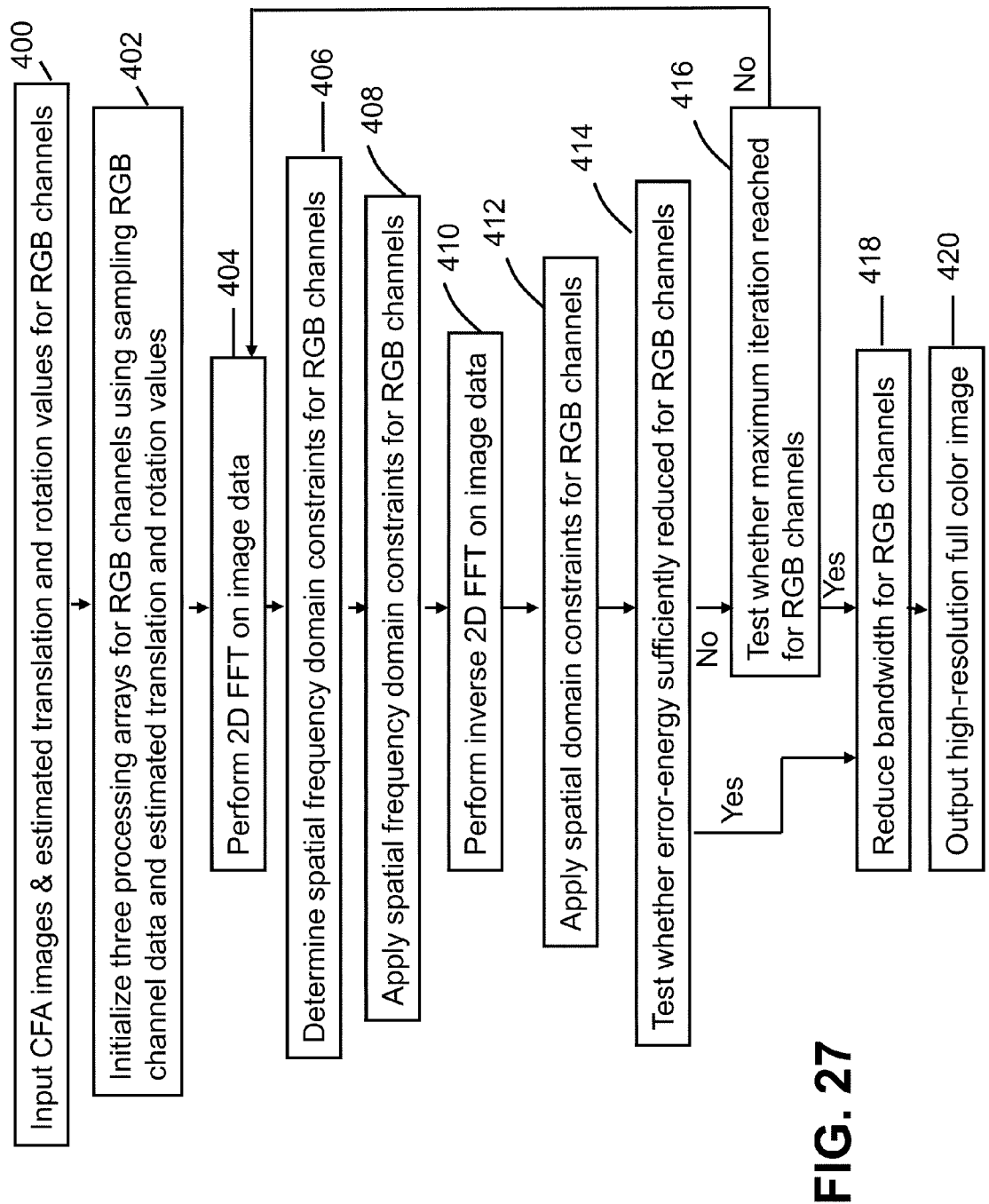
FIG. 27 is a schematic representation of a sequence of steps representing, inter alfa, an error-energy reduction algorithm for CFA input image sequences influenced or affected by both translations and rotations.
Figure 28A:
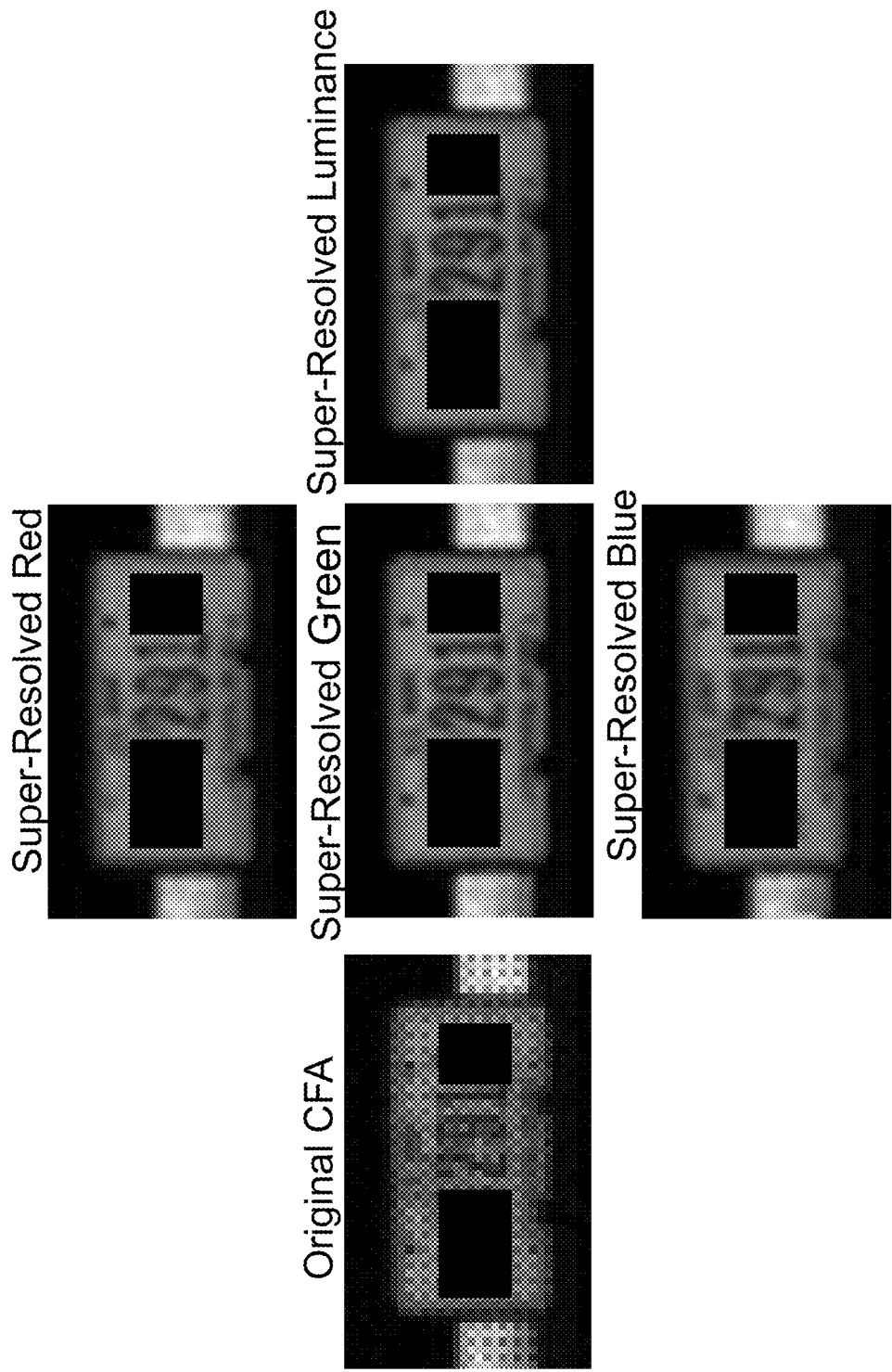
FIGS. 28A-28F illustrates an example of super-resolving a full color image from a sequence of CFA input images for a license plate scene. In order to protect the license plate owner's privacy, part of license plate is covered.
Figure 28B:
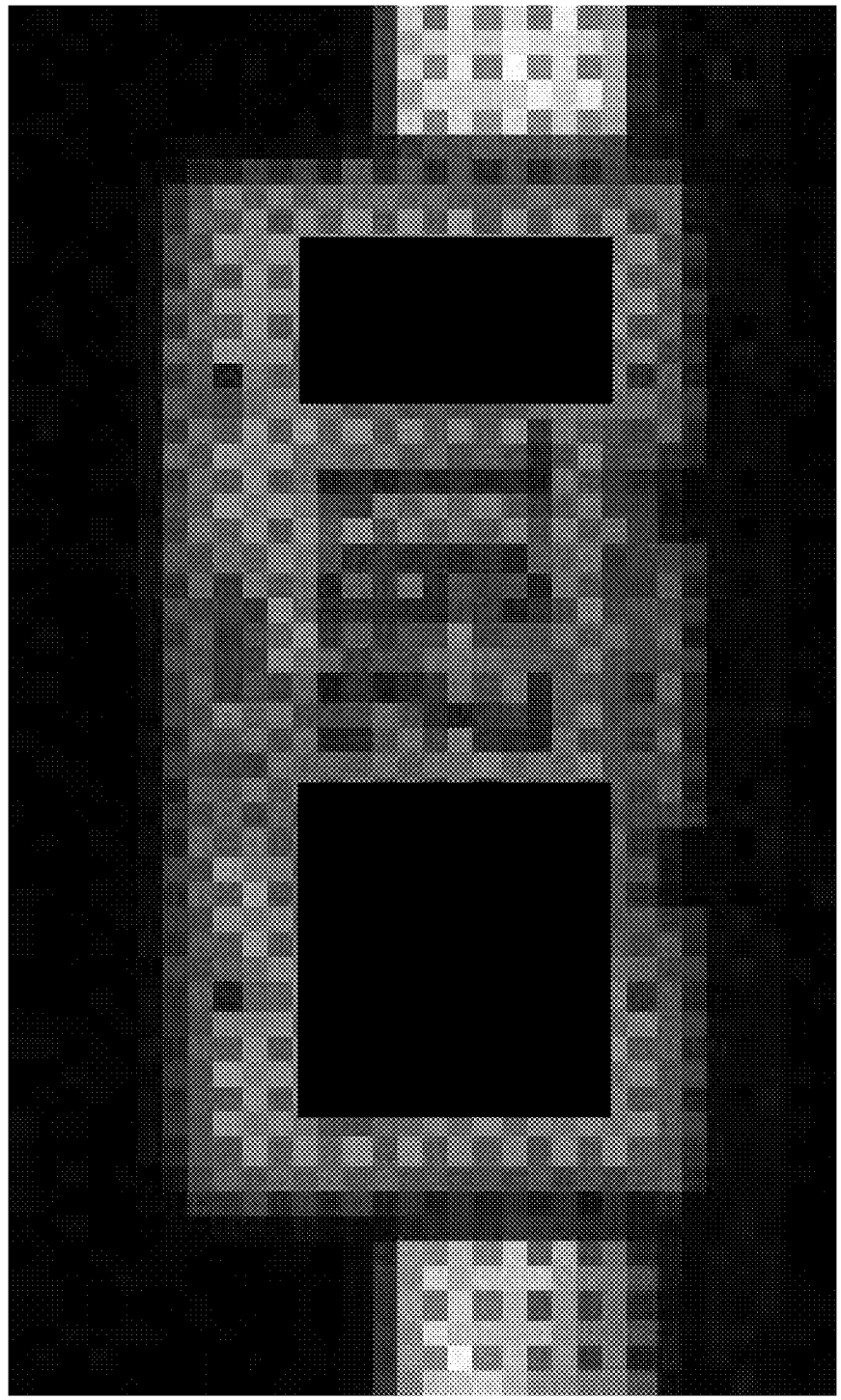
Figure 28C:
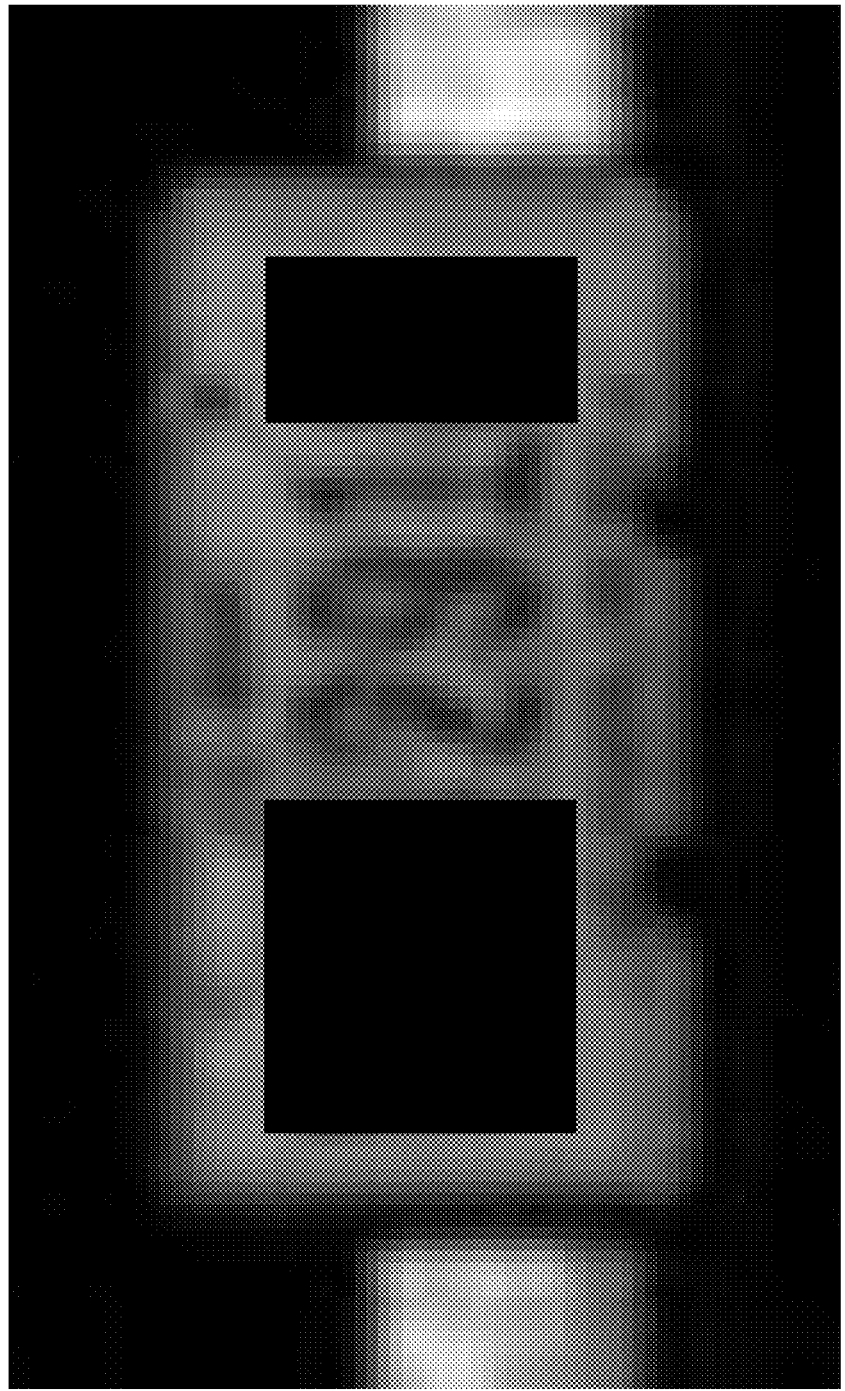
Figure 28D:
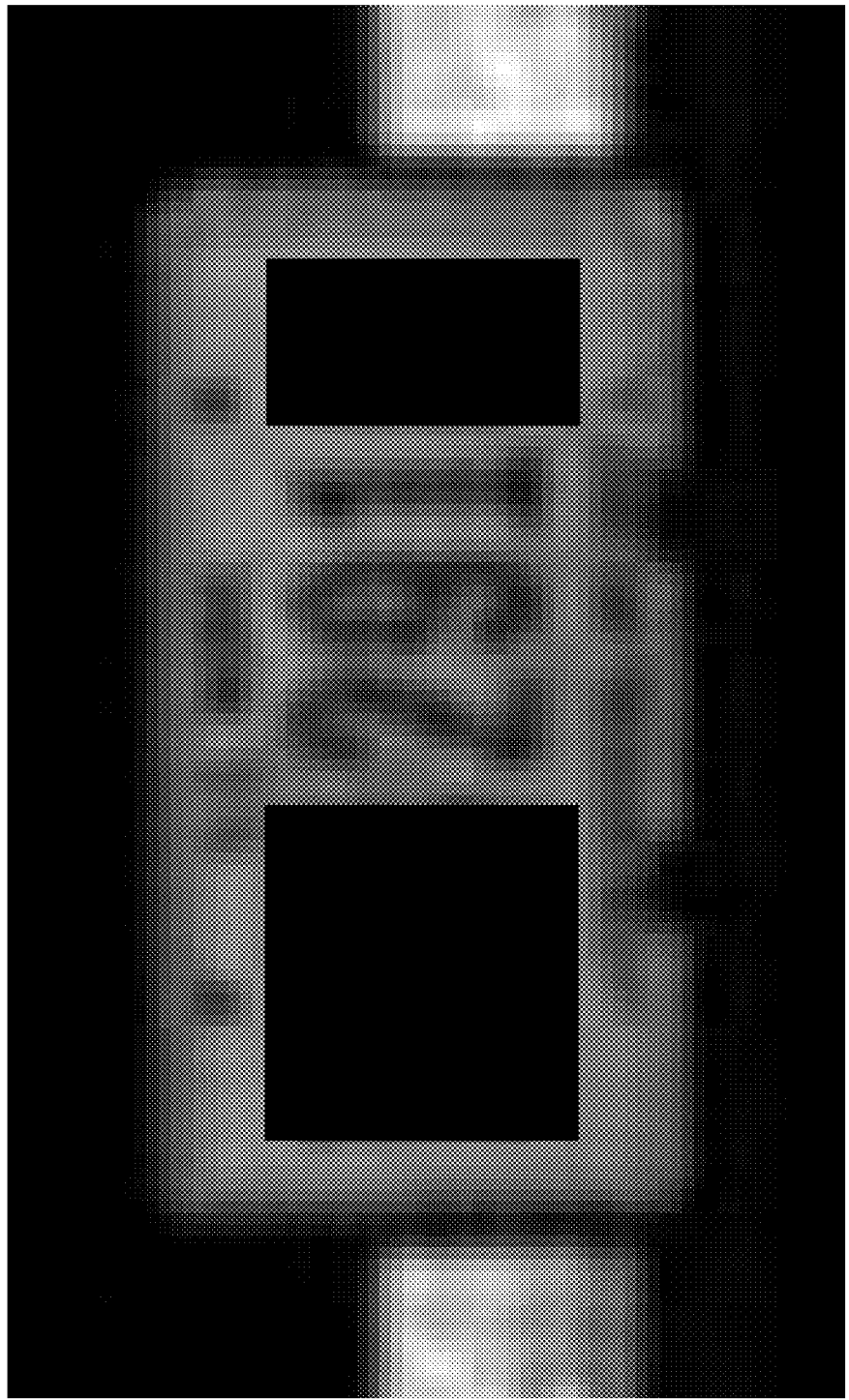
Figure 28E:
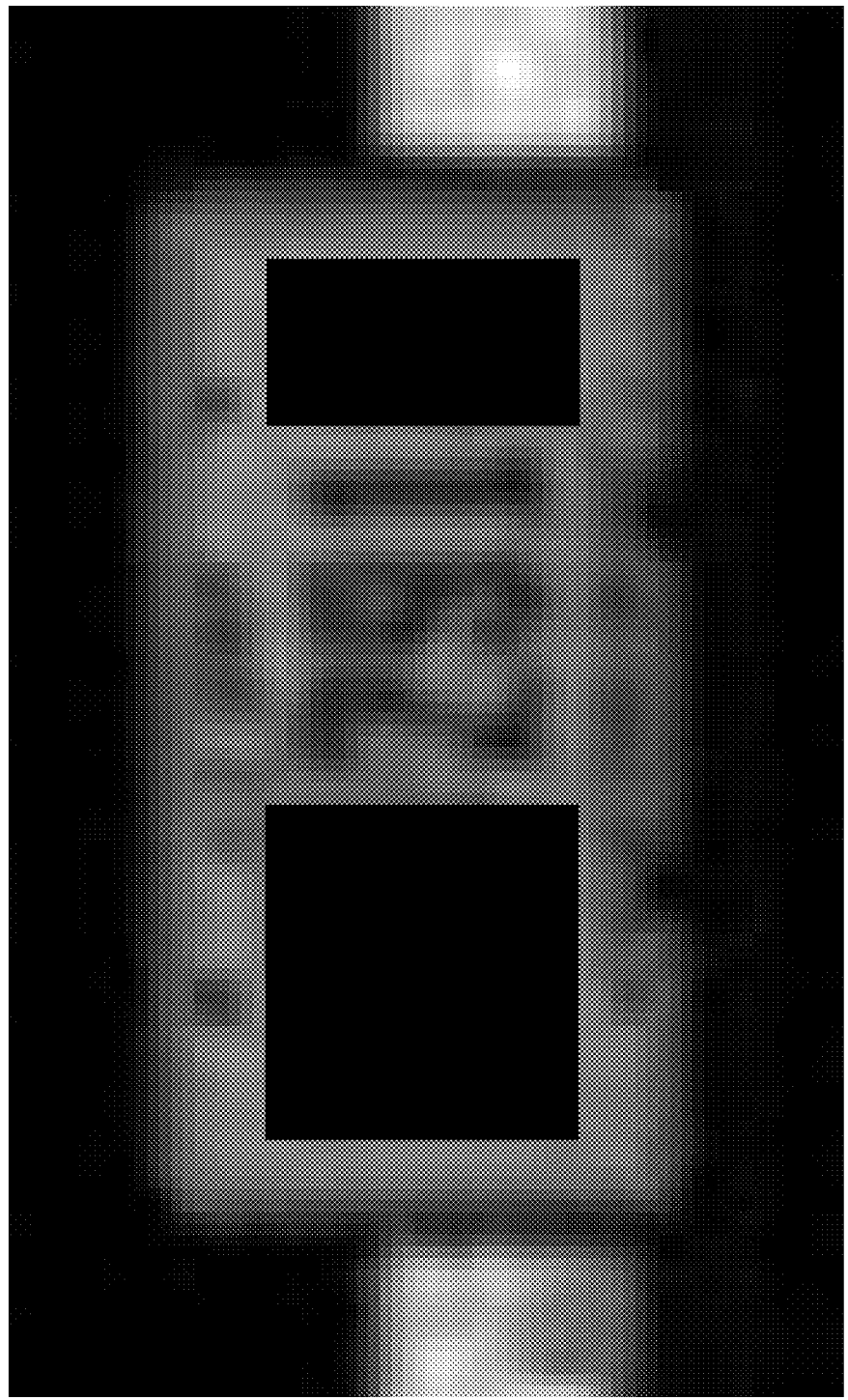
Figure 28F:
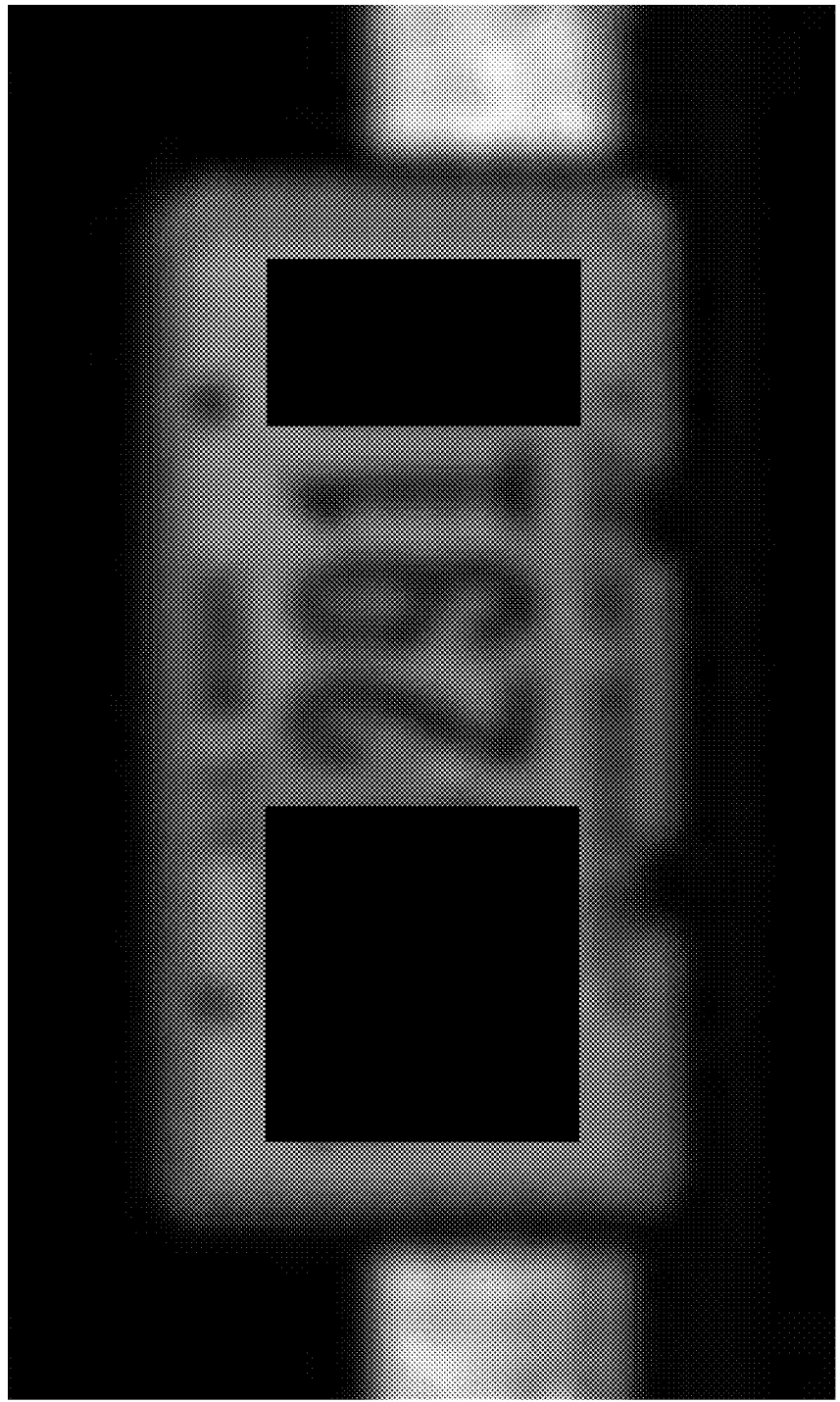
Figure 29A:
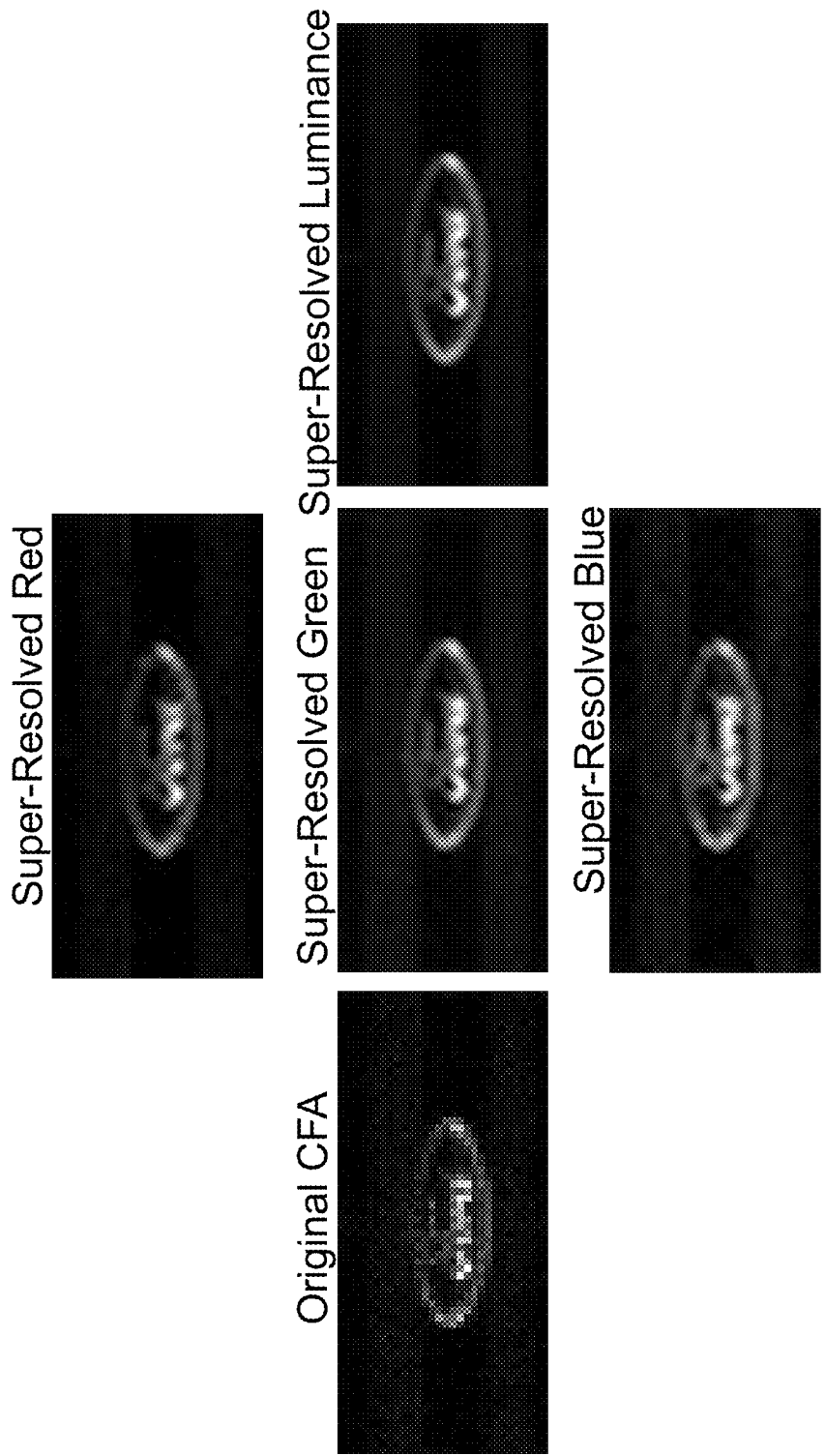
FIGS. 29A-29F illustrates an example of super-resolving a full color image from a sequence of CFA input images for a car emblem scene. The letter "Ford" shows clearly in the super-resolved luminance image.
Figure 29B:
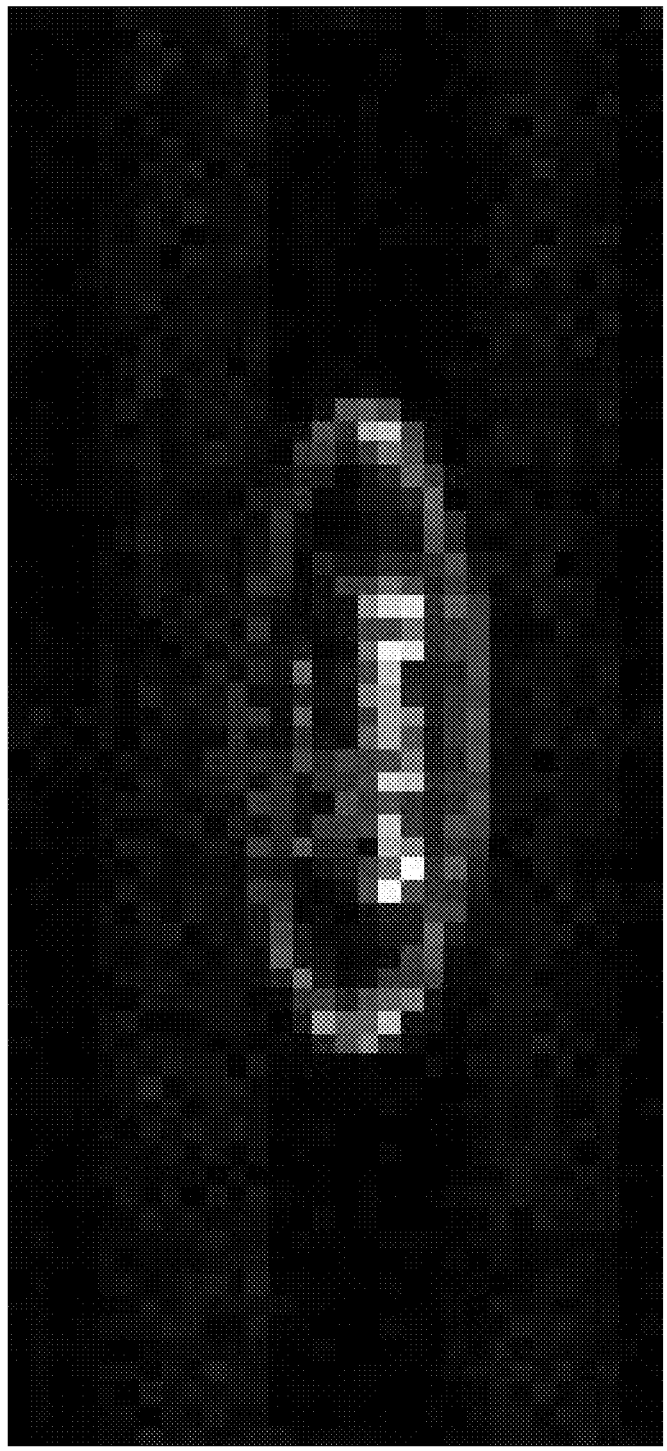
Figure 29C:
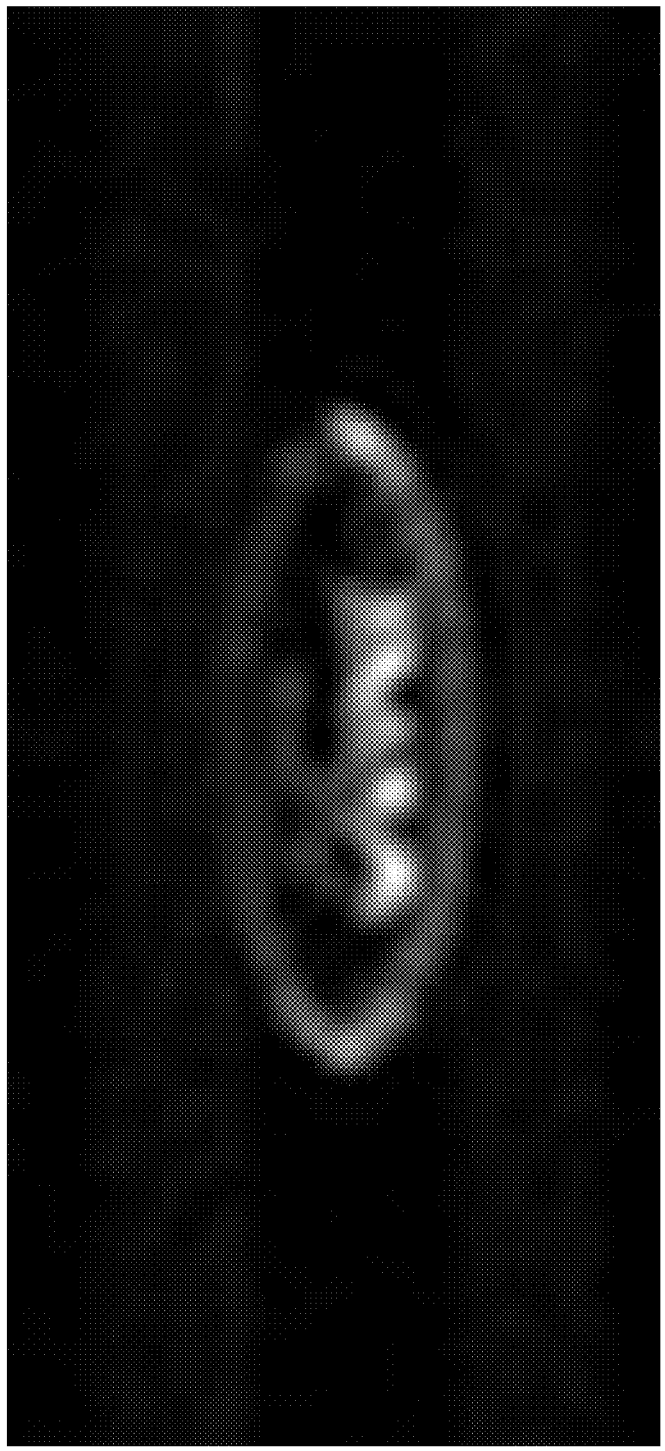
Figure 29D:
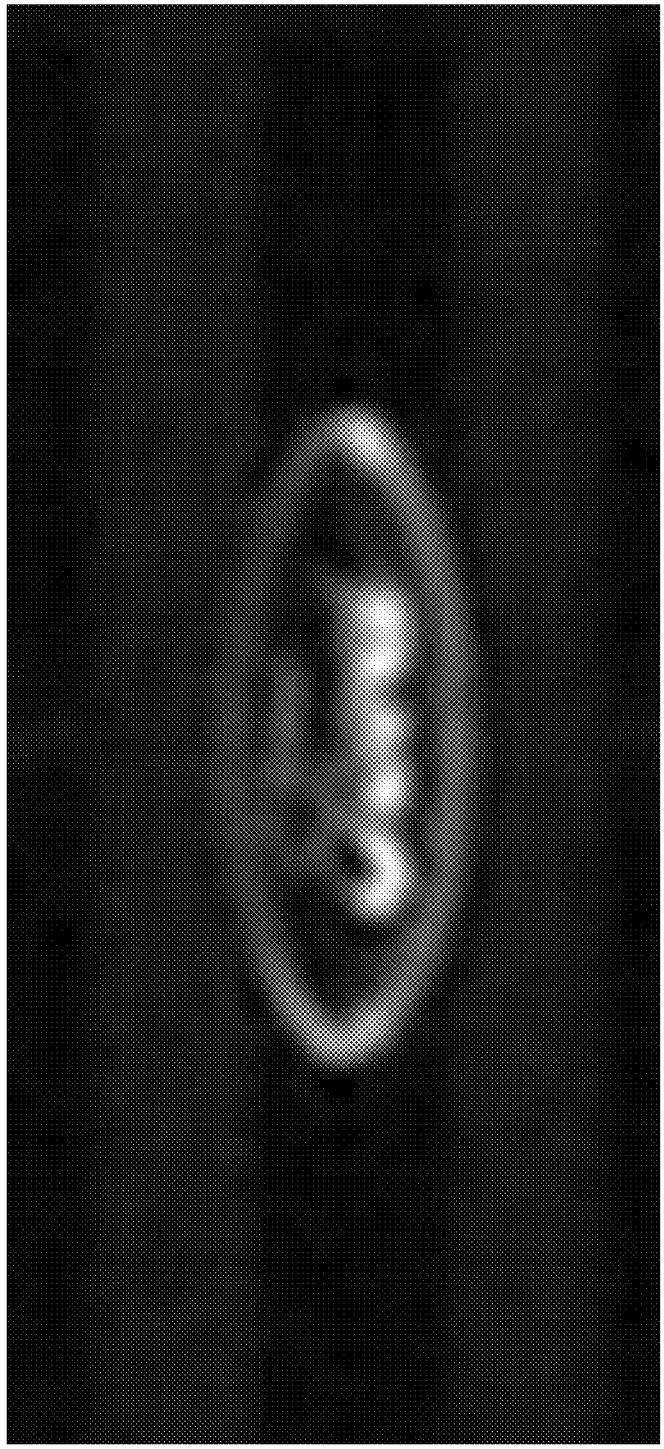
Figure 29E:
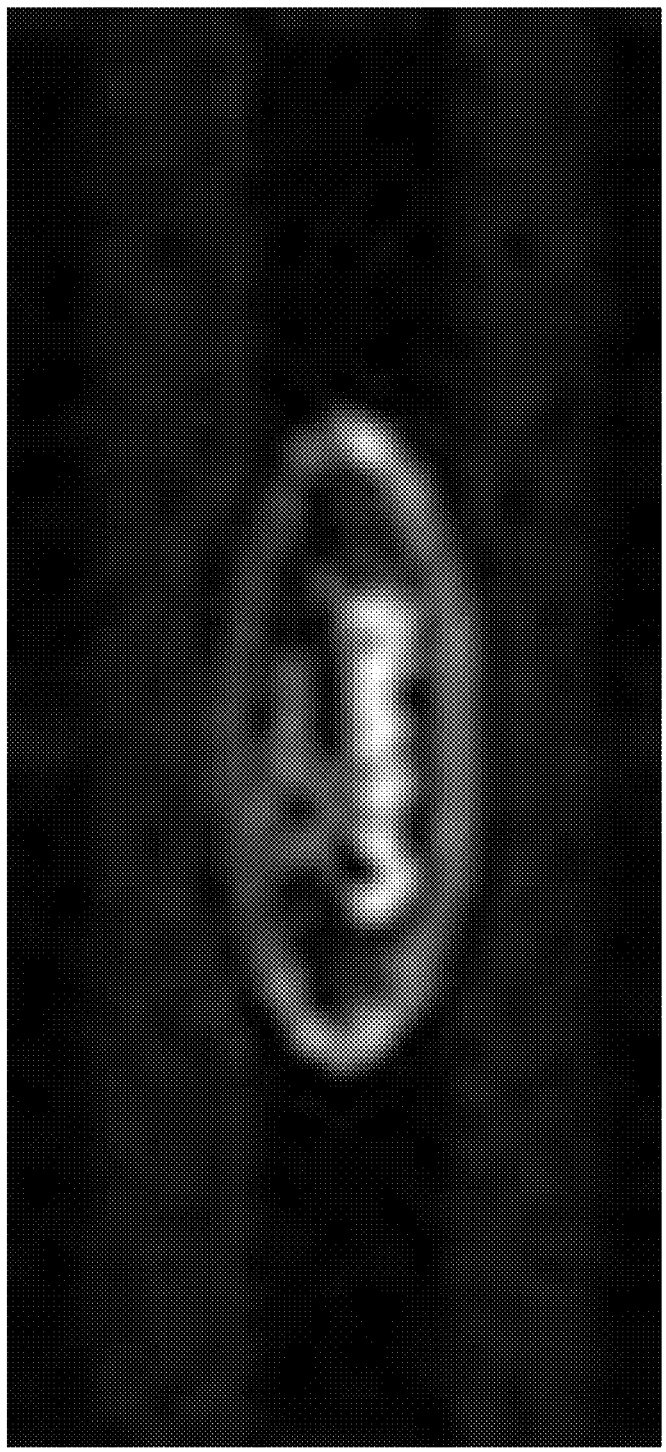
Figure 29F:
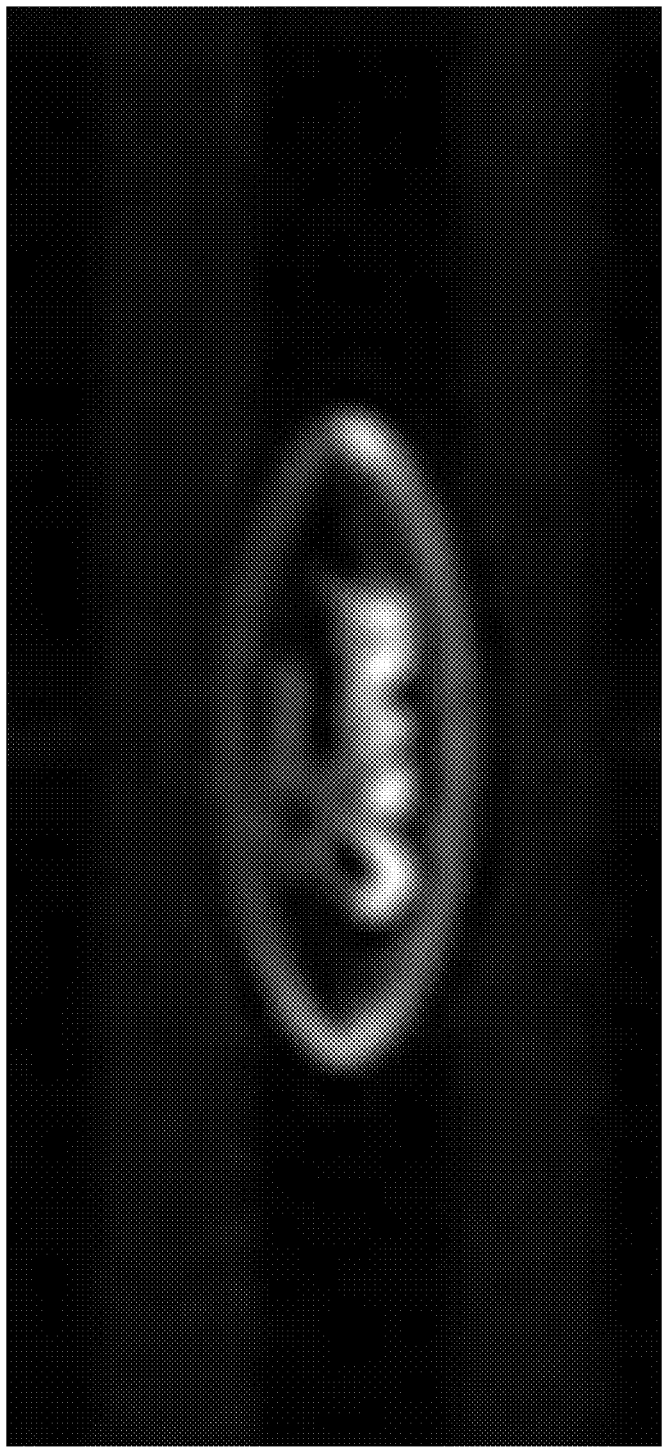

In the following, the error-energy reduction algorithm is described for the CFA input images containing translational shifts and/or rotational differences. FIG. 27 shows a schematic representation of the error-energy reduction algorithm for CFA input image sequences transformed by translations and/or rotations.

Inputs to the error energy reduction algorithm are a sequence of low-resolution CFA input images. In the preferred embodiment, the estimated gross shifts and sub-pixel shifts and/or rotations of each image with respect to the reference image are obtained for each color channel; usually the first image is chosen as the reference image. Denote $f_l(u_i, v_j)$ to be L CFA images from the input image sequence, where l=1, 2, ..., L, i=1, 2, ..., I, j=1, 2, ..., J; I×J is the dimension of the input image. After the transformation parameters ($\hat{\theta}_l$, $\hat{x}_{sl}, \hat{y}_{sl}$) are estimated for all L images, the transform coordinates are calculated from the estimated sub-pixel shifts and rotation angles as follows:

$$\begin{bmatrix} \hat{x}_{ijl} \\ \hat{y}_{ijl} \end{bmatrix} = \begin{bmatrix} \cos\hat{\theta}_l & \sin\hat{\theta}_l \\ -\sin\hat{\theta}_l & \cos\hat{\theta}_l \end{bmatrix} \begin{bmatrix} u_i \\ v_j \end{bmatrix} + \begin{bmatrix} \hat{x}_{sl} \\ \hat{y}_{sl} \end{bmatrix}$$

In the preferred embodiment, the transform coordinates are the same for all three color channels.

In the initializing step (Box 402), three processing arrays are initialized for three color channels by populating each grid using the input images according to the estimates of shifts and rotation angles, respectively. Each processing array is selected with a sample spacing that is smaller than the sample spacing of the desired high-resolution image.

In this procedure, the available CFA image values (from multiple snapshots) for three color channels are assigned to each shifted and rotated grid location of three processing arrays, respectively. At the other grid locations of each processing array, zero values are assigned. This can be written as $$p_{1,D}(X_m, Y_n) = \begin{cases} f_{l,D}(\hat{x}_{ijl}, \hat{y}_{ijl}) \\ 0 \end{cases}$$

where $D \in \{G,C\}$, G for the green channel and $C \in \{R,B\}$ for the red or blue channel, $(X_m, Y_n)$ is the grid location that is closest to the transformation coordinates $[\hat{x}_{ijl}, \hat{y}_{ijl}]$, and $m=1, 2, \ldots, M$, $n=1, 2, \ldots, N$; $M \times N$ is the dimension of the processing grid. The input green channel $f_{1,G}$ follows the sampling pattern of the hexagonal sampling shown in FIG. 20, and the input red or blue channel $f_{1,C}$ follows the sampling pattern of the rectangular sampling shown in FIG. 16.

In Box 404, a 2-D Fourier transform $p_{1,D}(k_x,k_y)$ is performed on the processing array, where $D \in \{G, C\}$, G for the green channel and $C \in \{R,B\}$ for the red or blue channel. Its spectrum has a wider bandwidth than the true (desired) output bandwidth. Therefore, the spatial frequency domain constraint (Box 408) is applied, that is, replacing zeros outside the desired bandwidth.

In this step, the desired bandwidth for the green channel and the one for red or blue channel are determined first (Box 406). Based on the spectral properties of the hexagonal sampling and the resolution improvement factor for the green channel when L CFA images are acquired, the desired bandwidth for the green channel is obtained as $$(B_{Ox,G}, B_{Oy,G}) = \left( \frac{2\pi}{2\sqrt{2}\,\Delta_x} \sqrt{\frac{L}{2}}, \frac{2\pi}{2\sqrt{2}\,\Delta_y} \sqrt{\frac{L}{2}} \right)$$

in the spatial frequency domain. From the spectral properties of the rectangular sampling and the resolution improvement factor for the red or blue channel when L CFA images acquired, the desired bandwidth for the red or blue channel is obtained as $$(B_{Ox,C}, B_{Oy,C}) = \left( \frac{2\pi}{4\Delta_x} \sqrt{\frac{L}{4}}, \frac{2\pi}{2\Delta_y} \sqrt{\frac{L}{4}} \right)$$

in the spatial frequency domain.
The functions $$P_{2,D}(k_x,k_y) = P_{1,D}(k_x,k_y) \cdot W_{P,D}(k_x,k_y)$$

is formed where $W_{p,D}(k_x,k_y)$ is a windowing function of realizing the spatial frequency domain constraint using $(B_{Ox,G}, B_{Oy,G})$ for the green channel and $(B_{Ox,C}, B_{Oy,C})$ for the red or blue channel, respectively. In Box 410, the inverse 2-D Fourier transform $p_{2,D}(x,y)$ of the resultant array $p_2,D(k_x,k_y)$ is performed for all three color channels, respectively.

The resultant inverse array is not a true image because the image values at the known grid locations are not equal to the original image values. Then the spatial domain constraint is applied for all three color channels (Box 412), that is, replacing those image values at the known grid locations with the known original image values.

In this step of applying spatial domain constraints using shifts and rotations (Box 412), we have the function $$p_{k+1,D}(X_m, Y_n) = \begin{cases} f_{l,D}(\hat{x}_{ijl}, \hat{y}_{ijl}) \\ p_{k,D}(X_m, Y_n) \end{cases}$$

to form the current iteration output image $p_{k+1,D}(X_m,Y_n)$ from the previous iteration output image $p_{k,D}(X_m, Y_n)$ where $D \in \{G, C\}$, G for the green channel and $C \in \{R,B\}$ for the red or blue channel. That is, the known grid locations are replaced with the known original image values and other grid locations are kept as the previous iteration output image values.

Similarly, the use of the available information in the spatial and spatial frequency domains results in a reduction of the energy of the error at each iteration step. At the odd steps of the iteration, the error for each of three color channels is defined by $$e_{2k+1,D} = \sum_{(m,n)} [p_{2k+1,D}(X_m, Y_n) - p_{2k-1,D}(X_m, Y_n)]^2$$

where $D \in \{G, C\}$, G for the green channel and $C \in \{R, B\}$ for the red or blue channel.

In Box 414, the condition of the error-energy reduction is examined by defining the following ratio:

$$SNR_{2k+1,D} = 10\log_{10}\left( \frac{\sum_{(m,n)} [p_{2k+1,D}(X_m, Y_n)]^2}{\sum_{(m,n)} [p_{2k+1,D}(X_m, Y_n) - p_{2k-1,D}(X_m, Y_n)]^2} \right)$$

where $D \in \{G,C\}$, G for the green channel and $C \in \{R,B\}$ for the red or blue channel. If $SNR_{2k+1,D} < SNR_{max,D}$ (where $SNR_{max,D}$ is a pre-assigned threshold value), and the maximum iteration is not reached (Box 416), the iteration continues. If $SNR_{2k+1,D} > SNR_{max,D}$, that is, the stopping criterion is satisfied, the iteration is terminated. Before the final super-resolution image is generated, the bandwidth of the output image is reduced (Box 418) from $B_p$ to $B_o$ using the Fourier windowing method (see S. S. Young 2004) for the green, red, and blue channel, respectively. Then the final super-resolved full color image with a desired bandwidth is saved for the output (Box 420).

Example

An illustration of super-resolving images from CFA low-resolution sequences is shown in FIGS. 28-29. FIGS. 28A-28F shows an example of scene of a license plate. One of original CFA input images is shown in the left column. The super-resolved three channels including the red, green and blue channels are shown in the middle column. These three images can be used to display as a color image. In order to show the effectiveness of the super-resolved full color image, the super-resolved luminance image is shown in the right column. The conversion from RGB to luminance is presented in the first row of the following matrix:

$$T = \begin{bmatrix} 0.2989 & 0.5870 & 0.1140 \\ 0.5959 & -0.2744 & -0.3216 \\ 0.2115 & -0.5229 & 0.3114 \end{bmatrix}$$

In order to protect the license plate owner's privacy, part of the license plate is covered.

Another example of scene of a car emblem is illustrated in FIGS. 29A-29F. By observing FIGS. 28-29, it can be seen that the super-resolved image shows a significant improvement from the CFA low-resolution images by exhibiting the detailed information especially in the digits and letters in the license plate and the car emblem. This illustrates that the super-resolved image is obtained even under the condition that a color filter array image sequence is acquired.

Figure 30:
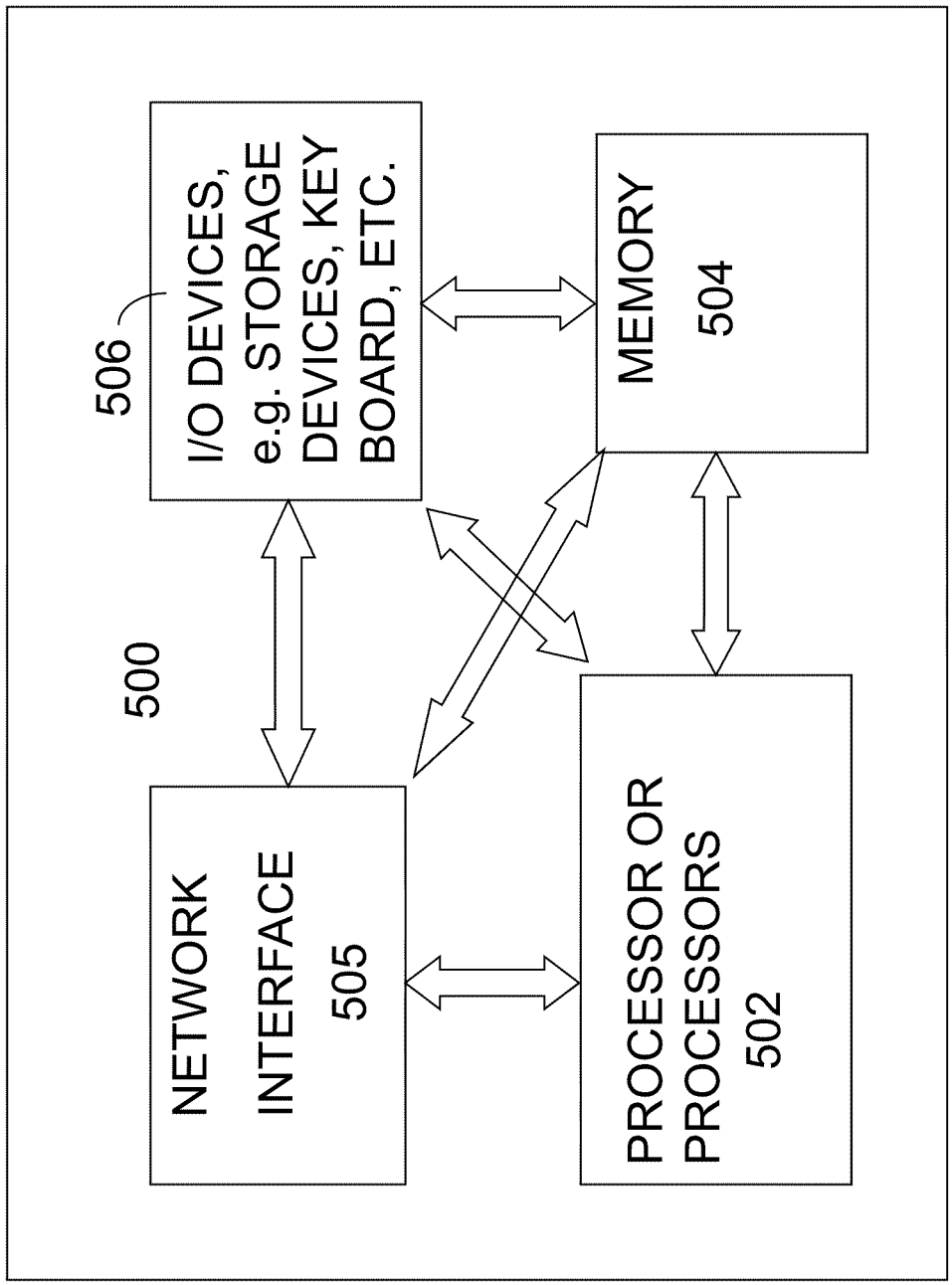
FIG. 30 depicts a high level block diagram of a general purpose computer.

FIG. 30 depicts a high level block diagram of a general purpose computer suitable for use in performing the functions described herein, including the steps shown in the block diagrams, schematic representations, and/or flowcharts. As depicted in FIG. 30, the system 500 includes a processor element 502 (e.g., a CPU) for controlling the overall function of the system 500. Processor 502 operates in accordance with stored computer program code, which is stored in memory 504. Memory 504 represents any type of computer readable medium and may include, for example, RAM, ROM, optical disk, magnetic disk, or a combination of these media. The processor 502 executes the computer program code in memory 504 in order to control the functioning of the system 500. Processor 502 is also connected to network interface 505, which transmits and receives network data packets. Also included are various input/output devices 506 (e.g., storage devices, including but not limited to, a tape drive, a floppy drive, a hard disk drive or compact disk drive, a receiver, a transmitter, a speaker, a display, a speech synthesizer, an output port, and a user input device (such as a keyboard, a keypad, a mouse and the like).

Potential Applications

The potential extent of possible use of this invention is described in the following. However, this description should not be construed as limited to the statements.

Speed Traffic Enforcement—

Current local governments use traffic enforcement cameras to enforce traffic regulation violations. A traffic enforcement camera (also road safety camera, road rule camera, photo radar, speed camera, Gatso) is an automated ticketing machine. It may include a camera which may be mounted besides, on, or over a highway or installed in an enforcement vehicle to detect traffic regulation violations, including speeding, vehicles going through a red traffic light, unauthorized use of a bus lane, for recording vehicles inside a congestion charge area and others. The latest automatic number plate recognition (ANPR) systems can be used for the detection of average speeds and use optical character recognition on images to read the license plates on vehicles. There are a number of possible factors that affect the ANPR software performance. One of these important factors is poor image resolution, usually because the plate is too far away but sometimes resulting from the use of a low-quality camera. In the case of camera recording a video (a sequence of images), this invention can process the recorded images to improve image quality of the license plate on vehicle. The enhanced license plate images are used to improve the performance of ANPR software. The invention is especially useful when the images are acquired from a far away distance and/or from a low-quality camera.

Large Crowd Event Security and Management—

In an event involving a large crowd, especially the types of events including circuses, sporting events, theatrical events, concerts, rallies, parades, etc., the security task is to prevent, where possible, crimes including theft, vandalism or assault through the deployment of trained and licensed security personnel. Beside the large number of event staff members needed to oversee this important task, camera monitoring is an important component in this type of event security and management. The invention can be used to improve image details of a human face, nomenclature on a jersey, or a moving object/vehicle, etc., from a distance, or from the periphery of the event location. Also at football games, a preferred embodiment could be used to enhance the readability of numbers and/or names on football uniforms.

Industrial Production Line and Fruit Inspection—

To measure the quality of a product, a product is examined for color and shape as it passes the inspection station, and accepted or rejected based on those factors. The components are placed at any angle on the conveyer while they are imaged from above. The inspection algorithm is used to detect defects based on features that are extracted from images. These extracted features include the color, the bonding box, the bounding circle, the perimeter, the convex hull (mathematical extraction), and the area. Similarly, to measure the quality of fruit, the colors and shapes are used. The fruit is imaged with a color digital imaging system, the images are analyzed, and results are reported to a host computer to determine the final disposition of each piece of fruit. In this type of application, the object to be examined is placed on a conveyer. A camera takes images of the object showing the effects of natural motion among them and sub-pixel shifts exist among them. A preferred embodiment can be used to combine the images to generate a higher resolution image of the object. That enhances the detail appearance of the object area and therefore improves the inspection algorithm performance by improving the features of the images inputted to the inspection algorithm.

Although various preferred embodiments of the present invention have been described herein in detail to provide for complete and clear disclosure, it will be appreciated by those skilled in the art, that variations may be made thereto without departing from the spirit of the invention.

As used herein, the terminology "subject" means: an area, a scene, an object or objects, a landscape, overhead view of land or an object or objects, or a combination thereof.

As used herein, the terminology "frame" means: a picture, an image or one of the successive pictures on a strip of film or video.

As used herein, the terminology "process" means: an algorithm, software, subroutine, computer program, or methodology.

As used herein, the terminology "algorithm" means: sequence of steps using computer software, process, software, subroutine, computer program, or methodology.

As used herein, the terminology "demosaicing process" is a digital image process of reconstructing a full color image from incomplete color samples output from an image sensor or camera overlaid with a color filter array (CFA). Demosaicing or demosaicking is also referred to as CFA interpolation or color reconstruction.

As used herein, the terminology "image sensor" means: a camera, charge coupled device (CCD), video device, spatial sensor, or range sensor. The image sensor may comprise a device having a shutter controlled aperture that, when opened, admits light enabling an object to be focused, usually by means of a lens, onto a surface, thereby producing a photographic image OR a device in which the picture is formed before it is changed into electric impulses.

The terminology "transformation" as used herein (not to be confused with the terminology Fourier transform) refers to changes induced by movement of the image capture device, including translation and rotation.

The terminology "processor" or "image processor" as used in the following claims includes a computer, multiprocessor, CPU, minicomputer, microprocessor or any machine similar to a computer or processor which is capable of processing algorithms.

The terminology "luminescence" or "luminescence contrast" refers to the difference in luminosity (or lightness) of an object as compared to the background. A more detailed description of the human visual reaction to various levels of contrast is found at NASA's Applied Color Science site http://colorusage.arc.nasa.gov/design_lum_1.php, hereby incorporated by reference. In general, the primary colors are been given luminances by design, to achieve white alignment of the monitor. Early designers of computer displays decided that equal R, G, and B digital codes should produce a particular neutral chromaticity, the "alignment white" of the monitor (usually 6500K or 5300K). Once the white alignment color was decided and the chromaticities of the three primaries were chosen the maximum luminances of the primaries were set so that luminances of the primaries would mix to give the alignment white. For example, the human eye is more sensitive to the color green. For example, the color green is used in the color array of FIG. 1 to a greater extent than red or blue, so that green is designated as the luminescent color. In graphics that have the appearance of surfaces (like this page, for example) it can be useful to describe luminance contrast in terms of the difference between the lightness of the symbol or text and its background, relative to the display's white-point (maximum) luminance.

As used herein, the terminology "spatial anti-aliasing" refers to a technique in which distortion artifacts (also refer to as aliasing) are minimized when creating a high-resolution image from a sequence of lower resolution images. Anti-aliasing relates to the process of removing signal components of a frequency higher than is able to be properly resolved by the optical recording or sampling device.

The terminology "operations" as used in the following claims includes steps, a series of operations, actions, processes, subprocesses, acts, functions, and/or subroutines.

As used herein the terminology "color channel" is used in the context of a grayscale image of the same size as a color image, made of just one of the primary colors. For example, an image from a standard digital camera generally has green, red, and blue channels. A grayscale image has just one channel.

The terminology "full color" as used herein includes three primary color channels where three colors are utilized to produce the color image or four or more primary color channels where four or more colors are used to produce the color image.

It should be emphasized that the above-described embodiments are merely possible examples of implementations.

Many variations and modifications may be made to the above-described embodiments. All such modifications and variations are intended to be included herein within the scope of the disclosure and protected by the following claims. The invention has been described in detail with particular reference to certain preferred embodiments thereof, but it will be understood that variations and modifications can be effected within the spirit and scope of the invention.

What is claimed is:

1. A system for improving picture quality of color images by combining the content of a plurality of frames of the same subject comprising:
   at least one processor; the at least one processor operatively connected to a memory for storing a plurality of frames of a subject; the at least one processor operating to combine the content of plurality of frames of the subject into a combined color image by performing:
   a process in which at least two multicolored frames are converted to monochromatic predetermined color frames;
   a gross shift process in which the gross shift translation of one monochromatic predetermined color frame is determined relative to a reference monochromatic predetermined color frame;
   a subpixel shift process utilizing a correlation method to determine the translational and/or rotational differences of one monochromatic predetermined color frame to the reference monochromatic predetermined color frame to estimate sub-pixel shifts and/or rotations between the frames; and
   an error reduction process to determine whether the resolution of the resulting combined color image is of sufficient resolution; the error reduction process comprising applying at least one spatial frequency domain constraint and at least one spatial domain constraint to the combined color image to produce at least one high-resolution full color image.

2. The system of claim 1 wherein the process for converting at least two frames to predetermined color frames comprises changing at least two multicolored frames into monochromatic predetermined color frames by substituting pixels of the predetermined color for pixels which are not of the predetermined color to create monochromatic predetermined color frames.

3. The system of claim 2 where the process of substituting pixels of the predetermined color for pixels which are not of the predetermined color comprises keeping the pixels of predetermined color and zeroing the pixels which are not of the predetermined color for each frame, converting the resultant frame into a signal, performing a Fourier transform on the signal, determining the cut-off frequency for the signal, passing the signal through low-pass windowing, and performing an inverse Fourier transform on the signal to obtain the predetermined colored pixel values for every pixel location in the frame and subsequently repeating the process for the plurality of frames to produce a monochromatic color sequence of frames.

4. The system of claim 3 further comprising creating monochromatic color sequence of frames for each of the primary colors in the multicolored frames and assigning the estimated gross shift and estimated subpixel shift obtained using the predetermined color frame sequence to the other color frame sequences to obtain a full color image and wherein the full color image comprises one of (a) green, red, blue or (b) green, red, blue, and white or (c) red, green, blue, and cyan.

5. The system of claim 1 wherein the subpixel shift process comprises estimating the rotation and/or translation of one frame relative to the reference frame of one of a plurality of primary colors.

6. The system of claim 1 wherein the plurality of frames are of a moving subject which is one of a speeding vehicle, an object on a conveyer belt, a face of a person, or nomenclature on clothing.

7. The system of claim 1 wherein the plurality of frames comprise pixels of three primary colors and wherein the error reduction process comprises:
 a) estimating translation and/or rotation values for three channels;
 b) initializing a processing arrays for each of the three color channels by populating the grid of each processing array using data from a respective one of the three sampled color channels and the translation and rotation estimates for each color channel;
 c) applying a 2D Fourier transform to the three processing arrays, respectively, to obtain Fourier transformed processing arrays;
 d) determining spatial frequency domain constraints for each of the three processing arrays;
 e) applying spatial frequency domain constraints to each of the three the Fourier transformed processing arrays to obtain the constrained spatial frequency domain processing arrays;
 f) applying an inverse 2D Fourier transform to the constrained spatial frequency domain processing arrays to obtain inverse processing arrays for each color;
 g) applying spatial domain constraints using the estimated shifts and rotations to the inverse processing arrays to obtain the constrained spatial domain processing arrays for each color;
 h) checking the error-energy reduction condition; if the stopping criterion is not satisfied, repeating the steps (c) through (g); and if the stopping criterion is satisfied then
 i) reducing the bandwidth from each of the processing arrays to an output array bandwidth using the Fourier windowing method; and
 j) outputting a super-resolved full color image with the desired bandwidth.

8. A system for super-resolving images from color filter array (CFA) low-resolution sequences comprising:
 an image processor having an input for inputting multiple CFA images of a scene with sub-pixel translations and rotations; one of the images of the scene being a reference image; and
 at least one memory comprising:
  a monochromatic color image constructing algorithm for creating at least one monochromatic color image for each image in the input sequence;
  a gross translation estimation algorithm for estimating overall translations of the at least one monochromatic color image with respect to the reference image on the image processor;
  a sub-pixel estimation algorithm for estimating the sub-pixel translations and/and or rotations of at least one monochromatic color image with respect to the reference image; and
  an error reduction algorithm for applying at least one spatial frequency domain constraint and at least one spatial domain constraint to the CFA low resolution images to produce at least one high-resolution full color image.

9. The system of claim 8 wherein the monochromatic color image constructing algorithm creates a plurality of monochromatic color sequences and wherein the gross translation estimation and subpixel estimation performed on one of monochromatic color sequences are assigned to other monochromatic color sequences.

10. The system of claim 8 wherein the operations performed by the monochromatic color image constructing algorithm comprise obtaining the hexagonal sampled image; applying 2-D Fourier transform to the hexagonal sampled image to obtain transformed image; determining cutoff frequency; applying low-pass windowing generated from the cutoff frequency to the transformed image to create low-pass windowed image; and applying inverse 2-D Fourier transform to the low-pass windowed image.

11. The system of claim 8 wherein the monochromatic color image constructing algorithm processes at least three color channel sequences and the gross translations and subpixel translations and rotations are estimated for at least three color channel sequences.

12. The system of claim 8 wherein the operations performed by the monochromatic color image constructing algorithm comprises obtaining either hexagonal sampled or rectangular sampled images for each monochromatic color, applying 2-D Fourier transform to the sampled images to obtain Fourier transform images; determining cutoff frequencies; applying low-pass windowing generated from the cutoff frequencies to the Fourier transformed images to obtain low-pass window images; and applying inverse 2-D Fourier transform to the low-pass windowed images.

13. The system of claim 12 wherein the monochromatic color image constructing algorithm processes at least three color channel sequences
 i. one color is the luminance channel and is obtained using hexagonal sampled images;
 ii. two colors are the chrominance colors and are obtained using rectangular sampled images;
and wherein the operations performed by determining cutoff frequencies comprise designing different cutoff frequencies for the luminance channel and chrominance channels.

14. The system of claim 8 wherein the operations performed by the error-reduction algorithm comprise:
 a) inputting CFA images and estimated translation and rotation values for three color channels;
 b) initializing a processing array for each of the three color channels by populating the grid of each processing array using data from a respective one of the three sampled color channels and the estimated translation and rotation estimates for each color channel;
 c) applying a 2D Fourier transform to the three processing arrays, respectively, to obtain Fourier transformed processing arrays;
 d) determining spatial frequency domain constraints for each of the three processing arrays;
 e) applying spatial frequency domain constraints to each of the three the Fourier transformed processing arrays to obtain the constrained spatial frequency domain processing arrays;
 f) applying an inverse 2D Fourier transform to the constrained spatial frequency domain processing arrays to obtain inverse processing arrays for each color;
 g) applying spatial domain constraints using the estimated shifts and rotations to the inverse processing arrays to obtain the constrained spatial domain processing arrays for each color;
 h) checking the error-energy reduction condition; if the stopping criterion is not satisfied, repeating the steps (c) through (g); and if the stopping criterion is satisfied then i) reducing the bandwidth from each of the processing arrays to an output array bandwidth using the Fourier windowing method; and j) outputting a super-resolved full color image with the desired bandwidth.

15. The system of claim 8 wherein the at least one spatial frequency domain constraint is applied using the cutoff frequency designed from the hexagonal sampling properties for the green channel; and using the cutoff frequency designed from the rectangular sampling properties for one of the other color channels.

16. A method of super-resolving CFA images affected by movement including translation and rotation comprising:

inputting frames of low-resolution CFA images of a scene into a processor; at least one of the frames being affected by movement;

obtaining at least one monochromatic color image for each image in the input frames;

estimating the gross translations and sub-pixel shifts and rotations due to the movement using the monochromatic color images; and applying an error reduction algorithm utilizing at least one spatial frequency domain constraint and at least one spatial domain constraint to produce a high-resolution full color output image.

17. The method of claim 16 wherein the step of obtaining a monochromatic color image is completed for a plurality of different color monochromatic colors and the estimated gross translations and sub-pixel translations and rotations from the first monochromatic channel are assigned to other monochromatic channels.

18. The method of claim 16 wherein the step of obtaining a monochromatic color image comprises obtaining the hexagonal sampled images; applying 2-D Fourier transform to each hexagonal sampled portion to obtain a Fourier transform image; determining cutoff frequency; applying low-pass windowing generated from the cutoff frequency to each Fourier transformed images to obtain a low pass window image; and applying inverse 2-D Fourier transform to each low-pass windowed image.

19. The method of claim 16 wherein the steps of applying the error reduction algorithm comprise:

a) inputting CFA images and estimated translation and rotation values for three color channels;

b) initializing a processing arrays for each of the three color channels by populating the grid of each processing array using data from a respective one of the three sampled color channels and the estimated translation and rotation estimates for each color channel;

c) applying a 2D Fourier transform to the three processing arrays, respectively, to obtain Fourier transformed processing arrays;

d) determining spatial frequency domain constraints for each of the three processing arrays;

e) applying spatial frequency domain constraints to each of the three the Fourier transformed processing arrays to obtain the constrained spatial frequency domain processing arrays;

f) applying an inverse 2D Fourier transform to the constrained spatial frequency domain processing arrays to obtain inverse processing arrays for each color;

g) applying spatial domain constraints using the estimated shifts and rotations to the inverse processing arrays to obtain the constrained spatial domain processing arrays for each color;

h) checking the error-energy reduction condition; if the stopping criterion is not satisfied, repeating the steps (c) through (g); and if the stopping criterion is satisfied then i) reducing the bandwidth from each of the processing arrays to an output array bandwidth using the Fourier windowing method; and j) outputting a super-resolved full color image with the desired bandwidth.

20. The method of claim 19 wherein the predominate color is green and wherein the step of initializing processing arrays comprise:

a) providing the estimated gross translation and sub-pixel shift and rotation of each monochromatic color image with respect to a reference image;

b) calculating the transformed coordinates from the estimated gross translations and sub-pixel shifts and rotation angles for each input monochromatic color image;

c) generating three 2D processing arrays with a sample spacing smaller than the desired high-resolution output image, d) assigning the known green monochromatic channel values to the closest gross translated and sub-pixel shifted and rotated grid locations of the predetermined processing array in a hexagonal sampling pattern;

e) assigning the known red or blue image values to the closest gross translated and sub-pixel shifted and rotated grid locations of the red or blue processing array in a rectangular sampling pattern; and f) assigning zeros to other grid locations.

21. The method of claim 16 wherein error reduction algorithm comprises an iterative error energy reduction algorithm using the transformations of each color channel low-resolution image in three upsampled grids to reconstruct the high-resolution three channel full color output, the error-energy reduction algorithm utilizing the low resolution CFA images and their transformations of each color channel on the upsampled grids as the spatial domain constraint and the bandwidth of each color channel as the spatial frequency domain constraint.

22. The method of claim 16 wherein the at least one spatial domain constraint of the error reduction algorithm is the estimated translations and rotations of the low resolution green channel images in a hexagonal sampling pattern and their values; the estimated translations and rotations of the low-resolution red or blue channel images in a rectangular sampling pattern and their values; and the spatial frequency domain constraint is the bandwidth determined from cutoff frequencies of hexagonal sampled green channel image and rectangular sampled red or blue channel images.

* * * * *